United States Patent
Ebihara et al.

(10) Patent No.: US 9,911,029 B2
(45) Date of Patent: Mar. 6, 2018

(54) UNDERLAY BODY FOR ACQUISITION OF HANDWRITING INFORMATION

(71) Applicant: SONY CORPORATION, Tokyo (JP)

(72) Inventors: Munetake Ebihara, Tokyo (JP); Hiroto Kawaguchi, Kanagawa (JP); Manabu Kodate, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/889,586

(22) PCT Filed: May 19, 2014

(86) PCT No.: PCT/JP2014/002625
§ 371 (c)(1),
(2) Date: Nov. 6, 2015

(87) PCT Pub. No.: WO2014/207989
PCT Pub. Date: Dec. 31, 2014

(65) Prior Publication Data
US 2016/0125225 A1    May 5, 2016

(30) Foreign Application Priority Data
Jun. 28, 2013    (JP) ................. 2013-137179

(51) Int. Cl.
G06K 9/00        (2006.01)
G06F 3/041       (2006.01)
G06F 3/044       (2006.01)
G06F 3/16        (2006.01)
G06K 9/20        (2006.01)
G06K 9/22        (2006.01)

(52) U.S. Cl.
CPC ......... *G06K 9/00174* (2013.01); *G06F 3/044* (2013.01); *G06F 3/0412* (2013.01); *G06F 3/0414* (2013.01); *G06F 3/16* (2013.01); *G06F 3/165* (2013.01); *G06K 9/00187* (2013.01); *G06K 9/00402* (2013.01); *G06K 9/209* (2013.01); *G06K 9/222* (2013.01); *G06F 2203/04102* (2013.01)

(58) Field of Classification Search
CPC ...... G06F 3/0412; G06F 3/0414; G06F 3/044; G06F 3/16; G06F 3/165; G06F 2203/04102; G06K 9/00174; G06K 9/00187; G06K 9/209
USPC ........ 382/188, 155, 115; 345/173, 179, 126, 345/156
See application file for complete search history.

(56) References Cited

U.S. PATENT DOCUMENTS 5,369,228 A * 11/1994 Faust ............... G06F 3/045
178/18.05
5,629,499 A *  5/1997 Flickinger ........ G06F 1/1626
178/18.01
6,002,389 A * 12/1999 Kasser .............. G06F 3/041
178/18.01

(Continued)

FOREIGN PATENT DOCUMENTS

CN    101893945 A   * 11/2010
CN    102063236 A   *  5/2011
(Continued)

*Primary Examiner* — Mekonen Bekele
(74) *Attorney, Agent, or Firm* — Chip Law Group

(57) ABSTRACT

An underlay body includes a surface on which a writing medium is placed, and a sensor that detects a pressure distribution on the surface.

18 Claims, 36 Drawing Sheets

(56) References Cited

U.S. PATENT DOCUMENTS

| | | | | |
|---|---|---|---|---|
| 6,072,474 | A * | 6/2000 | Morimura | G06F 3/04892 345/173 |
| 6,292,159 | B1 * | 9/2001 | Someya | G09G 3/2029 345/60 |
| 7,663,607 | B2 * | 2/2010 | Hotelling | G06F 3/0416 178/18.01 |
| 2006/0097991 | A1 * | 5/2006 | Hotelling | G06F 3/0416 345/173 |
| 2007/0024595 | A1 * | 2/2007 | Baker | G06F 3/03547 345/173 |
| 2010/0053093 | A1 * | 3/2010 | Kong | G06F 3/041 345/173 |
| 2013/0082970 | A1 * | 4/2013 | Frey | G06F 3/0414 345/173 |
| 2013/0241858 | A1 * | 9/2013 | Hung | G06F 3/0412 345/173 |
| 2013/0249860 | A1 * | 9/2013 | Seo | G06F 3/045 345/174 |
| 2017/0010712 | A1 * | 1/2017 | Yoshizumi | G06F 3/044 |

FOREIGN PATENT DOCUMENTS

| | | | |
|---|---|---|---|
| JP | 61148521 A | * | 7/1986 |
| JP | S61-148521 A | | 7/1986 |
| JP | S62-147581 A | | 7/1987 |
| JP | H09-091076 A | | 4/1997 |
| JP | 2006-127545 A | | 5/2006 |
| JP | 2007093960 A | * | 4/2007 |
| JP | 2011-123833 A | | 6/2011 |

* cited by examiner

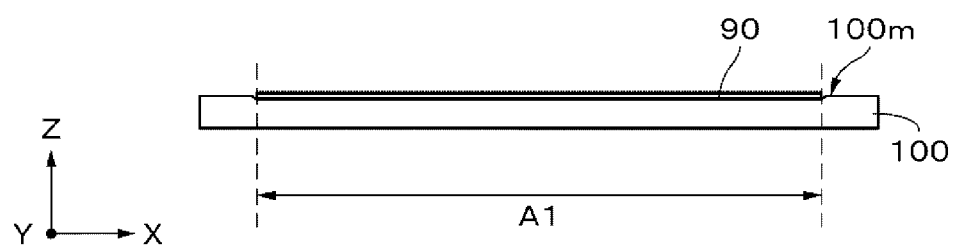
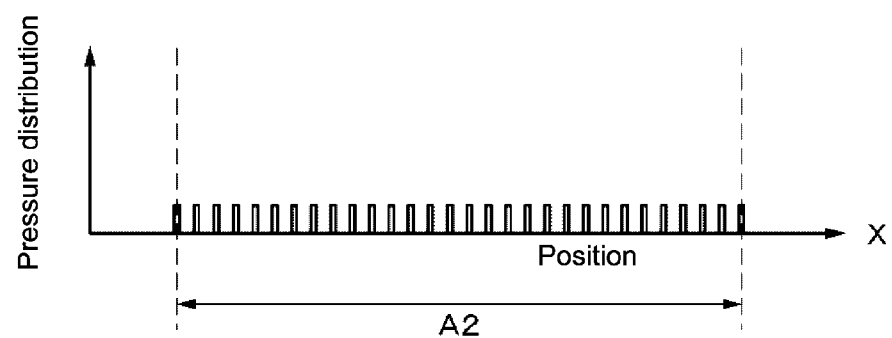
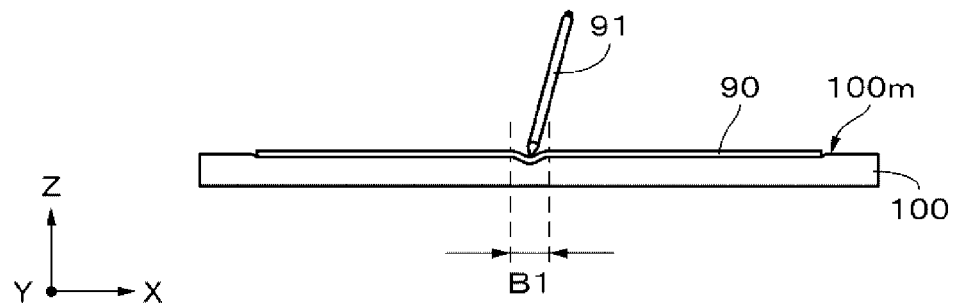
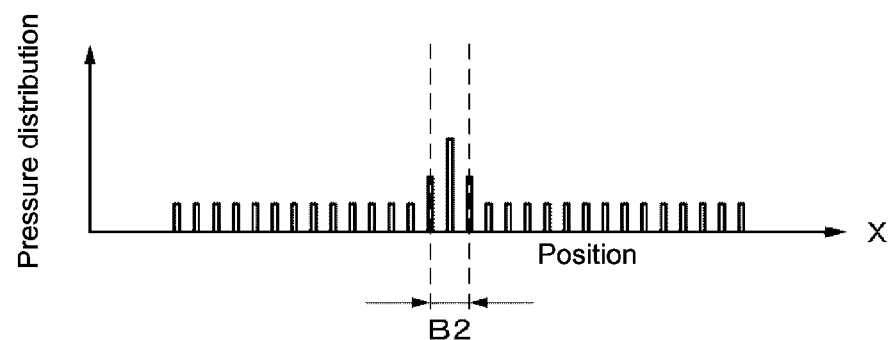
FIG. 19

A
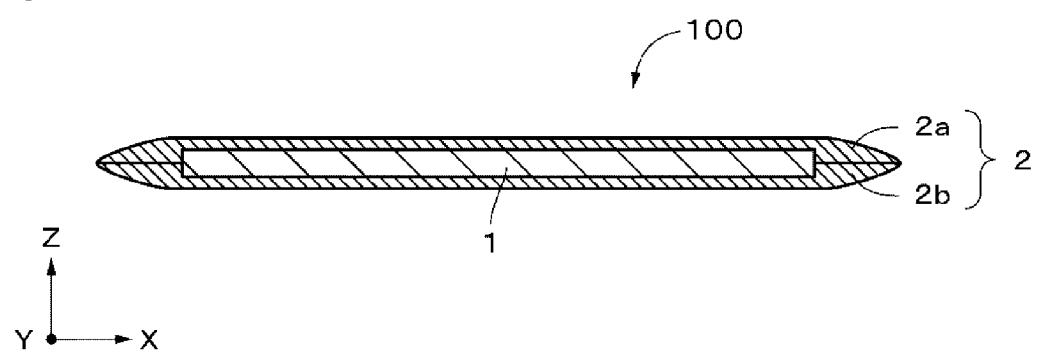
B
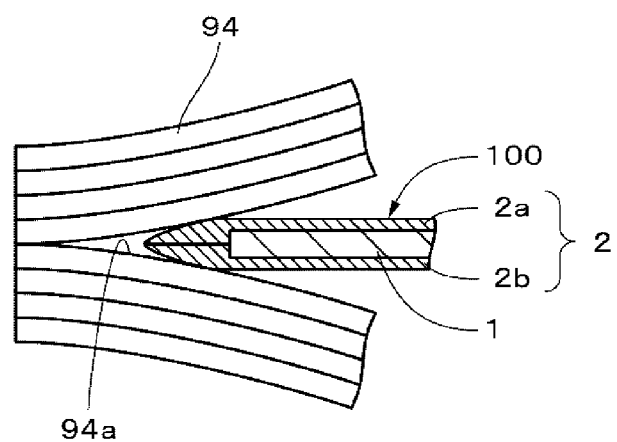
FIG.21

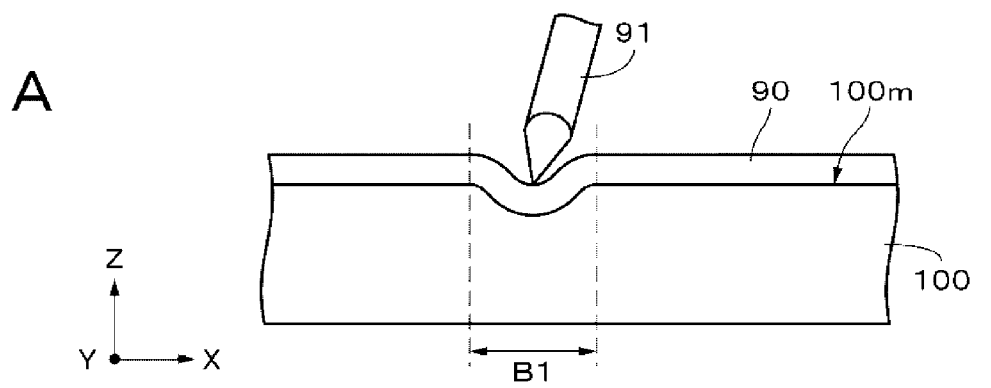
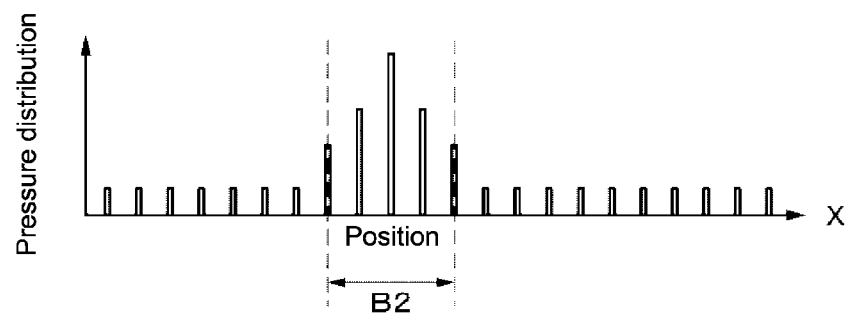
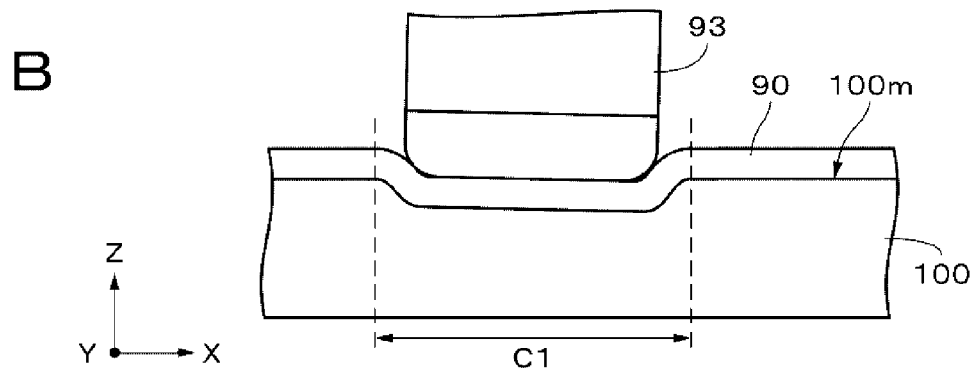
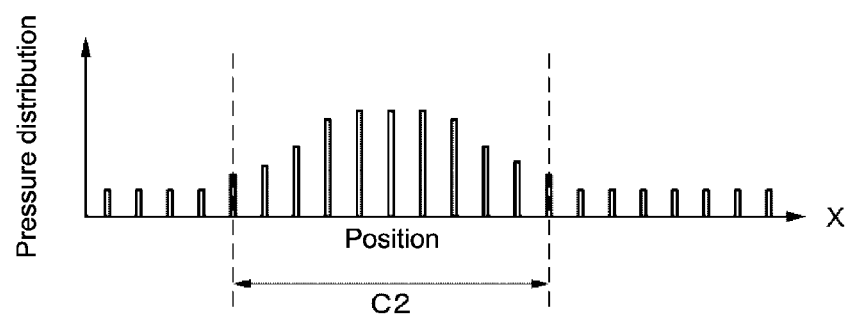
FIG.22

A
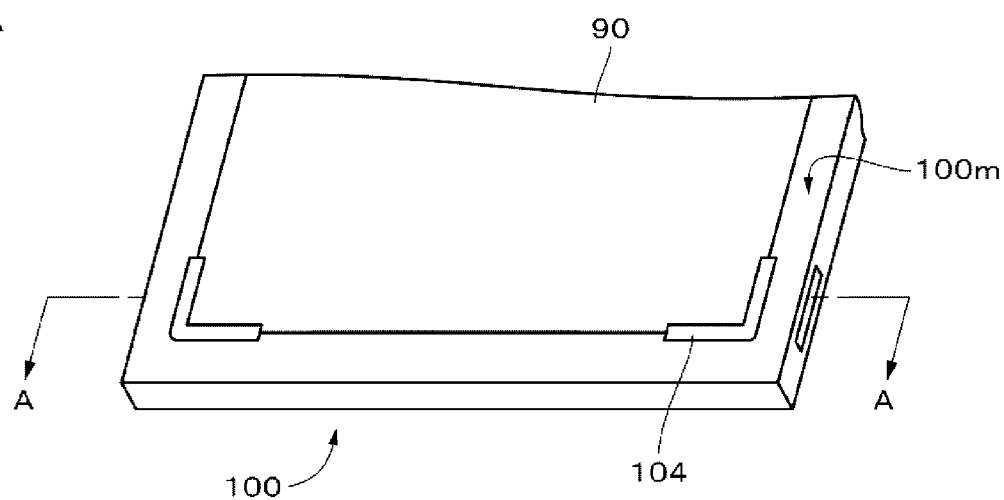
B
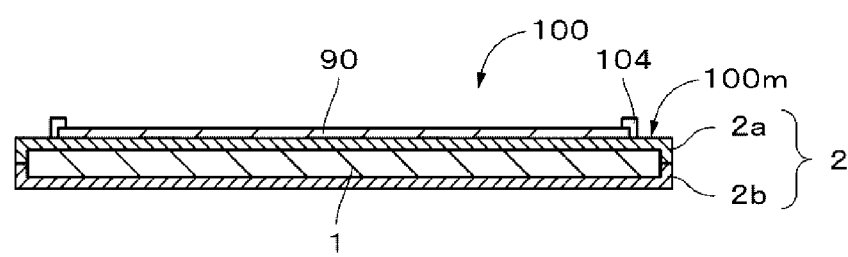
C
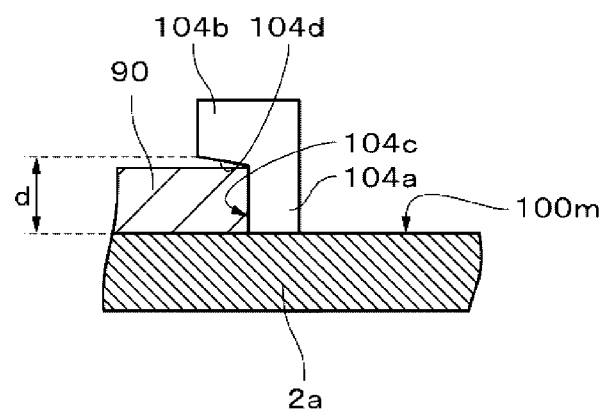
FIG.25

A

| Identification information | Entry form type |
|---|---|
| 0110AB | Entry form A |
| 0111AB | Entry form B |
| 0112MN | Entry form C |
| 0113XY | Entry form D |
| ┆ | ┆ |
| 3222XX | Entry form W |

B

| Paper sheet No. | Identification information | Handwriting information |
|---|---|---|
| 1 | 0110AB | ⬜ |
| 2 | 0110AB | ⬜ |
| 3 | 0112MN | ⬜ |
| 4 | 0110AB | ⬜ |
| ┆ | ┆ | ┆ |
| 150 | 3222XX | ⬜ |

FIG.28

| Identification information | Positional information of entry column | Attribute information of entry column | Entry information of entry column |
|---|---|---|---|
| 0110AB | Positional information (1) of entry column | Date | ○○○○○ |
| 0110AB | Positional information (2) of entry column | Name | ○○○○○ |
| 0110AB | Positional information (9) of entry column | Contact | ○○○○○ |
| 0110AB | Positional information (10) of entry column | Questionnaire | ○○○○○ |
| 0111AB | Positional information (1) of entry column | Membership No. | ○○○○○ |
| 0111AB | Positional information (2) of entry column | Name | ○○○○○ |
| 0111AB | Positional information (12) of entry column | Email address | ○○○○○ |
| 0111AB | Positional information (13) of entry column | Address | ○○○○○ |
| 0112MN | Positional information (1) of entry column | Name | ○○○○○ |
| 0112MN | Positional information (2) of entry column | Age | ○○○○○ |
| 0112MN | Positional information (5) of entry column | Address | ○○○○○ |
| 0112MN | Positional information (6) of entry column | Place of employment | ○○○○○ |

FIG.29

UNDERLAY BODY FOR ACQUISITION OF HANDWRITING INFORMATION

TECHNICAL FIELD

The present technology relates to an underlay body that acquires handwriting information.

BACKGROUND ART

The following apparatuses are known as an apparatus that acquires handwriting of a writing tool (see, for example, Patent Document 1).

Electromagnetic-induction-type pen tablet: A coil that forms an electromagnetic field is integrated with a ballpoint pen including a pressure-detectable apparatus, and a position of the coil, that is, the ballpoint pen is detected using an electromagnetic induction digitizer tablet.

Ultrasonic wave sensor clip: Handwriting is specified by communicating, as well as emitting ultrasonic waves from a paperclip-type apparatus to detect a position of a pen, a pen-point pressure detection state of an electronic apparatus-equipped ballpoint pen using infrared rays.

Camera-equipped electronic pen: Minute dots printed on paper are read by a camera of a camera-equipped pen, and coordinates of the pen on the paper are detected from an arrangement shape of the dots.

Patent Document 1: Japanese Patent Application Laid-open No. 2011-123833

SUMMARY OF INVENTION

Problem to be Solved by the Invention

The apparatuses described above, however, require a use of a dedicated pen, and handwriting cannot be acquired using a general-purpose writing tool (e.g., pencil, ballpoint pen, and fountain pen).

Therefore, the present technology aims at providing an underlay body that is capable of acquiring handwriting using a general-purpose writing tool.

Means for Solving the Problem

To solve the problem described above, according to the present technology, there is provided an underlay body including:
a surface on which a writing medium is placed; and
a sensor configured to detect a pressure distribution on the surface.

Effect of the Invention

As described above, according to the present technology, handwriting can be acquired using a general-purpose writing tool.

BRIEF DESCRIPTION OF DRAWINGS

FIG. 19A is a diagram showing a relationship between a state of the electronic underlay body on which a paper is placed and a capacitance change amount at that time. FIG. 19B is a diagram showing a relationship between a state of the electronic underlay body when a character or the like written on the paper is erased and a capacitance change amount at that time.

FIG. 21A is a schematic cross-sectional diagram showing a configuration example of the electronic underlay body according to the second embodiment of the present technology. FIG. 21B is a schematic cross-sectional diagram showing an example of a state where the electronic underlay body according to a modified example of the second embodiment of the present technology is sandwiched between binding margins.

FIG. 22A is a diagram showing a relationship between a state of the electronic underlay body when a character is written on a paper using a writing tool, for example, and a capacitance change amount at that time. FIG. 22B is a diagram showing a relationship between a state of the electronic underlay body when a character is written on the paper using an eraser, for example, and a capacitance change amount at that time.

FIG. 25A is a partially-enlarged perspective view of the electronic underlay body according to the fourth embodiment of the present technology. FIG. 25B is a schematic cross-sectional diagram taken along the line A-A of FIG. 25A. FIG. 25C is a cross-sectional diagram obtained by partially enlarging FIG. 25B.

FIG. 28A is a schematic diagram showing an example of an entry form information table. FIG. 28B is a schematic diagram showing an example of a handwriting information table.

FIG. 29 is a schematic diagram showing an example of an entry column information table.

MODES FOR CARRYING OUT THE INVENTION

Figure 1:
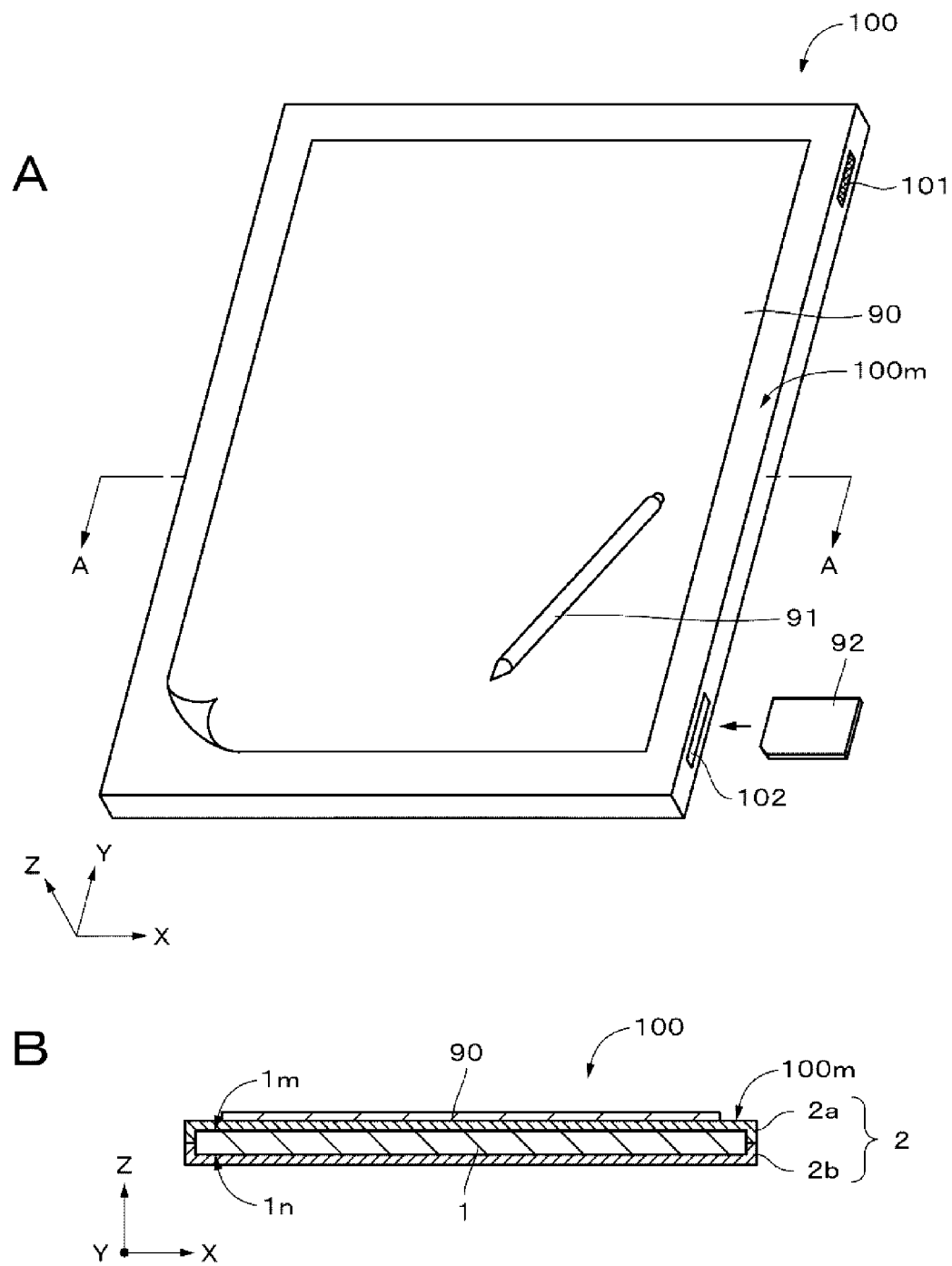
FIG. 1A is a perspective view showing an example of an appearance of an electronic underlay body according to a first embodiment of the present technology.
FIG. 1B is a schematic cross-sectional diagram taken along the line A-A of FIG. 1A.

In the specification, "writing characters, symbols, and the like, drawing lines, figures, pictures, and the like, and painting colors and the like" is simply expressed as "writing characters etc.".

"Writing characters using a writing tool, and the like" may simply be expressed as "writing with a writing tool".

"Erasing written characters and symbols, drawn lines, figures, and pictures, painted colors, and the like" is simply expressed as "erasing written characters etc.".

An underlay body is an underlay capable of electrically detecting handwriting when a character is written on a writing medium using a writing tool, etc. (hereinafter, referred to as "electronic underlay body"). A body of the electronic underlay body is of a sheet type or a plate type, for example. Here, plate type refers to an object which is thicker than the sheet type and does not bend or is hardly bent.

Handwriting information refers to the following information acquired when characters are written on the writing medium using a writing tool, etc. (a) Pressure distribution, (b) pen-point position of writing tool, (c) pen-point position and writing pressure of writing tool, (c) image data of handwriting It should be noted that the information of (b) and (c) are generated based on the information of (a). Moreover, (d) character data corresponding to handwriting may be generated from the information of (a).

When writing characters on the writing medium, etc., the electronic underlay body is used while being placed under the writing medium or being sandwiched by the writing medium, though not particularly limited thereto. Examples thereof include a notebook underlay, a calligraphy underlay, a clipboard, a drawing board, a slip clip, a desk mat, and a trace board though not limited thereto.

The writing medium only needs to transmit, when being placed on a surface of the electronic underlay body, writing pressure to the surface of the electronic underlay body via the writing medium and is not particularly limited. Examples thereof include general-purpose paper sheet and film. Examples of the general-purpose paper sheet include paper sheet for calligraphy, drawing paper sheet, Japanese "washi", graph paper sheet, report paper sheet, loose leaf, notebook, learning book, pocketbook, postcard, letter pad, and seal, though not limited thereto. The general-purpose film may either be an organic film or an inorganic film, or a film obtained by laminating those films. The number of writing media to be placed on the surface of the electronic underlay body is not limited to one and may be multiple. The plurality of writing media may be placed on top of one another on the surface of the electronic underlay body, or the plurality of writing media may be placed apart from one another or partially overlapping one another in a plane direction.

As the writing tool, a general-purpose writing tool is used. Examples of the general-purpose writing tool include ink brush, pen, pencil, lead holder, mechanical pencil, crayon, pastel crayon, pastel, grease pencil, pyrophyllite, and charcoal, though not limited thereto. Specific examples of pen include dip pen (quill pen, glass pen, coracoid pen, etc.), fountain pen, ballpoint pen (rollerball etc.), milli-pen (drawing pen), felt-tip pen (fiber pen, marker, highlighter pen, etc.), and brush pen, though not limited thereto.

A sensor of the electronic underlay body may detect correction information of a correction material in addition to the handwriting information of a writing tool. As the correction material, a general-purpose correction material is used. Examples of the general-purpose correction material include eraser, whiteout, correction pen, correction brush, and correction tape, though not limited thereto.

Erase information refers to the following information acquired when a character written on the writing medium is erased and the like using the correction material. (a) pressure distribution, (b) pressing position of correction material, (c) pressing position and pressing force of correction material, (c) image data of handwriting corrected by correction material It should be noted that the information of (b) and (c) are generated from the information of (a).

As the sensor, it is favorable to use a pressure detection sensor that detects pressure information (pressure distribution) in real time, on the surface on which the writing medium is to be placed. As such a pressure detection sensor, a sensor including a reference potential surface that is deformed according to physical pressure and influences the capacitance with respect to the surface of a capacitance-type touch panel is favorable. However, the sensor is not limited thereto, and various other types can also be used.

As the type of electronic underlay body, there is an integral type or a peripheral apparatus type. The integral type refers to an electronic underlay body that includes both a sensor that detects handwriting information and a storage section that stores the detected handwriting information and independently performs processing from the detection of the handwriting information to the storage thereof. On the other hand, the peripheral apparatus type means that an electronic underlay body as a peripheral apparatus includes a sensor for detecting handwriting information, a base unit includes a storage section that stores the handwriting information detected by the electronic underlay body, and the electronic underlay body and an external apparatus perform the processing from the detection of the handwriting information to the storage thereof separately.

When the electronic underlay body includes a first main surface and a second main surface, one or both of the main surfaces becomes/become a surface on which a writing medium is to be placed. When both of the main surfaces are the surfaces on which the writing medium is to be placed, both of the main surfaces may be capable of detecting handwriting information.

The electrode layer includes a first electrode and a second electrode. The first and second electrodes are in an intersecting relationship when seen from one main surface side of the sensor. The first and second electrodes are formed on different substrates or on the same substrate.

Embodiments of the present technology will be described in the following order while referring to the drawings. It should be noted that the same or corresponding parts are denoted by the same symbols throughout all the figures in the following embodiments.

1. First embodiment (example of integral-type electronic underlay body that acquires handwriting information)
  1.1 Configuration of electronic underlay body
  1.2 Detection operation of sensor
  1.3 Configuration of electrical circuit
  1.4 Operation of electronic underlay body
  1.5 Effect
  1.6 Modified example
2. Second embodiment (example of electronic underlay body that detects paper and writing)
  2.1 General Outline
  2.2 Configuration of electronic underlay body
  2.3 Operation of electronic underlay body
  2.4 Effect
  2.5 Modified example
3. Third embodiment (example of electronic underlay body that distinguishes writing with writing tool from erasing with eraser)
  3.1 General outline
  3.2 Configuration of electronic underlay body
  3.3 Operation of electronic underlay body
  3.4 Effect
4. Fourth embodiment (example of clipboard-type electronic underlay body)
  4.1 Configuration of electronic underlay body
  4.2 Effect
  4.3 Modified example
5. Fifth embodiment (example of electronic underlay body that corrects deviation of handwriting information caused by paper sheet arrangement's deviation)
  5.1 General outline
  5.2 Configuration of electronic underlay body
  5.3 Effect
6. Sixth embodiment (example of electronic underlay body that judges entry form)
  6.1 Configuration of paper
  6.2 Configuration of electrical circuit of electronic underlay body
  6.3 Operation of electronic underlay body
  6.4 Effect
  6.5 Modified example
7. Seventh embodiment (example of electronic underlay body that outputs sound effect corresponding to writing)
  7.1 General outline
  7.2 Configuration of electronic underlay body
  7.3 Effect
8. Eighth embodiment (example of electronic underlay body including plurality of operation modes)
  8.1 Modes of Electronic Underlay Body
  8.2 Operation of electronic underlay body
  8.3 Effect
  8.4 Modified example
9. Ninth embodiment (example of electronic underlay body including display apparatus)
  9.1 Configuration of electronic underlay body
  9.2 Modes of electronic underlay body
10. Tenth embodiment (example of peripheral-apparatus-type electronic underlay body)
  10.1 Configuration of handwriting reading system
  10.2 Configuration of electronic underlay body
  10.3 Configuration of base unit 1. First Embodiment 1.1 Configuration of Electronic Underlay Body As shown in FIG. 1A, an electronic underlay body 100 is of a sheet type or a plate type and includes a surface 100*m* on which a paper sheet 90 as an example of a writing medium is to be placed. The surface 100*m* is a rectangular plane. Here, the case where the surface 100*m* is rectangular is exemplified, but the shape of the surface 100*m* is not limited to this example. On a side surface of the electronic underlay body 100, a power supply switch 101 and a slot 102 are provided. Loaded into the slot 102 is an external storage apparatus 92 such as a memory card.

The electronic underlay body 100 is used by being placed under the paper sheet 90 when a character is written on the paper sheet 90 using a writing tool 91, etc. As the writing tool 91 and the paper sheet 90, general-purpose writing tool and paper are used. In the specification, an X axis and a Y axis indicate directions orthogonal to each other in the surface 100*m*, and a Z axis indicates a direction orthogonal to the X axis and the Y axis (thickness direction of electronic underlay body 100).

As shown in FIG. 1B, the electronic underlay body 100 includes a sensor 1 and an exterior material 2. The exterior material 2 covers the entire sensor 1. The sensor 1 is a pressure sensor that detects a pressure applied to the surface 100m via the exterior material 2. The sensor 1 includes a detection surface 1m that detects a pressure and a back surface 1n on a back side thereof. The surface 100m on which the paper sheet 90 is placed is positioned on the detection surface 1m.

When a user places the paper sheet 90 on the surface 100m and writes a character on the paper sheet 90 using the writing tool 91, etc., the electronic underlay body 100 stores the written character and the like as handwriting information. It should be noted that the handwriting information may be stored after being subjected to processing for noise removal, compression, and the like.

(Exterior Material)

As shown in FIG. 1B, the exterior material 2 includes, for example, a first exterior material 2a and a second exterior material 2b. The first exterior material 2a covers the detection surface 1m side of the sensor 1. Therefore, the sensor 1 detects a pressure applied to the surface 100m via the first exterior material 2a. Considering this point, the first exterior material 2a is favorably a sheet having flexibility. On the other hand, the second exterior material 2b covers the back surface 1n side of the sensor 1. Therefore, the second exterior material 2b is not particularly limited in terms of physical characteristics, thickness, and the like and may either be a sheet having flexibility or a plate having a high bending rigidity.

The first and second exterior materials 2a and 2b include, for example, a polymeric resin material. Examples of the polymeric resin material include rigid polyvinyl chloride, polypropylene (PP), polyethylene terephthalate (PET), and a copolymerized synthetic resin of acrylonitrile, butadiene, and styrene (ABS resin). As the second exterior material 2b, for example, a cardboard may be used. The first and second exterior materials 2a and 2b may additionally include a general-purpose additive and pigment as necessary.

(Sensor)

Figure 3:
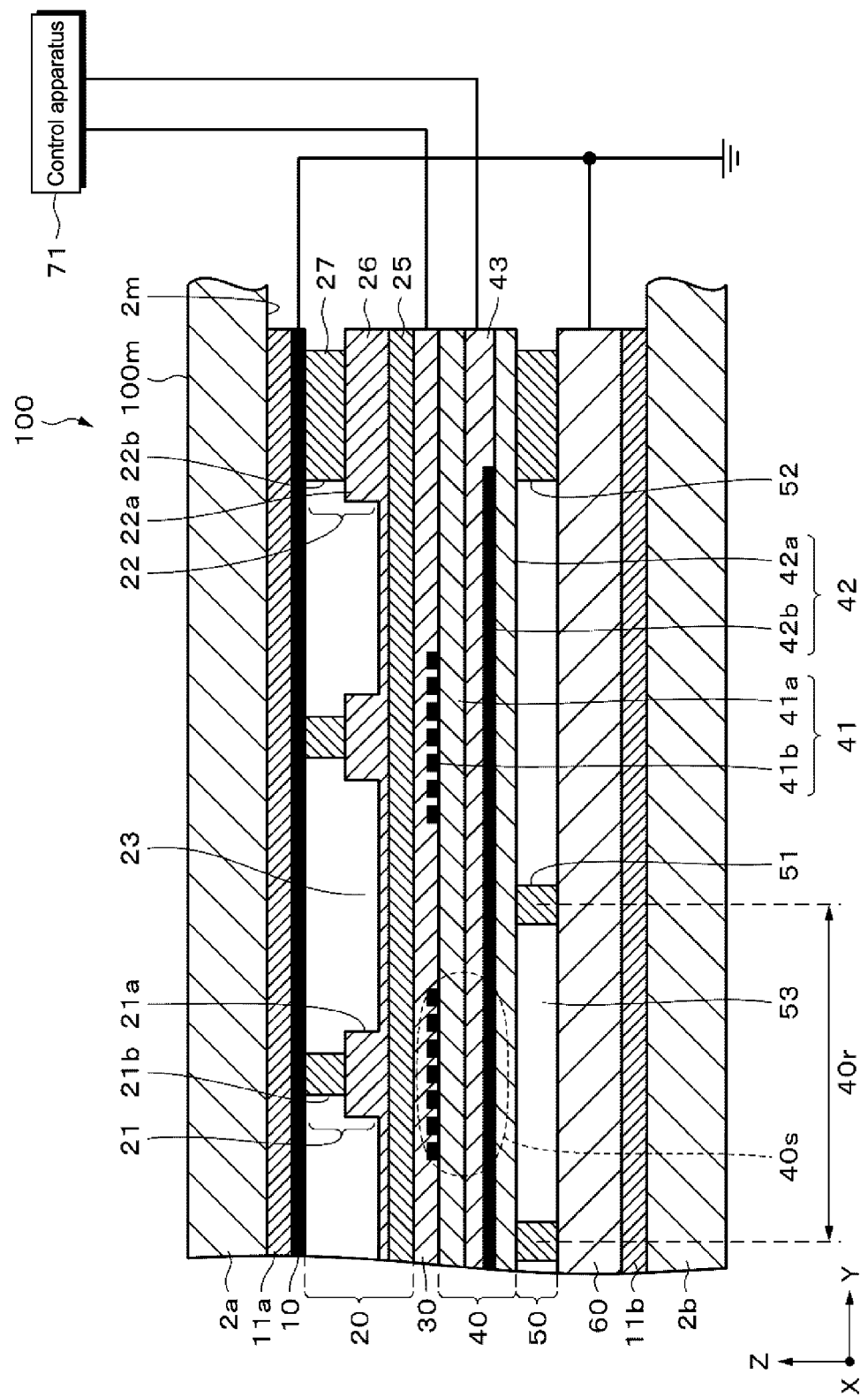
FIG. 3 is a cross-sectional diagram obtained by partially enlarging FIG. 2.
Figure 4:
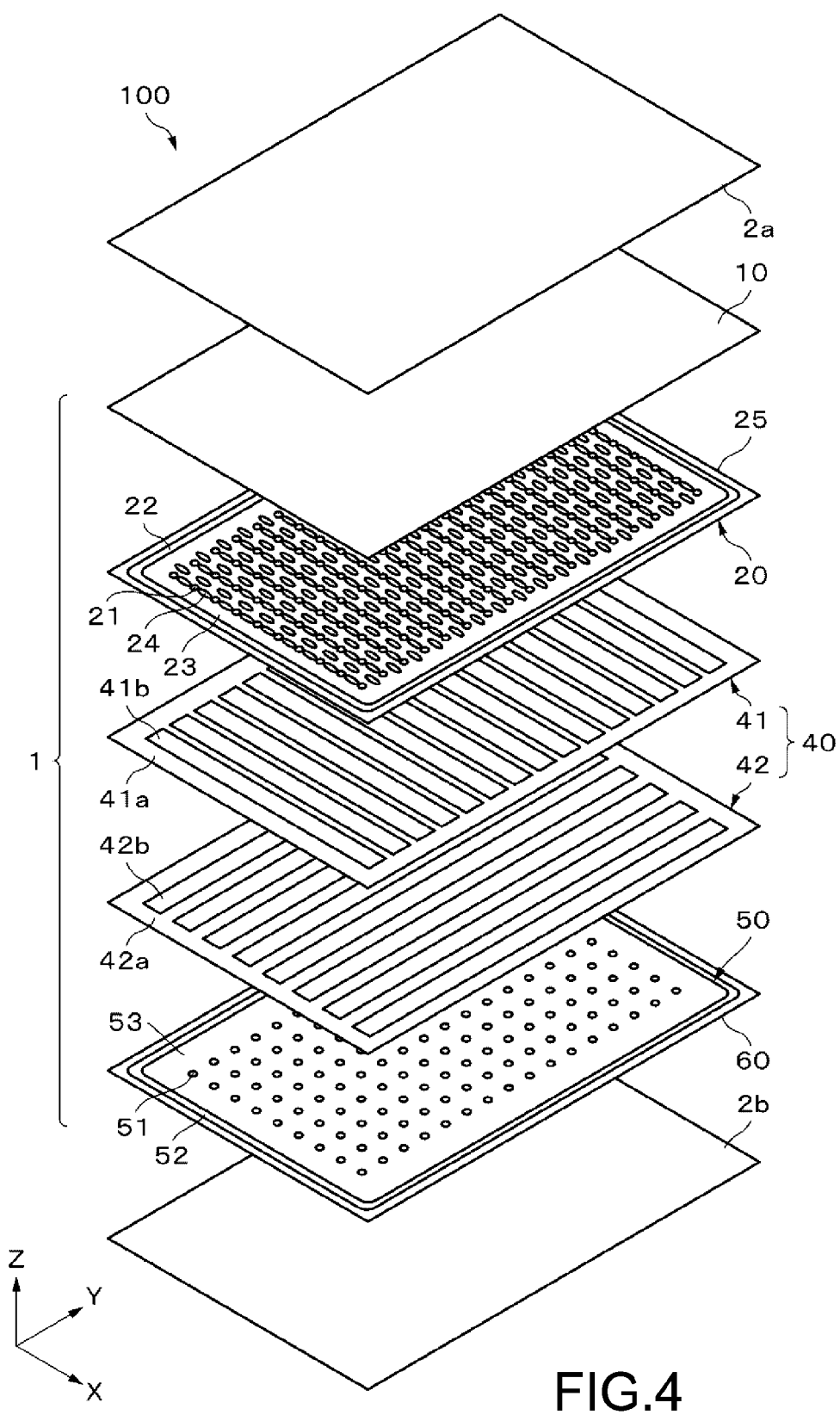
FIG. 4 is an exploded perspective view showing a configuration example of the electronic underlay body.

Hereinafter, a configuration example of the sensor 1 will be described with reference to FIGS. 2 to 4. The sensor 1 includes a metal layer (first conductive layer (conductor layer)) 10, a support layer (first support layer) 20, an adhesive layer 30, an electrode layer 40, a support layer (second support layer) 50, and a conductive layer (second conductive layer (conductor layer)) 60. An adhesive layer 11a may be additionally provided between the first exterior material 2a and the sensor 1. Further, an adhesive layer 11b may be additionally provided between the second exterior material 2b and the sensor 1.

The metal layer 10 is provided on one main surface side of the electrode layer 40, and the conductive layer 60 is provided on the other main surface side. The support layer 20 is provided between the electrode layer 40 and the metal layer 10. The support layer 50 is provided between the electrode layer 40 and the conductive layer 60. The adhesive layer 30 is provided between the support layer 20 and the electrode layer 40, and the support layer 20 and the electrode layer 40 are attached to each other via the adhesive layer 30. It should be noted that a configuration in which the adhesive layer 30 is omitted and the support layer 20 is provided directly on one main surface of the electrode layer 40 may also be adopted. The electrode layer 40 includes a plurality of detection sections 40s. Moreover, a unit detection area 40r is set so as to surround the detection sections 40s in the electrode layer 40.

(Metal Layer)

The metal layer 10 has flexibility and can therefore be deformed along with a deformation of the first exterior material 2a. The metal layer 10 is of a sheet type, a foil type, or a mesh type, for example. The metal layer 10 includes metal such as Cu (copper) and Al (aluminum) as main constituents. The thickness of the metal layer 10 is, for example, several ten nm to several ten μm, though not limited to this range. The metal layer 10 is connected to a ground potential, for example.

As a formation method of the metal layer 10, there are, for example, a method of attaching the metal layer 10 to a back surface 2n of the first exterior material 2a via the adhesive layer 11a, a method of directly forming the metal layer 10 on the back surface 2n of the first exterior material 2a by a vacuum deposition process using a sputtering method, a vapor deposition method, and the like, and a method of printing or applying a conductive paste onto the back surface 2n of the first exterior material 2a and dry-curing the paste, though not limited thereto.

(Adhesive Layer)

The adhesive layers 11a, 11b, and 30 are constituted of an adhesive or an adhesive tape having in insulation property, for example. As the adhesive, for example, one or more types selected from the group consisting of an acrylic-based adhesive, a silicone-based adhesive, a urethane-based adhesive, and the like can be used. In the present technology, the pressure sensitive adhesion is defined as a type of adhesion. According to this definition, a pressure-sensitive adhesive layer is assumed as one type of adhesive layer.

(Conductive Layer)

The conductive layer 60 constitutes a bottom portion of the sensor 1 and is arranged opposed to the metal layer 10 in the Z-axis direction. The conductive layer 60 has a higher bending rigidity than the exterior material 2, the metal layer 10, the electrode layer 40, and the like, for example, and functions as a support plate of the electronic underlay body 100. As the conductive layer 60, for example, a metal plate including a metal material such as an Al alloy and a Mg (magnesium) alloy, a conductor plate formed of a carbon fiber reinforced plastic or the like, or a laminated body in which a conductive layer such as a plated film, a vapor deposition film, a sputtering film, and a metal foil is formed on an insulation layer including a plastic material can be used. The thickness of the conductive layer 60 is, for example, about 0.3 mm, though the thickness is not particularly limited thereto. The conductive layer 60 is connected to a ground potential, for example.

The shape of the conductive layer 60 is, for example, a flat plate, though not limited thereto. For example, the conductive layer 60 may include a step section. Further, one or a plurality of apertures may be provided on the conductive layer 60. Furthermore, the conductive layer 60 may have a mesh-type configuration.

(Support Layer)

The support layer 20 includes a plurality of structures 21 and a frame body 22. The plurality of structures 21 and the frame body 22 are provided between the metal layer 10 and the electrode layer 40 and separate the metal layer 10 and the electrode layer 40 from each other. The plurality of structures 21 are arranged two-dimensionally at predetermined intervals on one main surface (XY plane) of the metal layer 10 or the conductive layer 60, and a spatial section 23 is provided between the structures 21.

The structure 21 includes a structure section 21a and a bonding section 21b. The structure section 21a has, for example, a cone shape, a column shape (e.g., cylindrical or polygonal), a needle-like shape, a shape as a partial sphere (e.g., hemisphere), a shape as a partial ellipse (e.g., semi-ellipse), or a polygonal shape, though not limited to those shapes, and other shapes may be adopted instead.

The structures 21 are arranged in correspondence with the detection sections 40s or the unit detection areas 40r, for example. The plurality of structures 21 are provided opposed to the plurality of detection sections 40s or unit detection areas 40r in the Z-axis direction, for example.

The frame body 22 includes a structure section 22a and a bonding section 22b. The structure section 22a is formed continuously so as to surround the circumference of one main surface of a substrate 25. The width of the frame body 22 is not particularly limited as long as a sufficient intensity of the support layer 20 and the entire electronic underlay body 100 can be secured. The thicknesses (heights) of the structure 21 and the frame body 22 are substantially the same and are, for example, several µm to several 100 µm.

As the material of the structure sections 21a and 22a, for example, a resin material having an insulation property is used. As such a resin material, a photo-curable resin such as an ultraviolet-curable resin can be used. As the material of the bonding sections 21b and 22b, for example, a resin material or the like having viscosity is used.

An elastic modulus of the structure section 21a is not particularly limited and can be selected as appropriate within a range in which a desired detection sensitivity can be obtained. For example, the structure section 21a has an elasticity with which it can be deformed along with the first exterior material 2a in accordance with a pressing of the surface 100m by the writing tool 91 or the like and with which the electrode layer 40 can be deformed.

The support layer 20 may additionally include a plurality of adhesion prevention sections 24. The adhesion prevention sections 24 are provided in the spatial sections 23 among the structures 21, more specifically, on one main surface of the electrode layer 40 in the spatial sections 23. The height of the adhesion prevention sections 24 is not particularly limited as long as it is smaller than that of the structures 21 and the frame body 22, and the adhesion prevention sections 24 are formed to be smaller than the structure sections 21a and 22a, for example. The shape of the adhesion prevention sections 24 is not particularly limited, and an island type, a flat film type, and the like may be adopted, for example.

The support layer 20 may have a laminated structure constituted of the substrate 25, a structure layer 26, and a bonding layer 27. The structure layer 26 is provided on one main surface of the substrate 25. The structure layer 26 includes the plurality of structure sections 21a and 22a that are arranged two-dimensionally at predetermined intervals on the one main surface of the substrate 25, for example. The bonding layer 27 includes the plurality of bonding sections 21b and 22b provided above the plurality of structure sections 21a and 22a.

The substrate 25 is a sheet having flexibility, for example. As a material of a substrate 41a, it is favorable to use a material having an insulation property and flexibility. Examples of such a material include polyethylene terephthalate (PET), polyethylene naphthalate (PEN), polycarbonate (PC), acrylic resin (PMMA) polyimide (PI), tri-acetylcellulose (TAC), polyester, polyamide (PA), aramid, polyethylene (PE), polyacrylate, polyether sulfone, polysulfone, polypropylene (PP), di-acetylcellulose, polyvinyl chloride, an epoxy resin, a urea resin, a urethane resin, a melamine resin, a cyclic olefin polymer (COP), and a norbornene-based thermoplastic resin. The thickness of the substrate 25 is, for example, several µm to several 100 µm, though not limited to this range.

(Support Layer)

The support layer 50 includes a plurality of structures 51 and a frame body 52. The plurality of structures 51 and the frame body 52 are provided between the electrode layer 40 and the conductive layer 60 and separate the electrode layer 40 and the conductive layer 60 from each other. The plurality of structures 51 are arranged two-dimensionally at predetermined intervals on one main surface of the electrode layer 40 or the conductive layer 60, and a spatial section 53 is provided between the structures 51. The spatial section 53 is also provided between the structure 51 and the frame body 52. The spatial sections 53 are arranged so as to overlap the detection sections 40s when looking at the electronic underlay body 100 in the Z-axis direction.

When looking at the electronic underlay body 100 in the Z-axis direction, the structure 51 is arranged between the adjacent structures 21. Specifically, the structures 51 are arranged in correspondence with the arrangement of the detection sections 40s such that each structure 51 is arranged between the adjacent detection sections 40s.

The frame body 52 is formed continuously so as to surround the circumference of the one main surface of the electrode layer 40 or the conductive layer 60. The width of the frame body 52 is not particularly limited as long as a sufficient intensity of the support layer 50 and the entire electronic underlay body 100 can be secured, and is substantially the same as that of the frame body 22, for example.

As the material of the structures 51 and the frame body 52, for example, a resin material having a viscosity and an insulation property is used. The structures 51 and the frame body 52 has, in addition to the function as the separation section that separates the electrode layer 40 and the conductive layer 60 from each other, a function as a bonding section that bonds the electrode layer 40 and the conductive layer 60.

Figure 9:
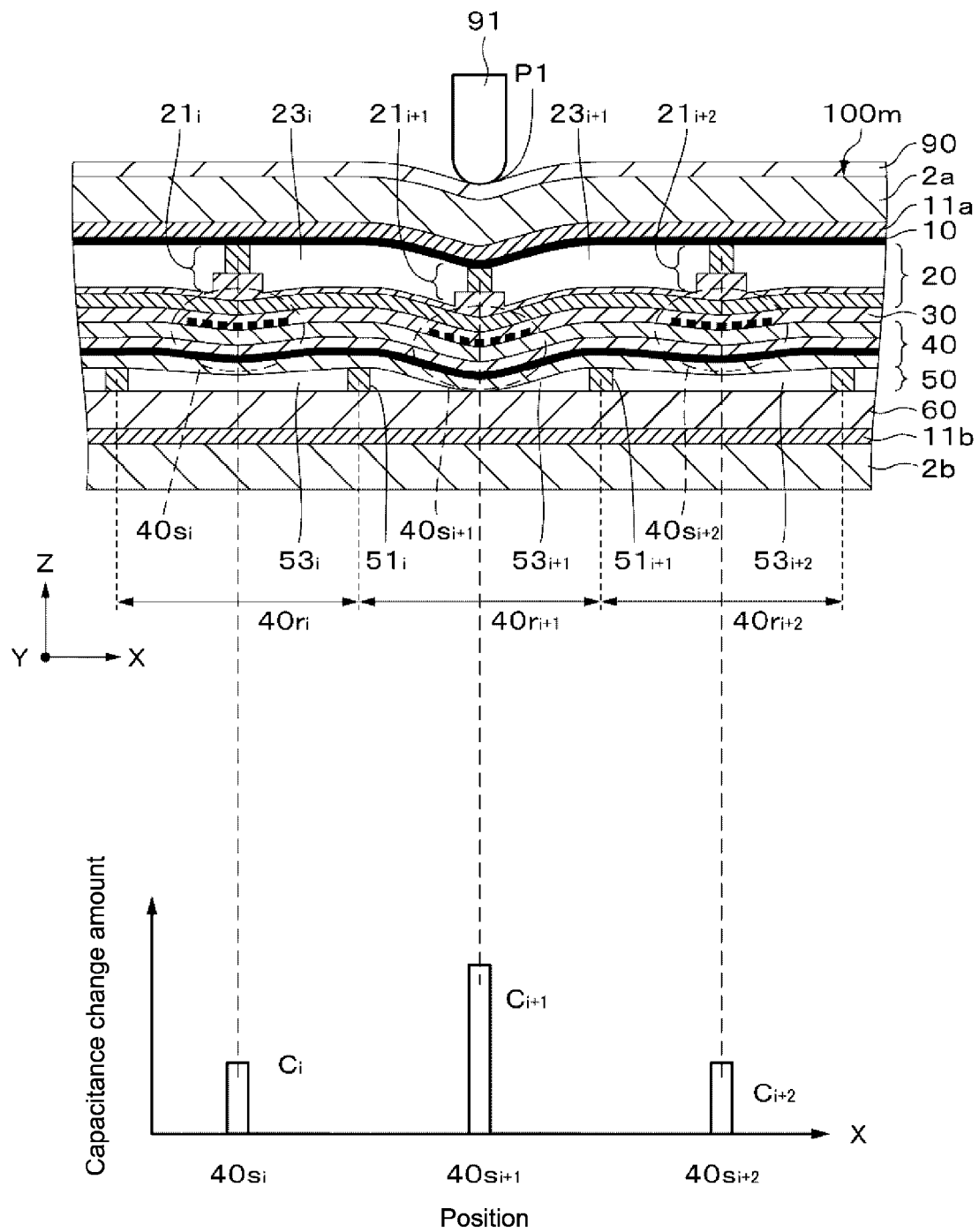
FIG. 9 is a diagram showing a relationship between a state of the electronic underlay body when a position of the structure is pressed by the writing tool and a capacitance change amount of each detection section at that time.

The thicknesses of the structures 51 and the frame body 52 are, for example, several µm to several 100 µm, though not limited to this range. It should be noted that it is favorable for the thickness of the structures 51 to be smaller than that of the structures 21. This is because a large capacitance change amount can be acquired when the electrode layer 40 is deformed until it touches the conductive layer 60 as shown in FIG. 9.

The elastic modulus of the structures 51 is not particularly limited and can be selected as appropriate within a range in which a desired detection sensitivity can be obtained. For example, the structures 51 have an elasticity with which it can be deformed along with the electrode layer 40 in accordance with a pressing of the surface 100m by the writing tool 91 or the like.

(Electrode Layer)

The electrode layer 40 has flexibility and is deformable in accordance with the pressing of the surface 100m by the writing tool 91 or the like. The electrode layer 40 is provided between the metal layer 10 and the conductive layer 60 and is capable of electrostatically detecting a distance change with respect to the metal layer 10 and the conductive layer 60.

The electrode layer 40 is a laminated body including an X electrode device (first electrode device) 41, a Y electrode device (second electrode device) 42, and an adhesive layer 43. The adhesive layer 43 is provided between the X electrode device 41 and the Y electrode device 42, and the X electrode device 41 and the Y electrode device 42 are attached to each other via the adhesive layer 43.

(Adhesive Layer)

The adhesive layer 43 is similar to the adhesive layers 11a, 11b, and 30 described above.

(X and Y Electrode Devices)

The X electrode device 41 includes the substrate 41a and a plurality of X electrodes 41b, for example. The plurality of X electrodes 41b is provided on one main surface of the substrate 41a, for example. The Y electrode device 42 includes a substrate 42a and a plurality of Y electrodes 42b. The plurality of Y electrodes 42b is provided on one main surface of the substrate 42a.

(Substrate)

The substrates 41a and 42a are each a sheet having flexibility. As the material of the substrates 41a and 42a, a material having an insulation property and flexibility can be used. Examples of such a material include polyethylene terephthalate (PET), polyethylene naphthalate (PEN), polycarbonate (PC), acrylic resin (PMMA) polyimide (PI), tri-acetylcellulose (TAC), polyester, polyamide (PA), aramid, polyethylene (PE), polyacrylate, polyether sulfone, polysulfone, polypropylene (PP), di-acetylcellulose, polyvinyl chloride, an epoxy resin, a urea resin, a urethane resin, a melamine resin, a cyclic olefin polymer (COP), and a norbornene-based thermoplastic resin. The thicknesses of the substrates 41a and 42a are, for example, several 10 μm to several 100 μm, though not limited to this range.

(X and Y Electrodes)

Figure 5:
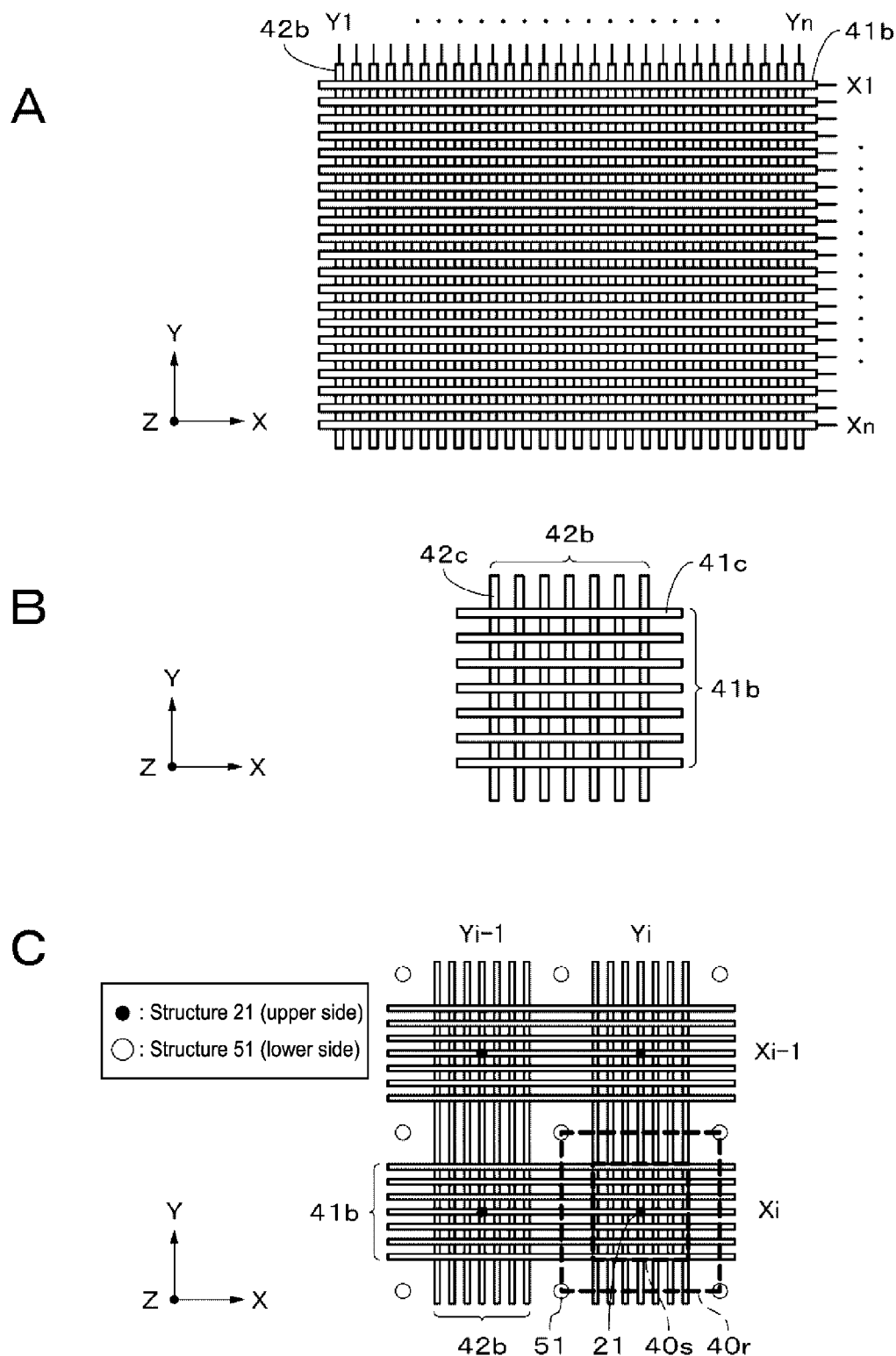
FIG. 5A is a schematic diagram showing an arrangement example of X and Y electrodes.
FIG. 5B is a schematic diagram showing a configuration example of the X and Y electrodes.
FIG. 5C is a schematic diagram for describing a unit detection area.

FIG. 5A is a schematic diagram showing an arrangement example of the X and Y electrodes 41b and 42b. As shown in FIG. 5A, when seen from the Z-axis direction, the plurality of X electrodes 41b and the plurality of Y electrodes 42b intersect orthogonally.

When seen from the Z-axis direction, the plurality of X electrodes 41b are arranged in stripes extending in the X-axis direction. More specifically, the plurality of X electrodes 41b extend practically linearly in the X-axis direction and are arranged at predetermined intervals in the Y-axis direction. Each of the plurality of X electrodes 41b is led to a circumferential section of the substrate 41a by a lead line and the like to be electrically connected to each of a plurality of X electrode terminals. Then, the plurality of X electrodes 41b are electrically connected to a control apparatus 71 via the plurality of X electrode terminals.

When seen from the Z-axis direction, the plurality of Y electrodes 42b are arranged in stripes extending in the Y-axis direction. More specifically, the plurality of Y electrodes 42b extend practically linearly in the Y-axis direction and are arranged at predetermined intervals in the X-axis direction. Each of the plurality of Y electrodes 42b is led to a circumferential section of the substrate 42a by a lead line and the like to be electrically connected to each of a plurality of terminals. Then, the plurality of X electrodes 41b are electrically connected to the control apparatus 71 via the terminals.

As a method of forming the X and Y electrodes 41b and 42b, for example, printing methods such as a screen printing method, a gravure offset printing method, and an inkjet printing method or a patterning method that uses a photolithography technology can be used.

FIG. 5B is a schematic diagram showing a configuration example of the X and Y electrodes 41b and 42b. The X electrode 41b is constituted by an electrode group constituted of a group of a plurality of sub-electrodes (first electrode devices) 41c. The sub-electrodes 41c are linear conductive members extending in the X-axis direction, for example. The plurality of sub-electrodes 41c may be connected to a common terminal or separately connected to two or more different terminals.

The Y electrode 42b is constituted by an electrode group constituted of a group of a plurality of sub-electrodes (second electrode devices) 42c. The sub-electrodes 42c are linear conductive members extending in the Y-axis direction, for example. The sub-electrodes 42c may be connected to a common terminal or separately connected to two or more different terminals.

It should be noted that the configurations of the X and Y electrodes 41b and 42b are not limited to those described above, and one of the X and Y electrodes 41b and 42b may be constituted by the sub-electrodes. When such a configuration is adopted, it is favorable for the X electrodes 41b to be provided between the plurality of Y electrodes 42b and the metal layer 10, and the X electrodes 41b out of the X electrodes 41b and the Y electrodes 42b to be constituted by the plurality of sub-electrodes.

(Detection Section)

The electrode layer 40 includes the plurality of detection sections 40s. Each of the plurality of detection sections 40s is formed at an intersection area of the X electrode 41b and the Y electrode 42b. The detection sections 40s detect a capacitance that changes according to a relative distance with respect to the metal layer 10 and the conductive layer 60. It is also possible to constitute a group in which the plurality of structures 21 are associated with each of the detection sections 40s. It is also possible to constitute a group in which the plurality of structures 51 are associated with each of the detection sections 40s. The plurality of structures 21 and 51 structuring those groups may be arranged symmetrically with respect to the center of each detection section (intersection area) 40s, more specifically, in a line symmetry with respect to the center line of each of the X and Y electrodes 41b and 42b.

Figure 6:
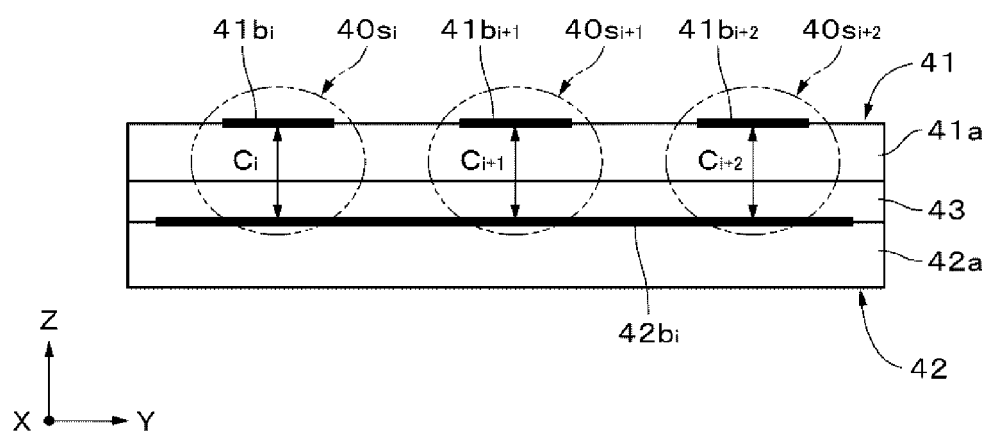
FIG. 6 is a cross-sectional diagram for describing a configuration example of a detection section.

FIG. 6 is a cross-sectional diagram for describing a configuration example of the detection sections 40s. The detection sections 40s are each a mutual capacitance type capacitance device that includes the X electrode 41b, the Y electrode 42b opposing the X electrode 41b, and a dielectric layer provided between the X and Y electrodes 41b and 42b. It should be noted that FIG. 6 shows an example where the X and Y electrodes 41b and 42b are constituted of a single electrode wire.

FIG. 6 shows an example where X electrodes $41b_i$, $41b_{i+1}$, and $41b_{i+2}$ are opposed to a Y electrode $42b_i$ in the Z-axis direction. In this example, the X electrode device 41 and the Y electrode device 42 are bonded to each other by the adhesive layer 43, and the substrate 41a of the X electrode device 41 and the adhesive layer 43 constitute the dielectric layer. In this case, detection sections $40s_i$, $40s_{i+1}$, and $40s_{i+2}$ are formed in the intersection areas where the X electrodes $41b_i$, $41b_{i+1}$, and $41b_{i+2}$ and the Y electrode $42b_i$ are capacitively coupled, and capacitances $C_i$, $C_{i+1}$, and $C_{i+2}$ change according to the capacitive coupling of the metal layer 10 and the conductive layer 60 with the X electrodes $41b_i$, $41b_{i+1}$, and $41b_{i+2}$ and the Y electrode $42b_i$. It should be noted that an initial capacitance of the detection sections 40s is set based on an opposing area between the X and Y electrodes 41b and 42b, an opposing distance between the X and Y electrodes 41b and 42b, and a dielectric constant of the adhesive layer 43, for example.

Each of the plurality of detection sections 40s may be arranged opposite to the structures 21 or the group constituted of the structures 21 in the Z-axis direction. Alternatively, each of the plurality of detection sections 40s may be arranged opposite to the structures 51 or the group constituted of the structures 51 in the Z-axis direction. Moreover, although the X electrode device 41 is laminated above the Y electrode device 42 in this embodiment, the present technology is not limited thereto, and the Y electrode device 42 may be laminated above the X electrode device 41.

(Unit Detection Area)

FIG. 5C is a schematic diagram for describing the unit detection area 40r. The unit detection area 40r is provided in correspondence with the intersections of the X and Y electrodes 41b and 42b. The unit detection area 40r includes the detection section 40s provided at the intersection of the X and Y electrodes 41b and 42b. The plurality of unit detection areas 40r are filled and arranged two-dimensionally in the X-axis direction (first direction) and the Y-axis direction (second direction), for example. The unit detection area 40r has a square shape or a rectangular shape that is constituted of a pair of sides extending in the X-axis direction and a pair of sides extending in the Y-axis direction, for example. When the unit detection area 40r has a square shape or a rectangular shape, the filling arrangement of the plurality of unit detection areas 40r is a lattice-like (matrix-like) filling arrangement.

Each of the plurality of structures 51 is arranged between the adjacent unit detection areas 40r, for example. In other words, the plurality of structures 51 are arranged on an outer circumference (circumference) of the unit detection areas 40r, for example. Moreover, the plurality of structures 51 are arranged symmetrically with respect to the center of the unit detection area 40r, for example.

When the unit detection area 40r has a square shape or a rectangular shape, the arrangement positions of the structures 51 are intermediate positions of the sides forming the unit detection area 40r, apexes (corners) of the unit detection area 40r, the vicinity of the apexes (corners) of the unit detection area 40r, and the like, and two or more of those positions may be combined. FIG. 5C shows an example where the structures 51 are arranged at the apexes (corners) of the unit detection area 40r.

(Arrangement Example)

Figure 7:
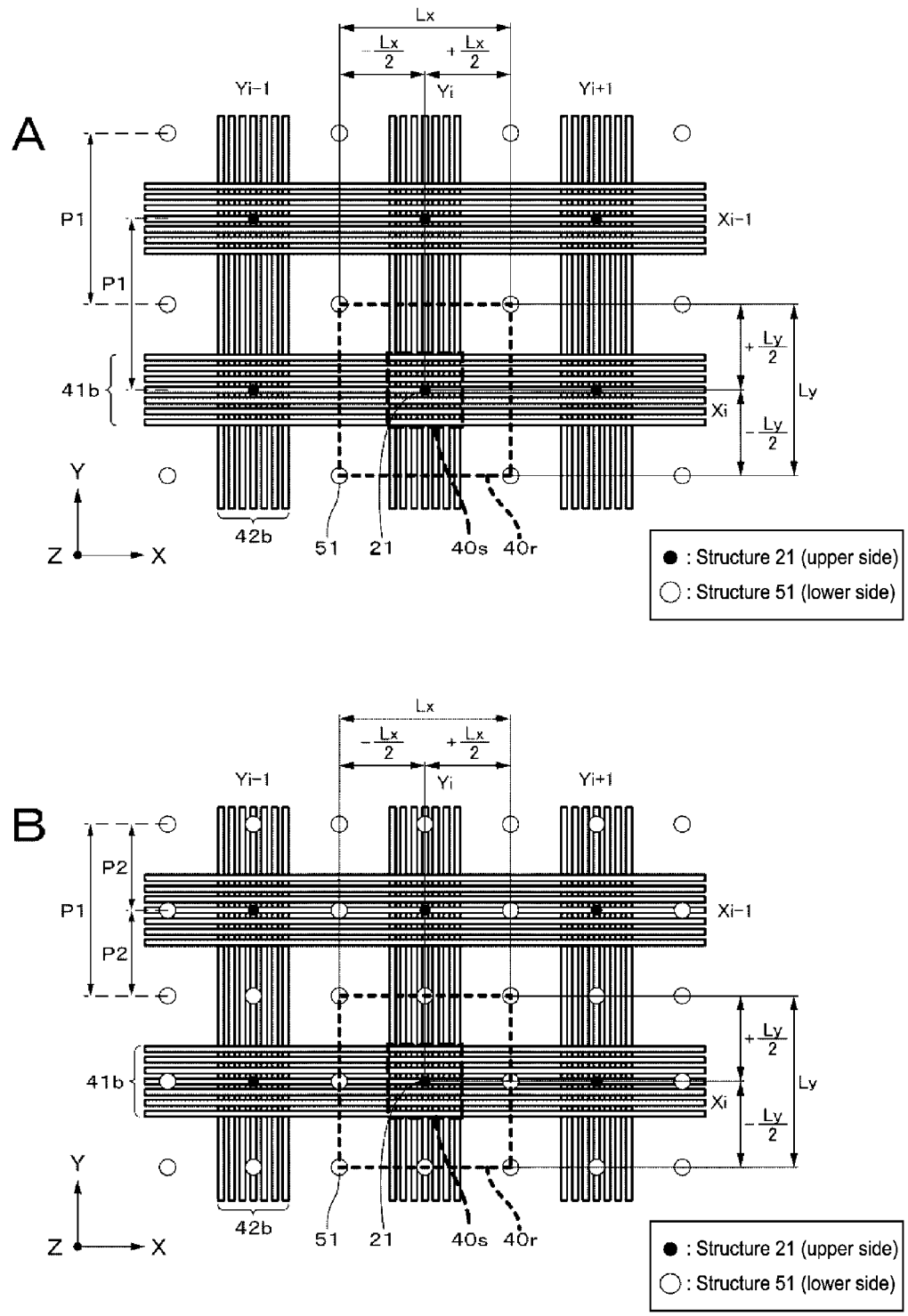
FIG. 7A is a plan view showing an arrangement example of structures and the X and Y electrodes.
FIG. 7B is a plan view showing another arrangement example of the structures and the X and Y electrodes.

FIG. 7A shows an example where the number of structures 21 and the number of structures 51 are substantially the same. The structures 21 are each arranged at substantially the center of the detection sections 40s. A pitch of the structures 21 in the X-axis direction and the Y-axis direction is the same as that of the detection sections 40s in the X-axis direction and the Y-axis direction and is indicated by P1. On the other hand, the structures 51 are arranged at the same pitch P1 as the structures 21 between the structures 21 or detection sections 40s adjacent to each other in an oblique direction about 45 degrees from the X-axis direction and the Y-axis direction at regular intervals.

FIG. 7B shows an example where the number of structures 21 and the number of structures 51 differ. As in the example shown in FIG. 7A, the structures 21 are arranged at the pitch P1 at substantially the center of the detection sections 40s. On the other hand, the structures 51 differ in the arrangement and number from FIG. 7A and are arranged at a pitch P2 that is ½ the pitch P1 of the structures 21. When seen from the Z-axis direction, the structures 51 are arranged so as to surround the circumferences of the structures 21 and the detection sections 40s. By arranging more structures 51 than the structures 21, the intensity of the entire electronic underlay body 100 can be enhanced.

Further, by adjusting the numbers and arrangements (pitches) of the structures 21 and 51, a distance change amount of the detection sections 40s from the metal layer 10 and the conductive layer 60 with respect to a pressing force can be adjusted so that a desired detection sensitivity can be obtained.

It is favorable for the support layers 20 and 50 to have characteristics that (1) the support layers 20 and 50 include the structures 21 and 51 and the spatial sections 23 and 53, (2) the structures 21 and the structures 51 do not overlap one another in the Z-axis direction, and the structures 21 are arranged above the spatial sections 53. This is because it becomes possible to deform the metal layer 10 and the conductive layer 60 even with a minute pressing force of about several ten grams at the time of writing and the like.

1.2 Detection Operation of Sensor

Figure 8:
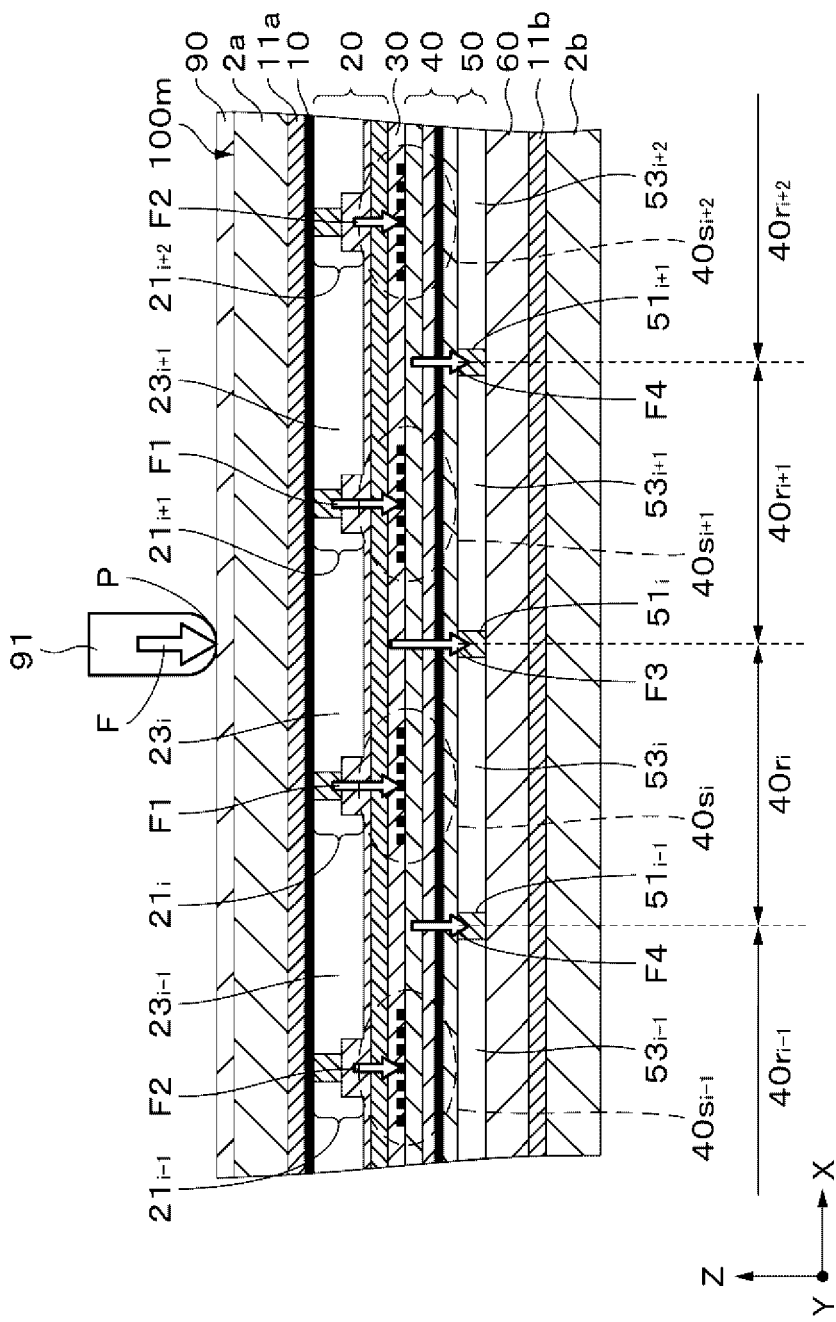
FIG. 8 is a cross-sectional diagram showing a state of a force applied to the structures when a surface of the electronic underlay body is pressed in a Z-axis direction (downward) by a writing tool.

FIG. 8 is a schematic cross-sectional diagram showing a state of a force applied to the structures 21 and 51 when a point P on the surface 100m is pressed downward in the Z-axis direction (downward) by the writing tool 91. The white arrows shown in the figure schematically indicate magnitudes of the force in the downward Z-axis direction (hereinafter, simply referred to as "downward"). In FIG. 8, states of the deflection of the metal layer 10, the electrode layer 40, and the like, the elastic deformation of the structures 21 and 51, and the like are not shown.

When the point P above the spatial section $23_i$ is pressed downward by a force F, for example, the metal layer 10 immediately below the point P is bent downwardly. At the same time, the structures $21_i$ and $21_{i+1}$ adjacent to the spatial section $23_i$ receive a force F1 to be elastically deformed in the Z-axis direction, and thicknesses thereof slightly reduce. In addition, by the deflection of the metal layer 10, the structures $21_{i-1}$ and $21_{i+2}$ adjacent to the structures $21_i$ and $21_{i+1}$ also receive a force F2 smaller than F1. Further, by the forces F1 and F2, a force is also applied to the electrode layer 40 so that mainly the areas immediately below the structures $21_i$ and $21_{i+1}$ are deflected downward. Accordingly, the structure $51_i$ arranged between the structures $21_i$ and $21_{i+1}$ receives a force F3 to be elastically deformed in the Z-axis direction, and a thickness thereof slightly reduces. In addition, the structure $51_{i-1}$ arranged between the structures $21_{i-1}$ and $21_i$ and the structure $51_{i+1}$ arranged between the structures $21_{i+1}$ and $21_{i+2}$ also receive a force F4 smaller than F3.

As described above, forces can be transmitted in the thickness direction by the structures 21 and 51, and the electrode layer 40 can be easily deformed. Moreover, by the deflection of the metal layer 10 and the electrode layer 40 and the pressing force affecting in the in-plane direction (direction parallel to X-axis direction and Y-axis direction), the force can be applied to not only the areas immediately below the writing tool 91 but also the structures 21 and 51 in the vicinity thereof.

Further, the metal layer 10 and the electrode layer 40 can be easily deformed by the spatial sections 23 and 53. Furthermore, by the structures 21 and 51 constituted of a column or the like, a high pressure can be applied to the electrode layer 40 with respect to the pressing force of the writing tool 91, with the result that the electrode layer 40 can be deflected efficiently.

Moreover, since the structures 21 and 51 do not overlap one another in the Z-axis direction, the structures 21 can easily cause a deflection of the electrode layer 40 toward the conductive layer 60 via the spatial sections 53 provided below the structures 21.

Hereinafter, a specific example of the capacitance change amount of the detection sections 40s at a time an operation is made will be described.

Figure 10:
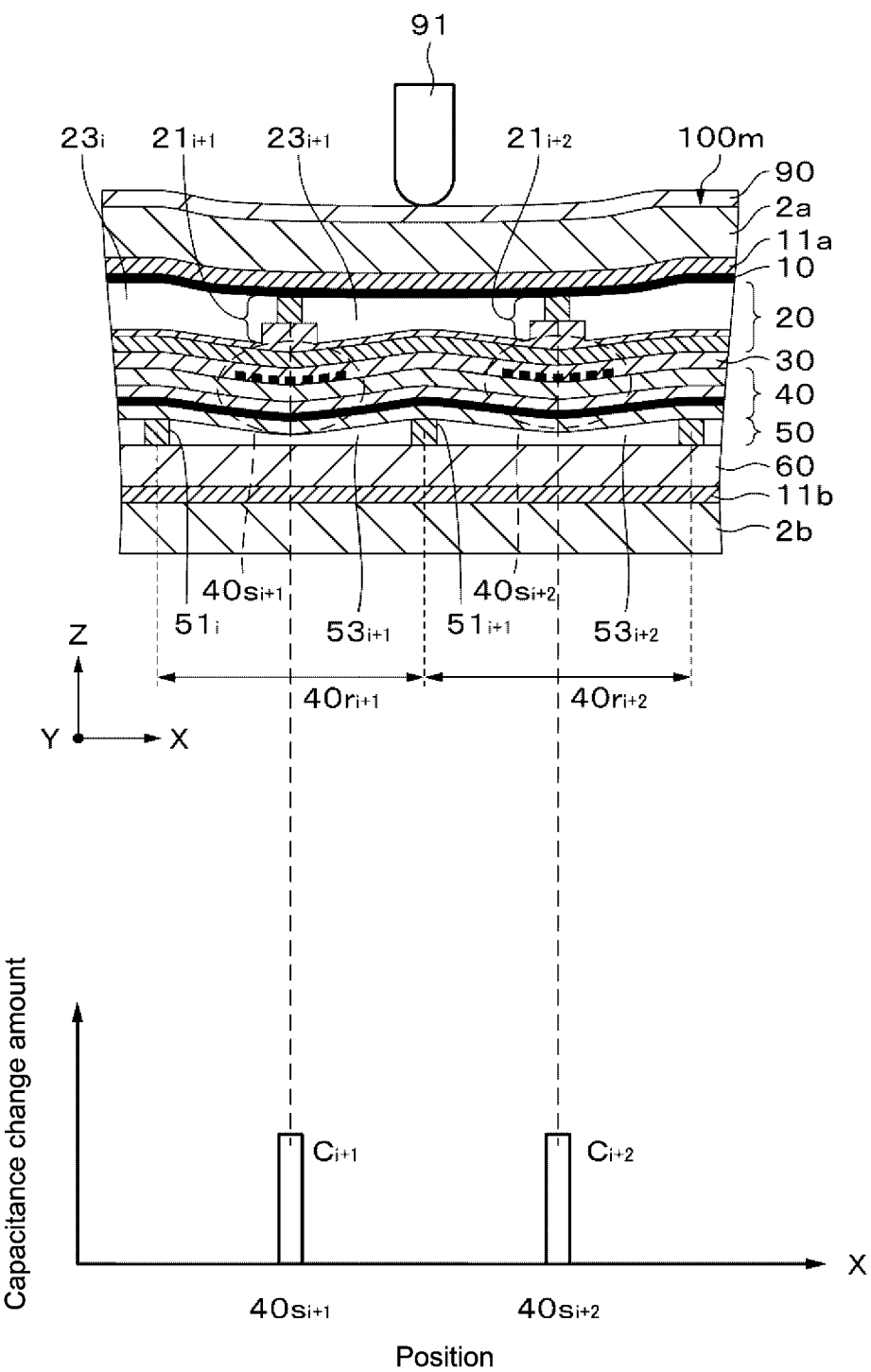
FIG. 10 is a diagram showing a relationship between a state of the electronic underlay body when a position on a spatial section is pressed by the writing tool and a capacitance change amount of each detection section at that time.

FIGS. 9 and 10 are cross-sectional diagrams showing a state of the electronic underlay body 100 at a time the surface 100m is pressed by the writing tool 91 and diagrams showing an example of the capacitance change amount of each detection section 40s at that time. The bar graphs shown along the X axis in FIGS. 9 and 10 schematically show a change amount of a capacitance from its reference value in each detection section 40s. Further, FIG. 9 shows a state at a time the writing tool 91 presses the center of the unit detection area 40r, that is, a position above the structure 21 ($21_{i+1}$), and FIG. 10 shows a state at a time the writing tool 91 presses an intermediate position between the adjacent unit detection areas 40r, that is, a position above the spatial section 23 ($23_{i+1}$).

In FIG. 9, the structure $21_{i+1}$ immediately below the pressing position receives a largest force so as to be elastically deformed and displaced downwardly. By such a displacement, the detection section $40s_{i+1}$ immediately below the structure $21_{i+1}$ is displaced downwardly. Accordingly, the detection section $40s_{i+1}$ is brought close to or in contact with the conductive layer 60 via the spatial section $53_{i+1}$. Specifically, by the distance between the detection section $40s_{i+1}$ and the metal layer 10 changing slightly and the distance between the detection section $40s_{i+1}$ and the conductive layer 60 changing largely, a capacitance change amount $C_{i+1}$ is obtained. On the other hand, by the influence of the deflection of the metal layer 10, the structures $21_i$ and $21_{i+2}$ are also displaced downwardly, and capacitance change amounts of the detection sections $40s_i$ and $40s_{i+2}$ become $C_i$ and $C_{i+2}$.

In the example shown in FIG. 9, $C_{i+1}$ is the largest, and $C_i$ and $C_{i+2}$ are substantially the same and smaller than $C_{i+1}$. Specifically, as shown in FIG. 9, the capacitance change amounts $C_i$, $C_{i+1}$, and $C_{i+2}$ show a chevron shape with $C_{i+1}$ as an apex. In this case, the control apparatus 71 may calculate a barycenter or the like based on a ratio of $C_i$, $C_{i+1}$, and $C_{i+2}$ and calculate XY coordinates above the detection section $40s_{i+1}$ as the pressing position.

On the other hand, in FIG. 10, the structures $21_{i+1}$ and $21_{i+2}$ in the vicinity of the pressing position are slightly elastically deformed by the deflection of the metal layer 10 to be displaced downwardly. By such a displacement, the electrode layer 40 is deflected, and the detection sections $40s_{i+1}$ and $40s_{i+2}$ immediately below the structures $21_{i+1}$ and $21_{i+2}$ are also displaced downwardly. Accordingly, the detection sections $40s_{i+1}$ and $40s_{i+2}$ are brought close to or in contact with the conductive layer 60 via the spatial sections $53_{i+1}$ and $53_{i+2}$. Specifically, by the distance between the detection sections $40s_{i+1}$ and $40s_{i+2}$ and the metal layer 10 changing slightly and the distance between the detection sections $40s_{i+1}$ and $40s_{i+2}$ and the conductive layer 60 changing relatively largely, capacitance change amounts $C_{i+1}$ and $C_{i+2}$ are obtained. The change amounts $C_{i+1}$ and $C_{i+2}$ are substantially the same. Based on the change amounts $C_{i+1}$ and $C_{i+2}$, the control apparatus 71 may calculate the XY coordinates between the detection sections $40s_{i+1}$ and $40s_{i+2}$ as the pressing position.

As described above, according to this embodiment, since both the thickness of the detection sections 40s and the metal layer 10 and the thickness of the detection sections 40s and the conductive layer 60 can be varied by the pressing force, the capacitance change amount in the detection sections 40s can be increased. Accordingly, handwriting information detection sensitivity can be enhanced.

Further, even when the pressing position on the surface 100m is a position above the structure 21 or the spatial section 23, the XY coordinates of the pressing position can be calculated. Specifically, by the metal layer 10 spreading the influence of the pressing force in the in-plane direction, a capacitance change can also be caused in the detection section 40s in the vicinity of the pressing position in the Z-axis direction. Accordingly, it is possible to suppress variations in the detection sensitivity within the surface 100m and maintain a high detection sensitivity on the entire surface 100m.

1.3 Configuration of Electrical Circuit

Figure 11:
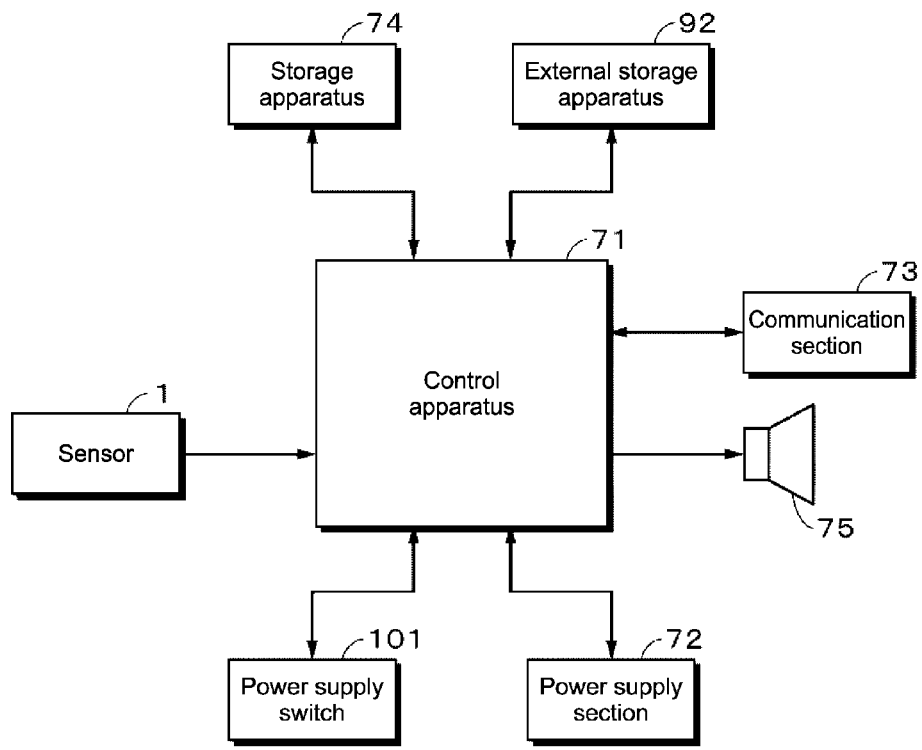
FIG. 11 is a block diagram showing a configuration example of an electrical circuit of the electronic underlay body according to the first embodiment of the present technology.

As shown in FIG. 11, the electronic underlay body 100 includes the sensor 1, the control apparatus 71, a power supply section 72, a communication section 73, a storage apparatus 74, a speaker 75, and a power supply switch 101. The electronic underlay body 100 also includes the slot 102 shown in FIG. 1, and the external storage apparatus 92 is detachable via the slot 102.

(Control Section)

The control apparatus 71 is electrically connected to the electrode layer 40. More specifically, the control apparatus 71 is connected to the plurality of X and Y electrodes 41b and 42b via a terminal. The control apparatus 71 is constituted of, for example, a CPU (Central Processing Unit) and a memory. The control apparatus 71 executes various functions according to programs stored in the memory. The control apparatus 71 may be constituted of a single chip component or a plurality of circuit components. The control apparatus 71 includes a signal processing section that carries out processing for a noise reduction, compression, and the like on a detection signal acquired by the sensor 1.

The control apparatus 71 controls the sensor 1 and acquires a pressure distribution at a predetermined cycle. Specifically, the control apparatus 71 scans the plurality of X and Y electrodes 41b and 42b and detects a capacitance in the detection sections 40s. Accordingly, a pressure distribution (capacitance distribution) can be acquired. The control apparatus 71 may carry out the processing for a noise reduction, compression, and the like on the acquired pressure distribution.

The control apparatus 71 may judge whether writing is performed on the paper sheet 90 on the surface 100m. Specifically, for example, it can be judged that writing is performed on the paper on the surface 100m when a capacitance change amount of the entire detection sections 40s, a capacitance change amount of each of the detection sections 40s, or the like is equal to or larger than a predetermined threshold value. Further, by providing two or more threshold values, the judgment may be made by distinguishing writing pressure of the writing tool 91 from a pressing by moves other than the writing, for example. Furthermore, it is also possible to calculate the pressing force based on the capacitance change amount of the detection sections 40s.

The control apparatus 71 stores the pressure distribution acquired by the sensor 1 in the storage apparatus 74 as handwriting information. It should be noted that the storage destination of the handwriting information is not limited to the storage apparatus 74, and the handwriting information may be stored in the external storage apparatus 92 or in both of the storage apparatus 74 and the external storage apparatus 92. Moreover, the handwriting information may be supplied to a personal computer (hereinafter, referred to as "PC") via the communication section 73.

The control apparatus 71 may extract, from the pressure distribution acquired by the sensor 1, a pen-point position of the writing tool or a pen-point position and writing pressure of the writing tool. The control apparatus 71 may also generate handwriting image data by image recognition from the pressure distribution acquired by the sensor 1 or generate character data corresponding to the handwriting by a character recognition from the pressure distribution acquired by the sensor 1. The control apparatus 71 may carry out the processing for noise reduction, compression, and the like on those data. The control apparatus 71 may store at least one type of those data in the storage apparatus 74 in place of or in addition to the pressure distribution described above.

(Power Supply Section)

The power supply section is a battery that supplies power to the electrical circuit of the electronic underlay body 100. As the battery, a secondary battery, a solar cell, or the like is favorably used, or both of them may be used in conjunction. As the secondary battery, it is favorable to use an all-solid-state thin film secondary battery such as an all-solid-state lithium ion secondary battery in view of thinning of the electronic underlay body 100. It is also possible for the electronic underlay body 100 to additionally include a connection terminal (not shown) for connecting the power supply section 72 to an external power supply so that the power supply section 72 is charged by the external power supply via the connection terminal.

(Communication Section)

The communication section 73 is used for communicating with an external apparatus (not shown) such as a PC in a wired or wireless manner. For example, handwriting information or the like is supplied from the electronic underlay body 100 to the external apparatus via the communication section 73.

(Storage Apparatus)

The storage apparatus 74 stores handwriting information detected by the sensor 1. As the storage apparatus 74, for example, a nonvolatile memory such as a semiconductor memory can be used.

(Power Supply Switch)

The power supply switch 101 is a switch for turning on/off the power of the electronic underlay body 100.

(External Storage Apparatus)

The external storage apparatus 92 stores handwriting information detected by the sensor 1, for example. The external storage apparatus 92 is detachable from the slot 102. As the external storage apparatus 92, for example, an external storage apparatus including a flash memory can be used. Examples of such a recording apparatus include a USB (Universal Serial Bus) memory and a memory card.

(Speaker)

The speaker 75 is an output section that outputs sounds such as a beep sound, audio, and music according to various operations of the electronic underlay body 100, for example.

1.4 Operation of Electronic Underlay Body

Figure 12:
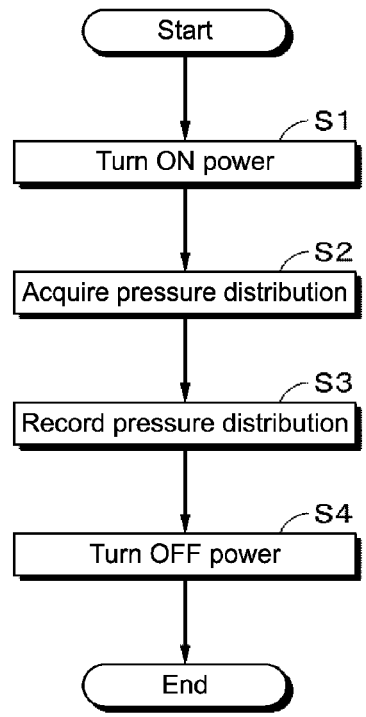
FIG. 12 is a flowchart for describing an operational example of the electronic underlay body according to the first embodiment of the present technology.

With reference to FIG. 12, an operational example of the electronic underlay body 100 according to the first embodiment of the present technology will be described. First, when the control apparatus 71 detects that the power supply switch 101 is turned ON by a user in Step S1, the control apparatus 71 acquires a pressure distribution on the surface 100m at a predetermined cycle from the sensor 1 in Step S2.

Next, in Step S3, the control apparatus 71 stores the pressure distribution acquired at the predetermined cycle in Step S2 in the storage apparatus 74 as handwriting information. Accordingly, a time sequence change of the pressure distribution is stored. At this event, a pen-point position and writing pressure of the writing tool 91 may be extracted from the pressure distribution acquired at the predetermined cycle and stored in the storage apparatus 74 as handwriting information. Moreover, handwriting image data may be generated by the image recognition from the pressure distribution acquired at the predetermined cycle and stored in the storage apparatus 74 as handwriting information. Further, character data may be generated by the character recognition from the pressure distribution acquired at the predetermined cycle and stored in the storage apparatus 74. Furthermore, handwriting information may be supplied to an external apparatus such as a PC via the communication section 73. Next, when the control apparatus 71 judges that the power supply switch 101 is turned OFF by the user in Step S4, the control apparatus 71 ends the storage of the pressure distribution in the storage apparatus 74.

1.5 Effect

In the electronic underlay body 100 according to the first embodiment, when the paper sheet 90 is placed on the surface 100m and a character is written on the paper using a general-purpose writing tool 91, etc., handwriting information corresponding thereto is detected by the sensor 1. Then, the detected handwriting information is stored in the storage apparatus 74. Using the handwriting information (e.g., time sequence pressure distribution) stored in the storage apparatus 74, the handwriting can be reproduced in time sequence. Moreover, there is no need to use a writing tool including a special electrical mechanism as the writing tool. In other words, there is no need to develop an electronic ballpoint pen, an electronic eraser, an electronic ink brush, a special paper, and the like. Therefore, a simple and inexpensive electronic underlay body 100 can be obtained.

When a task of drawing and erasing a figure on the paper sheet 90 using a general-purpose pencil and eraser is repeated, the procedure can be electronically stored and reproduced afterwards. Further, a calligraphy handwriting using an ink brush and an ink can be stored as handwriting information together with pressures of a stroke order, a stroke stop, and a stroke splash and reproduced afterwards. For example, using the stored handwriting information, it is also possible to check handwriting on a screen of a display apparatus at a distant location or cause a robot arm to reproduce the handwriting. Moreover, it is also possible to electronically recognize characters, figures, and the like written/drawn with a general-purpose writing tool 91 such as a pencil and convert them into character string data and shaped figure data for use.

1.6 Modified Example

Modified Example 1

The first embodiment above has described the example where the X and Y electrodes 41b and 42b are constituted of a plurality of linear sub-electrodes 41c and 42c (see FIG. 5B), but the configurations of the X and Y electrodes 41b and 42b are not limited thereto.

Figure 13:
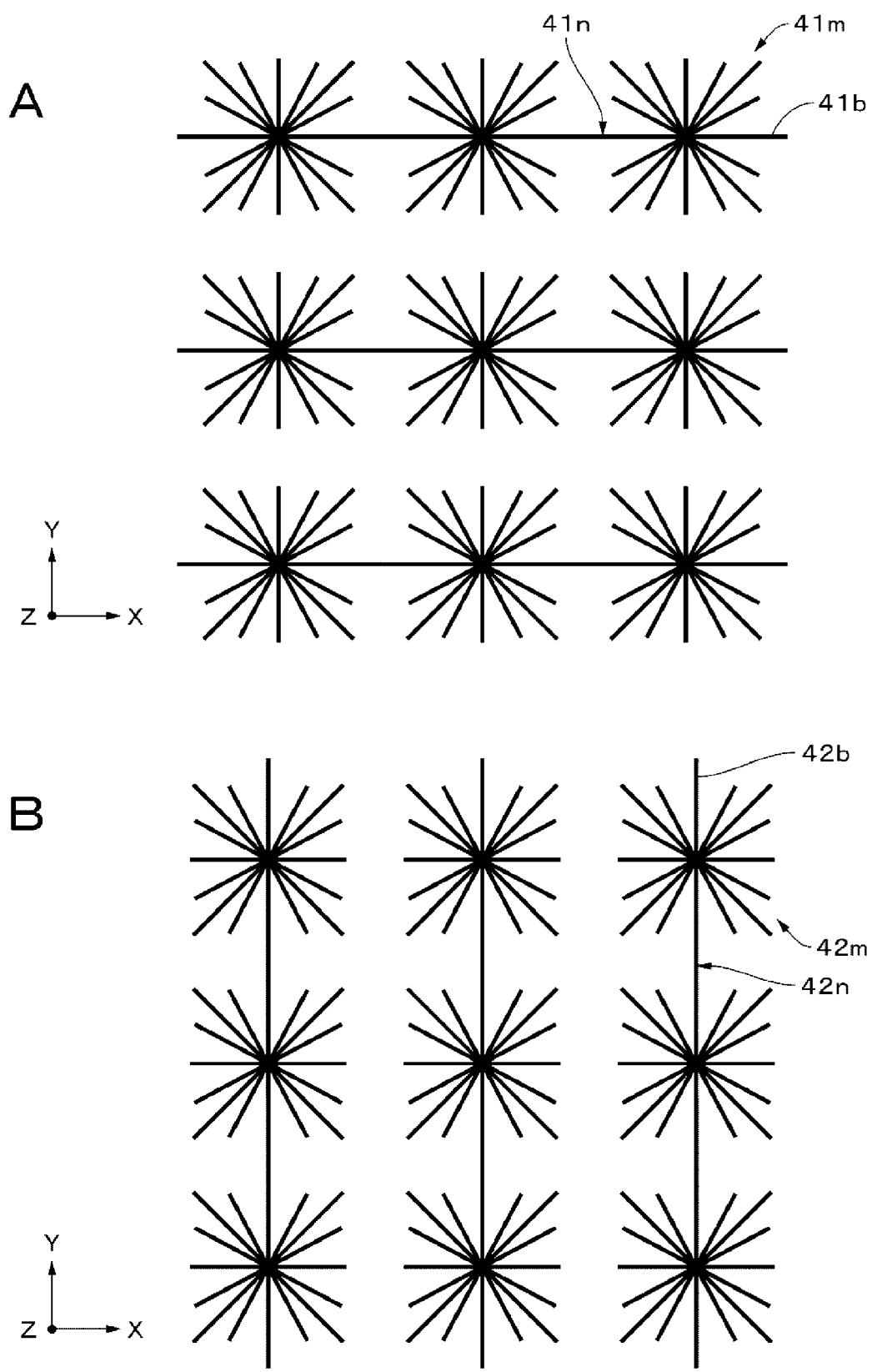
FIG. 13A is a plan view showing a modified example of the X electrodes.
FIG. 13B is a plan view showing a modified example of the Y electrodes.

FIG. 13A is a plan view showing a modified example of the X electrodes 41b. The X electrodes 41b include a plurality of unit electrode bodies 41m and a plurality of coupling sections 41n that couple the plurality of unit electrode bodies 41m. The unit electrode bodies 41m are each constituted of an aggregation of a plurality of linear electrode patterns extending radially from the center. The coupling sections 41n extend in the X-axis direction and couple the adjacent unit electrode bodies 41m.

FIG. 13B is a plan view showing a modified example of the Y electrodes 42b. The Y electrodes 42b include a plurality of unit electrode bodies 42m and a plurality of coupling sections 42n that couple the plurality of unit electrode bodies 42m. The unit electrode bodies 42m are each constituted of an aggregation of a plurality of linear electrode patterns extending radially from the center. The coupling sections 42n extend in the Y-axis direction and couple the adjacent unit electrode bodies 42m.

When seen from the Z-axis direction, the X and Y electrodes 41b and 42b intersect such that the unit electrode bodies 41m and the unit electrode bodies 42m overlap one another.

Figure 14:
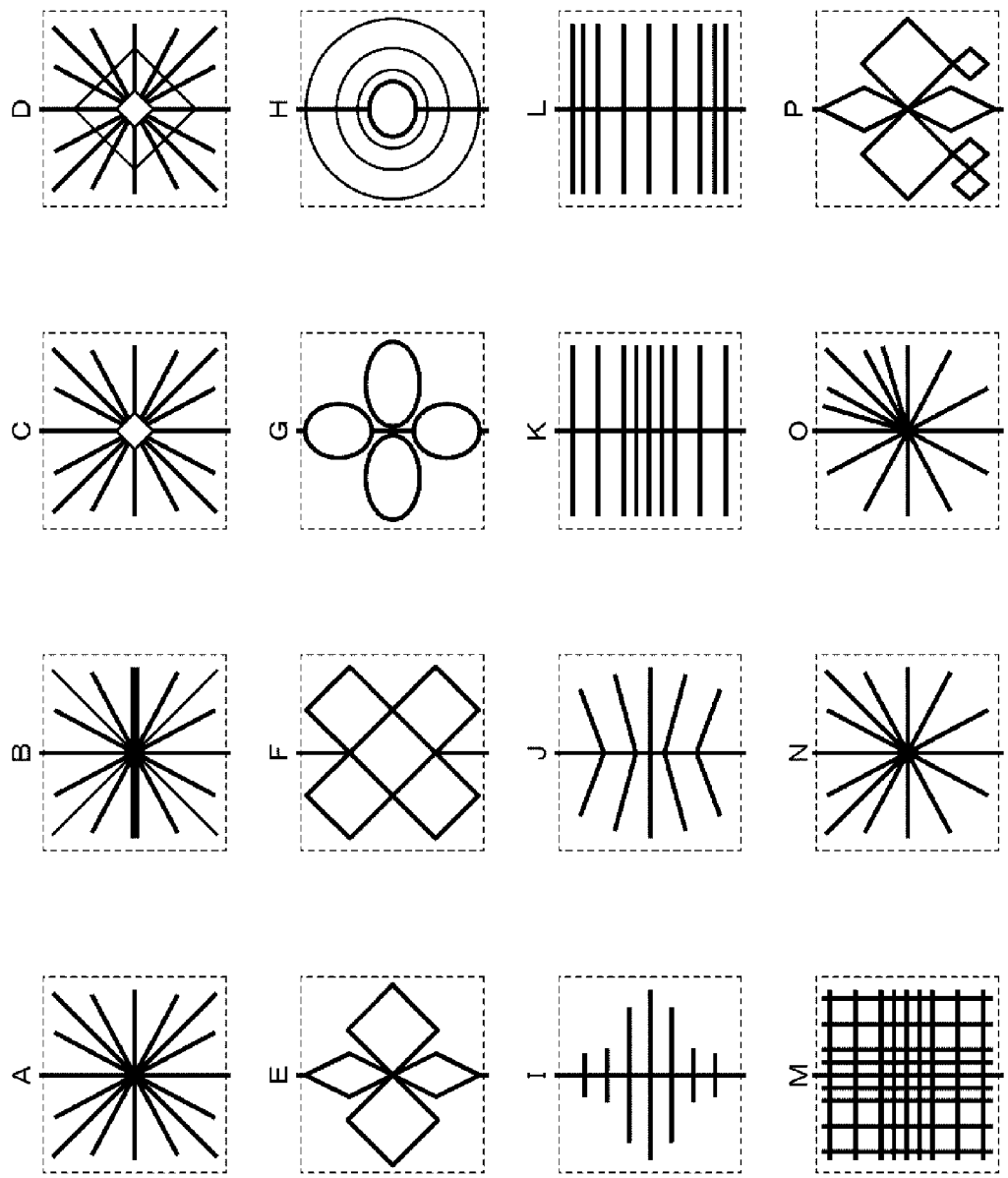
FIGS. 14A to 14P are each a schematic diagram showing a shape example of a unit electrode body.

FIGS. 14A to 14P are each a schematic diagram showing a shape example of the unit electrode bodies 41m and 42m. It should be noted that FIGS. 14A to 14P show shapes at the intersections of the X and Y electrodes 41b and 42b, and shapes of other parts are not particularly limited and may be, for example, linear. Further, a combination of the shapes of the unit electrode bodies 41m and 42m of the X and Y electrodes 41b and 42b may be two sets of the same type or two sets of different types out of the shapes shown in FIGS. 5B and 14A to 14P.

FIG. 14A corresponds to the unit electrode bodies 41m and 42m shown in FIGS. 13A and 13B. FIG. 14B shows an example where one of radial linear electrodes shown in the example of FIG. 13A is formed to be thicker than other linear electrodes. With this configuration, the capacitance change amount on the thick linear electrode can be set higher than those of the other linear electrodes. Further, FIGS. 14C and 14D show examples where an annular linear electrode is arranged at substantially the center, and linear electrodes are formed radially from the center. With this configuration, a concentration of the linear electrodes at the center can be suppressed, and a decreased sensitivity area can be prevented from being generated.

FIGS. 14E to 14H show examples where an aggregation is formed by combining a plurality of linear electrodes formed either annularly or rectangularly. With this configuration, it becomes possible to adjust an electrode density and suppress formation of the decreased sensitivity area. Further, FIGS. 14I to 14L show examples where an aggregation is formed by combining a plurality of linear electrodes arranged in either the X-axis direction or the Y-axis direction. By adjusting the shape, length, pitch, and the like of the linear electrodes, a desired electrode density can be obtained. Furthermore, FIGS. 14M to 14P show examples where the linear electrodes are arranged asymmetrically in the X-axis direction or the Y-axis direction.

Modified Example 2

Figure 2:
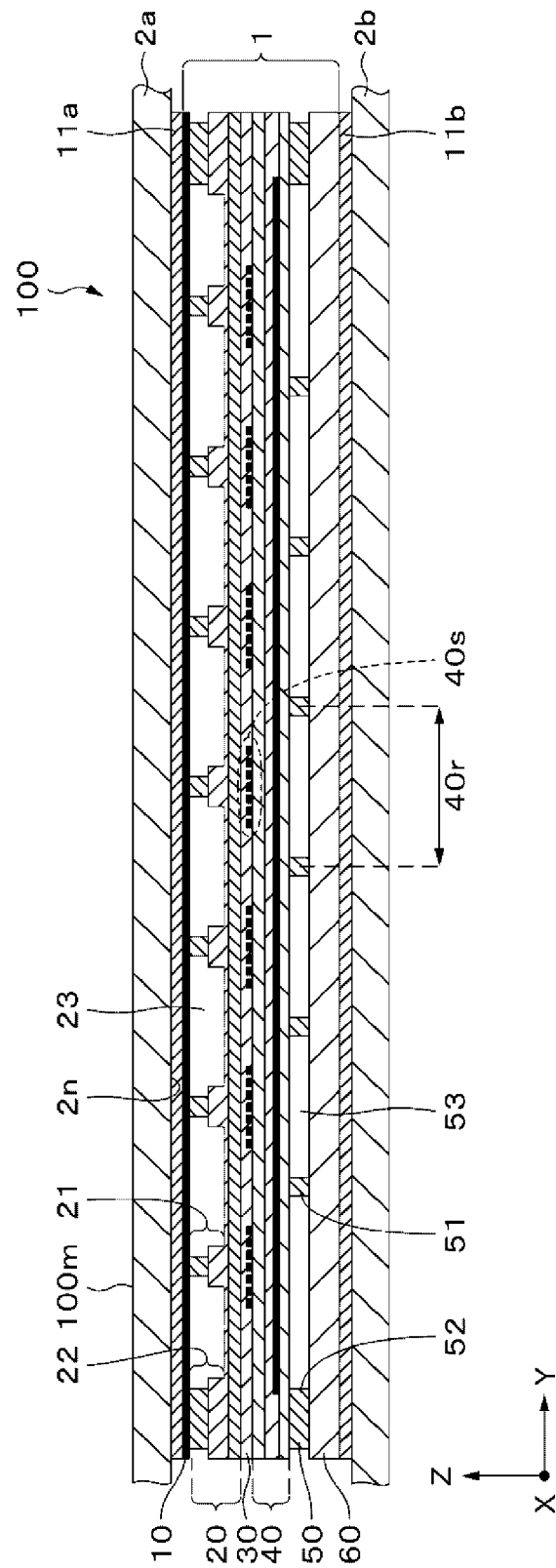
FIG. 2 is a cross-sectional diagram showing a configuration example of a sensor.
Figure 15:
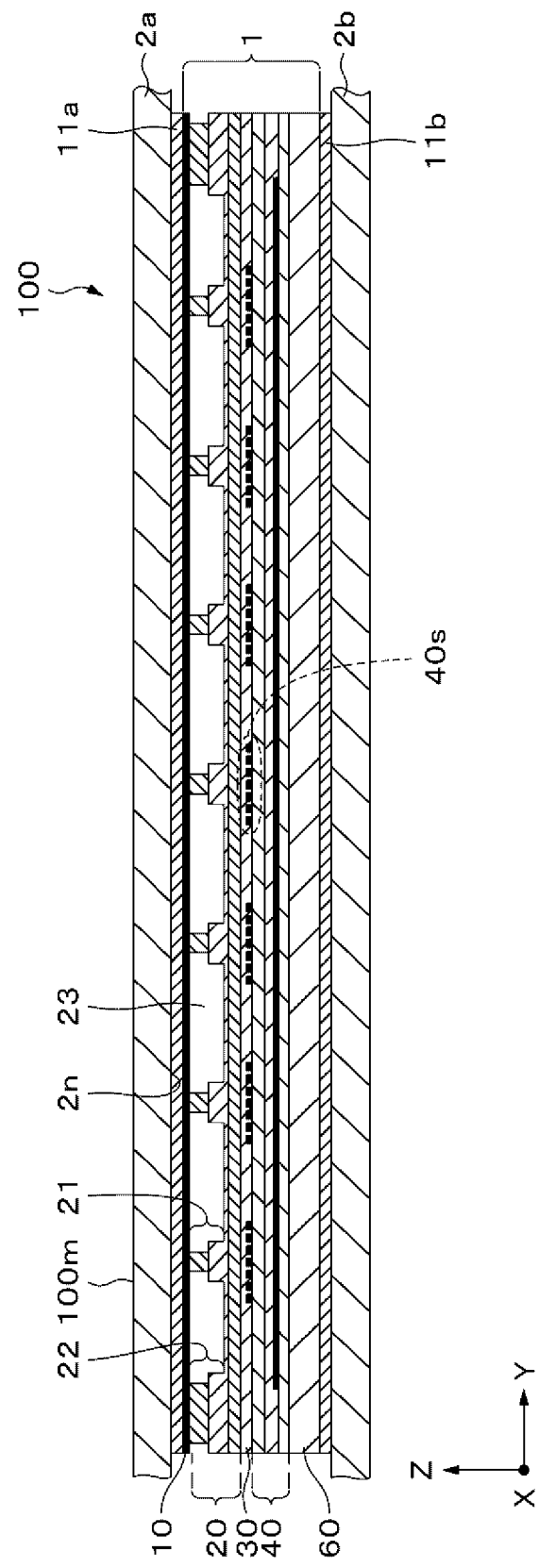
FIG. 15 is a cross-sectional diagram showing a configuration example of the electronic underlay body according to a modified example of the first embodiment of the present technology.

The first embodiment above has described the example where the support layer 50 is provided between the electrode layer 40 and the conductive layer 60 (see FIG. 2). As shown in FIG. 15, the support layer 50 may be omitted so that the electrode layer 40 and the conductive layer 60 are provided adjacent to each other.

Modified Example 3

The interlayer arrangement positions of the structures 21 and 51 of the first embodiment (arrangement positions between metal layer 10 and electrode layer 40 and arrangement positions between conductive layer 60 and electrode layer 40) may be switched. Hereinafter, the electronic underlay body 100 including the switched configuration as described above will be described.

Figure 16:
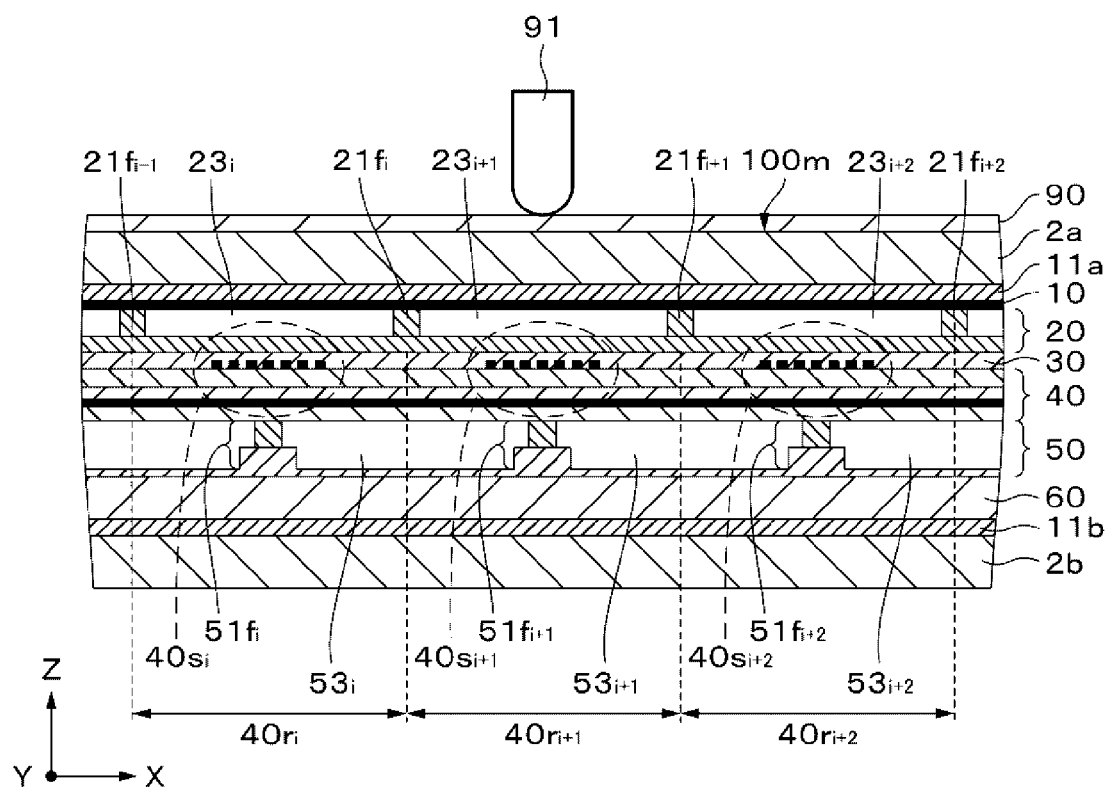
FIG. 16 is a cross-sectional diagram showing a configuration example of the electronic underlay body according to the modified example of the first embodiment of the present technology.

FIG. 16 is a cross-sectional diagram showing a configuration example of the electronic underlay body 100 according to a modified example of the first embodiment of the present technology. Structures 21f correspond to the structures 51 of the first embodiment being provided between the metal layer 10 and the electrode layer 40, and other points (i.e., arrangement positions in in-plane direction, configurations, materials, formation method, etc.) are similar to those of the structures 51 of the first embodiment. Structures 51f correspond to the structures 21 of the first embodiment being provided between the conductive layer 60 and the electrode layer 40, and other points (i.e., arrangement positions in in-plane direction, configurations, materials, formation method, etc.) are similar to those of the structures 21 of the first embodiment. In the electronic underlay body 100 having the configuration as described above, the detection sections 40s may oppose the structures 51 or a group constituted of the structures 51 in the Z-axis direction.

Modified Example 4

Figure 17:
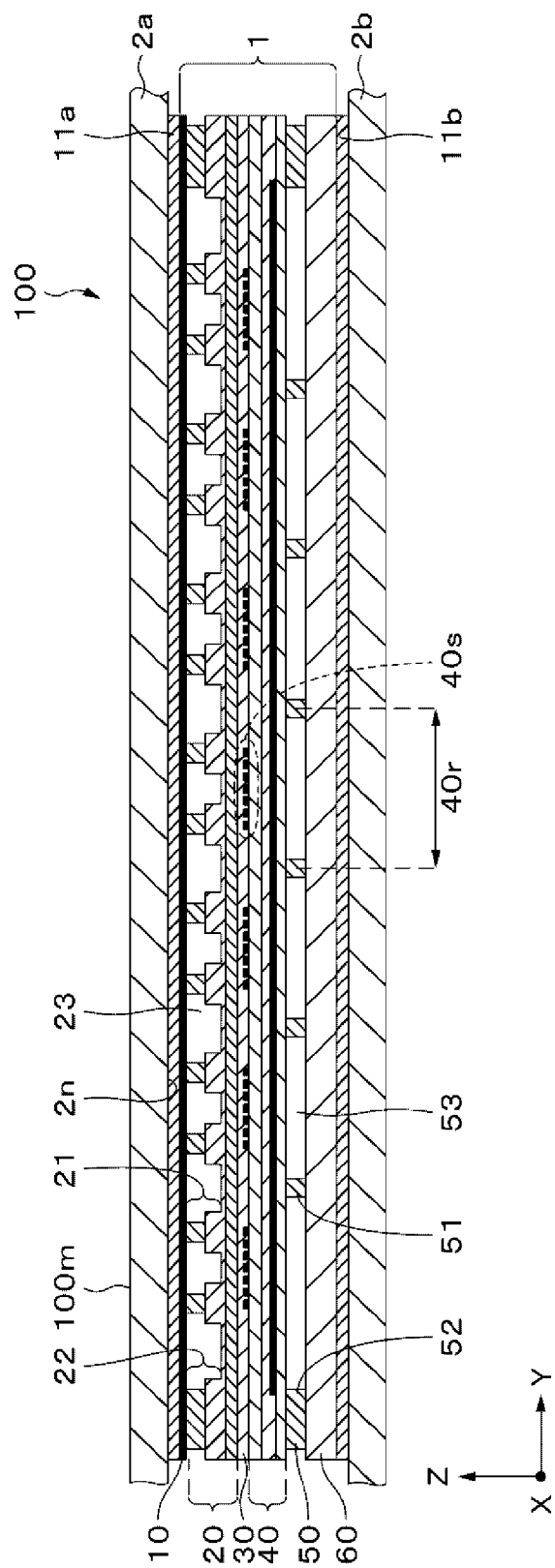
FIG. 17 is a cross-sectional diagram showing a configuration example of the electronic underlay body according to the modified example of the first embodiment of the present technology.
Figure 18:
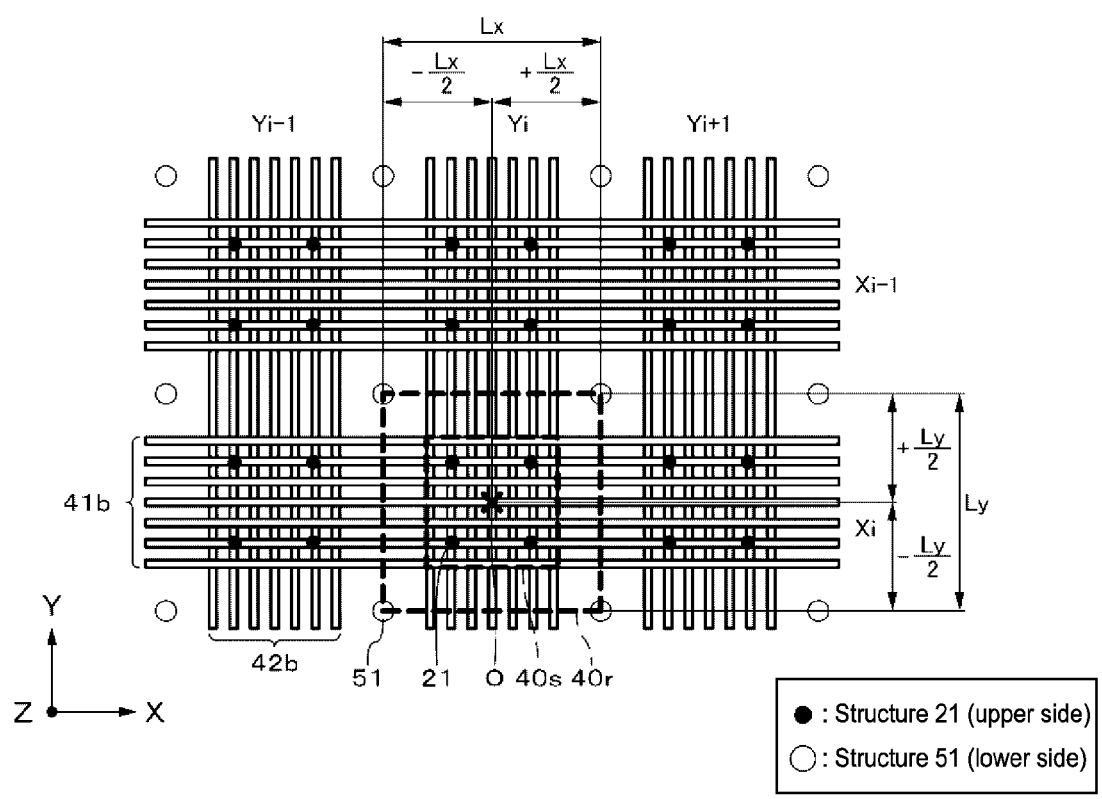
FIGS. 18A and 18B are each a plan view showing an arrangement example of the structures and the X and Y electrodes.

FIG. 17 is a schematic cross-sectional diagram showing a configuration example of the electronic underlay body 100 according to a modified example of the first embodiment of the present technology. FIG. 18 are each a plan view showing an arrangement example of the X and Y electrodes 41b and 42b. The electronic underlay body 100 differs from the electronic underlay body 100 according to the first embodiment in that it includes two or more structures 21 in the unit detection area 40r.

Since the electronic underlay body 100 includes two or more structures 21 in the unit detection area, it is possible to suppress generation of two peaks in a capacitance change rate distribution and enhance coordinate calculation accuracy. Moreover, a weight sensitivity of the electronic underlay body 100 can be enhanced.

Here, the expression "includes the structures 21 in the unit detection area 40r" refers to not only the case of including the entire structure 21 but also a case of including a part of the structure 21. For example, when the structures 21 are arranged on an outer circumference (circumference) of the unit detection area 40r, a part of one structure 21 on an inner side of the unit detection area 40r when focused with the outer circumference as the boundary, out of the structures 21 arranged on the outer circumference, is counted as one structure 21.

Specifically, for example, when the structure 21 is arranged while being divided into two on a side constituting the unit detection area 40r, the structure 21 is counted as "½". Further, when the structure 21 is arranged at an apex (corner) of the unit detection area 40r having a square shape or a rectangular shape, the structure 21 is counted as "¼".

2. Second Embodiment 2.1 General Outline

In a second embodiment, the electronic underlay body 100 automatically detects the following states of (a) to (d).
(a) State where paper sheet 90 is placed on surface 100m
(b) State where paper sheet 90 is removed from surface 100m (c) State where paper sheet 90 placed on surface 100m is exchanged (d) State where writing is performed on paper sheet 90 placed on surface 100m It should be noted that as described above, both the paper sheet 90 and the writing tool 91 are general-purpose ones.

FIG. 19A shows a relationship between a state of the electronic underlay body 100 when the paper sheet 90 is placed on the surface 100m and the pressure distribution at that time. When the paper sheet 90 is placed on the surface 100m of the electronic underlay body 100 as shown in FIG. 19A, a change appears in an area A2 that is substantially the same as the size A1 of the paper sheet 90 in the pressure distribution of the surface 100m.

FIG. 19B shows a relationship between a state of the electronic underlay body 100 when writing is performed on the paper sheet 90 using the writing tool 91 and the capacitance change amount at that time. When writing is performed on the paper sheet 90 placed on the electronic underlay body 100 using the writing tool 91 as shown in FIG. 19B, a change appears in an area B2 that is substantially the same as a modified area B1 due to the pen-point of the writing tool 91 in the pressure distribution of the surface 100m. The modified area B1 due to the pen-point of the writing tool 91 depends on the size of the pen-point of the writing tool 91.

Therefore, it is possible to calculate an area S of an area where a pressure change has appeared on the surface 100m from the pressure distribution acquired by the sensor 1 and automatically detect the states (a) to (d) described above based on the area S.

2.2 Configuration of Electronic Underlay Body

The storage apparatus 74 stores in advance size information of the paper sheet 90 and size information of the writing tool 91.

The size information of the paper sheet 90 is constituted of a lower limit value Sa1 or both of the lower limit value Sa1 and an upper limit value Sa2. Those values are set in consideration of a range in which a change appears in the pressure distribution of the surface 100m when the paper sheet 90 assumed to be used is placed on the surface 100m. Here, the size of the paper sheet 90 assumed to be used is a standard size (e.g., A4 size or A5 size) of manuscript paper sheet, drawing paper sheet, Japanese "washi", graph paper sheet, report paper sheet, loose leaf, notebook, and the like. It should be noted that it is favorable for Sa1 and Sa2 to be values that take into account a detection error.

The size information of the writing tool 91 is constituted of a lower limit value Sb1 or both of the lower limit value Sb1 and an upper limit value Sb2. Those values are set in consideration of a range in which a change appears in the pressure distribution of the surface 100m when writing is performed on the paper sheet 90 using the writing tool 91 assumed to be used. It should be noted that it is favorable for Sb1 and Sb2 to be values that take into account a detection error.

The control apparatus 71 judges whether the paper sheet 90 is placed on the surface 100m based on the pressure distribution acquired from the sensor 1. Specifically, the control apparatus 71 calculates a size S of the area where a pressure change is recognized (area of surface 100m) from the pressure distribution acquired from the sensor 1 and judges whether the size S is within the range of Sa2≤S or Sa1≤S≤Sa2. When the size S is within that range, it is judged that the paper sheet 90 is placed on the surface 100m. On the other hand, when the size S is outside that range, it is judged that the paper sheet 90 is not placed on the surface 100m. Here, the size S, Sa1, and Sa2 are an area, width, or length. The judgment described above may be made by combining two or more of those values. Moreover, it is also possible for the control apparatus 71 to judge whether the pressure change recognized in the pressure distribution acquired from the sensor 1 is within a reference range in addition to the size S and judge that the paper sheet 90 is placed on the surface 100m when the pressure change is within the reference range.

The control apparatus 71 judges whether the paper sheet 90 is removed from the surface 100m based on the pressure distribution acquired from the sensor 1. Specifically, the control apparatus 71 calculates the size S of the area where a pressure change is recognized (area of surface 100m) from the pressure distribution acquired from the sensor 1 and judges whether the size S is within the range of Sa1≤S or Sa1≤S≤Sa2. When the size S is within that range, it is judged that the paper sheet 90 is not removed from the surface 100m. On the other hand, when the size S is outside that range, it is judged that the paper sheet 90 is removed from the surface 100m. Moreover, it is also possible for the control apparatus 71 to judge whether the pressure change recognized in the pressure distribution acquired from the sensor 1 is within a reference range in addition to the size S and judge that the paper sheet 90 is not removed from the surface 100m when the pressure change is within the reference range.

The control apparatus 71 judges whether writing is performed on the paper sheet 90 placed on the surface 100m using the writing tool 91 based on the pressure distribution acquired from the sensor 1. Specifically, the control apparatus 71 calculates a size S of the area where a pressure change is recognized (area of surface 100m) from the pressure distribution acquired from the sensor 1 and judges whether the size S is within the range of Sb1≤S or Sb1≤S≤Sb2. When the size S is within that range, it is judged that writing is performed by the writing tool 91. On the other hand, when the size S is outside that range, it is judged that writing is not performed by the writing tool 91. Here, the size S, Sb1, and Sb2 are an area, width, or length. The judgment described above may be made by combining two or more of those values. Moreover, it is also possible for the control apparatus 71 to judge whether the pressure change recognized in the pressure distribution acquired from the sensor 1 is within a reference range in addition to the size S and judge that writing is not performed by the writing tool 91 when the pressure change is within the reference range.

2.3 Operation of Electronic Underlay Body

Figure 20:
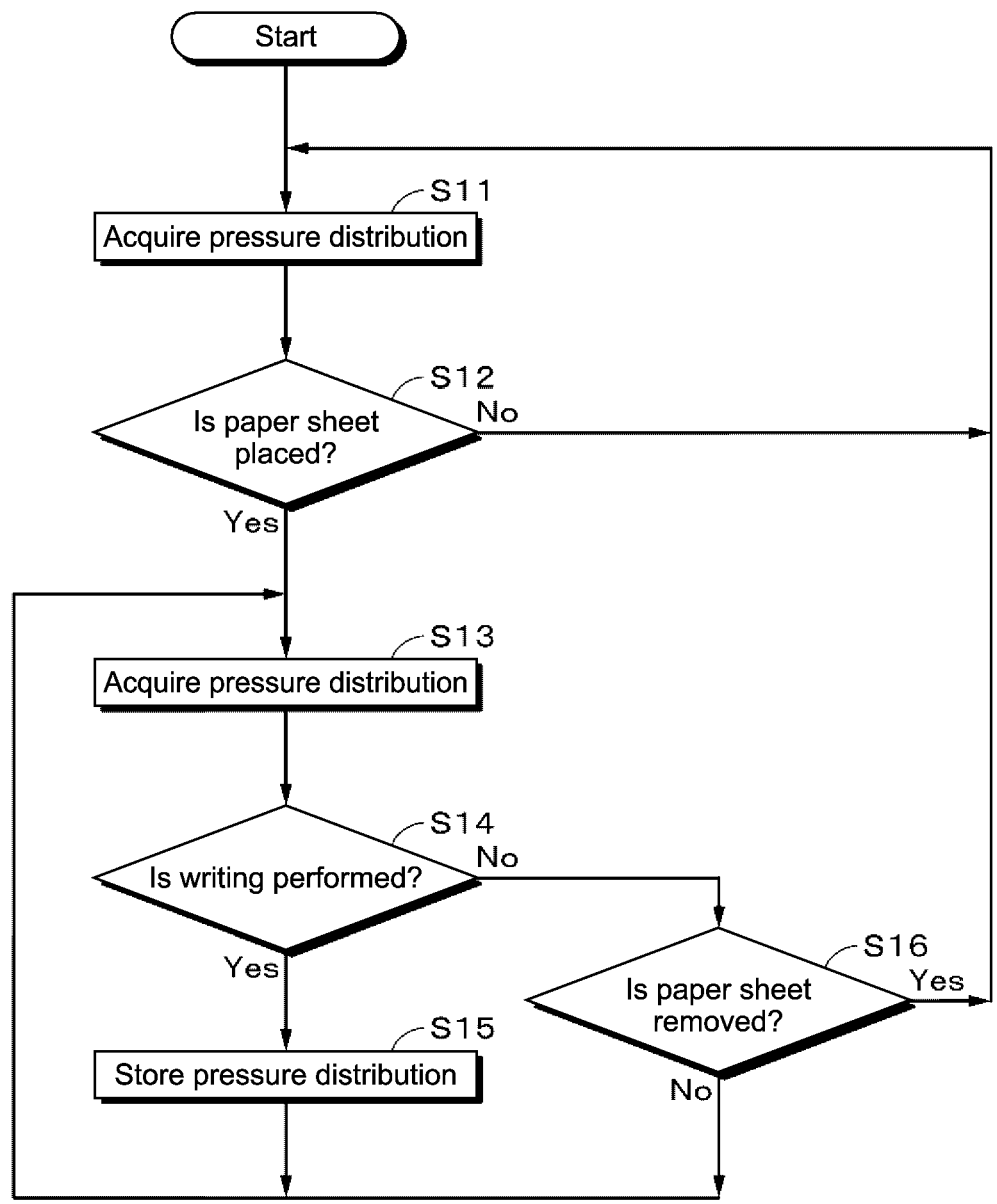
FIG. 20 is a flowchart for describing an operational example of an electronic underlay body according to a second embodiment of the present technology.

With reference to FIG. 20, an operational example of the electronic underlay body 100 according to the first embodiment of the present technology will be described. First, in Step S11, the control apparatus 71 acquires a pressure distribution of the surface 100m from the sensor 1 at a predetermined cycle T1. Next, in Step S12, the control apparatus 71 judges whether the paper sheet 90 is placed on the surface 100m based on the pressure distribution acquired in Step S11.

When judged that the paper sheet 90 is placed in Step S12, the control apparatus 71 acquires a pressure distribution of the surface 100m at a predetermined cycle T2 in Step S13. It should be noted that it is favorable for the cycle T1 in Step S11 to be longer than the cycle T2 in Step S13. This is because the power consumption until the paper sheet 90 is detected can be reduced. On the other hand, when judged that the paper sheet 90 is not placed in Step S12, the control apparatus 71 returns to the processing of Step S11.

Next, in Step S14, the control apparatus 71 judges, based on the pressure distribution acquired in Step S13, whether writing by the writing tool 91 is performed on the paper sheet 90 placed on the surface 100*m*.

When judged that the writing is performed in Step S14, the control apparatus 71 stores the pressure distribution acquired at the predetermined cycle in Step S13 in the storage apparatus 74 as handwriting information in Step S15. Accordingly, a time sequence change of the pressure distribution is stored. At this event, it is possible to generate image data of a pen-point position and writing pressure of the writing tool 91 or handwriting from the pressure distribution acquired at the predetermined cycle and store it in the storage apparatus 74 as handwriting information. Moreover, character data may be generated from the pressure distribution acquired at the predetermined cycle and stored in the storage apparatus 74. Furthermore, the handwriting information may be supplied to an external apparatus such as a PC via the communication section 73. Upon ending the storage of the handwriting information, the processing returns to Step S13.

On the other hand, when judged that the writing is not performed in Step S14, the control apparatus 71 judges whether the paper sheet 90 is removed from the surface 100*m* based on the pressure distribution acquired at the predetermined cycle in Step S11 in Step S16. When judged that the paper sheet 90 is removed in Step S16, the control apparatus 71 ends the processing of acquiring the pressure distribution in Step S13 and the processing of storing the pressure distribution in Step S15 and returns to the processing of Step S11. On the other hand, when judged that the paper sheet 90 is not removed in Step S16, the control apparatus 71 returns to the processing of Step S13.

In the second embodiment, by returning to the processing of Steps S11 and S12 again after Step S16, the control apparatus 71 can judge whether the paper sheet 90 placed on the surface 100*m* is exchanged. It should be noted that when the paper sheet 90 is exchanged, it is favorable for the control apparatus 71 to store the handwriting information of each paper sheet 90 as different files (gatherings of different data).

2.4 Effect

In the electronic underlay body 100 according to the second embodiment, when a user places the paper sheet 90 on the surface 100*m* of the electronic underlay body 100 and a character is written on the paper sheet 90 with the writing tool 91, loading of handwriting information is automatically started. Therefore, handwriting information can be acquired by the same operation as in the case of using a general-purpose underlay body.

Based on the pressure distribution acquired from the sensor 1, the electronic underlay body 100 is capable of detecting that (1) the paper sheet 90 is placed on the surface 100*m*, (b) the paper sheet 90 is removed from the surface 100*m*, (c) the paper sheet 90 placed on the surface 100*m* is exchanged, and (d) writing is performed by the writing tool 91.

2.5 Modified Example

Modified Example 1

The second embodiment has described the example of detecting that the paper sheet 90 is placed based on the change in the pressure distribution obtained when the paper sheet 90 is placed on the surface 100*m* of the electronic underlay body 100, though the configuration for detecting that the paper sheet 90 is placed is not limited thereto. For example, the following configurations may be adopted.

The electronic underlay body 100 additionally includes a photodiode in the surface 100*m*. Based on a change in a light reception amount detected by the photodiode, the control apparatus 71 judges whether the paper sheet 90 is placed. Specifically, the control apparatus 71 judges whether the light reception amount detected by the photodiode is equal to or smaller than a defined value. When the light reception amount is equal to or smaller than the defined value, it is judged that the paper sheet 90 is placed on the surface 100*m*, and when the light reception amount is not equal to or smaller than the defined value, it is judged that the paper sheet 90 is not placed on the surface 100*m*.

Modified Example 2

The embodiment above has described the example where the electronic underlay body 100 is placed under the paper sheet 90 for use. However, the use of the electronic underlay body 100 is not limited to this example. For example, the electronic underlay body 100 may be inserted between pages (papers) of a notebook, a pocketbook, and the like.

In the case of such a use, it is favorable to provide a taper at sides of the electronic underlay body 100 as shown in FIG. 21A. With this configuration, it becomes easy to insert the electronic underlay body 100 into a binding margin 94*a* of a notebook 94 or the like as shown in FIG. 21B. Moreover, the side of the electronic underlay body 100 is more apt to be pressurized by the binding margin 94*a* in the inserted state, and thus it becomes easy to detect the inserted state. Furthermore, it is favorable to set the thickness of the electronic underlay body 100 to be a thickness with which it can be easily inserted into the binding margin 94*a* of the notebook 94 or the like.

Further, until the paper sheet 90 is detected, the control apparatus 71 may partially scan only the proximity of the sides of the electronic underlay body 100 to acquire a pressure distribution and detect that the electronic underlay body 100 is inserted into the binding margin 94*a* of the notebook 94 or the like based on a change in the pressure distribution.

3. Third Embodiment 3.1 General Outline

In a third embodiment, an example where writing with the writing tool 91 and an erasing with an eraser is distinguished from each another so that pressure distributions thereof are stored distinguishably will be described.

FIG. 22A shows a relationship between a state of the electronic underlay body 100 when writing is performed on the paper sheet 90 using the writing tool 91 and a pressure distribution at that time. When writing with the writing tool 91 is performed on the paper sheet 90 placed on the electronic underlay body 100 as shown in FIG. 21A, a change appears in an area B2 that is substantially the same as the modified area B1 due to the pen-point of the writing tool 91 in the pressure distribution of the surface 100*m*. The modified area B1 due to the pen-point of the writing tool 91 depends on the size of the pen-point of the writing tool 91.

FIG. 22B shows a relationship between a state of the electronic underlay body 100 when a character or the like written on the paper sheet 90 is erased by an eraser 93 and a pressure distribution at that time. As shown in FIG. 22B, when a character or the like written on the paper sheet 90 is erased by the eraser 93, a change appears in an area C2 that is substantially the same as a modified area C1 due to a tip end of the eraser 93 in the pressure distribution. The modified area C1 due to the tip end of the eraser 93 depends on a size of the tip end of the eraser 93.

Therefore, it is possible to calculate an area S of an area where a pressure change has appeared on the surface 100m from the pressure distribution acquired by the sensor 1 and distinguish the writing with the writing tool 91 and the erasing with the eraser 93 from each other.

3.2 Configuration of Electronic Underlay Body

The storage apparatus 74 stores size information of the writing tool 91 and size information of the eraser 93.

The size information of the writing tool 91 is similar to that of the second embodiment.

The size information of the eraser 93 is constituted of a lower limit value Sc1 and an upper limit value Sc2. Those values are set in consideration of a range in which a change appears in the pressure distribution of the surface 100m when a character or the like is erased by the eraser 93 assumed to be used. It should be noted that it is favorable for Sc1 and Sc2 to be values that take into account a detection error.

The control apparatus 71 judges whether a character or the like written on the paper sheet 90 is erased by the eraser 93 based on the pressure distribution acquired from the sensor 1. Specifically, the control apparatus 71 calculates a size S of the area where a pressure change is recognized (area of surface 100m) from the pressure distribution acquired from the sensor 1 and judges whether the size S is within the range of $Sc1 \leq S \leq Sc2$. When the size S is within that range, it is judged that the erasing with the eraser 93 is performed. On the other hand, when the size S is outside that range, it is judged that there is no erasing with the eraser 93. Here, the size S, Sc1, and Sc2 are an area, width, or length. The judgment described above may be made by combining two or more of those values.

3.3 Operation of Electronic Underlay Body

Figure 23:
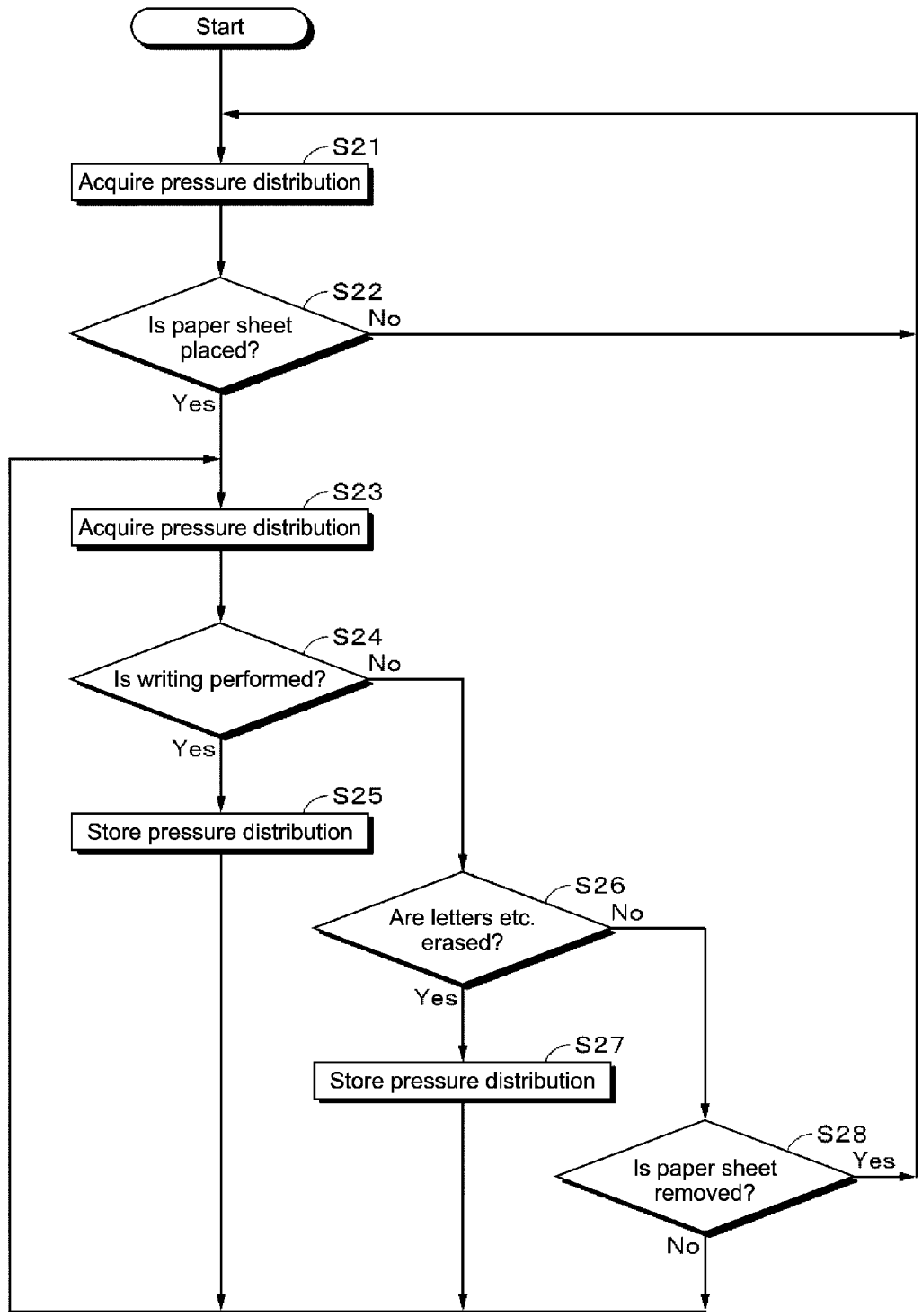
FIG. 23 is a flowchart for describing an operational example of an electronic underlay body according to a third embodiment of the present technology.

With reference to FIG. 23, an operational example of the electronic underlay body 100 according to the third embodiment of the present technology will be described. Processing of Steps S21 to S23 and S28 (see FIG. 20) are similar to those of Steps S11 to S13 and S16 of the second embodiment. Therefore, descriptions thereof will be omitted, and processing of Steps S24 to S27 will be described.

After Step S23, the control apparatus 71 judges whether writing with the writing tool 91 is performed on the paper sheet 90 placed on the surface 100m based on the pressure distribution acquired in Step S23 in Step S24.

When judged that the writing is performed in Step S24, the control apparatus 71 stores the pressure distribution acquired at a predetermined cycle in Step S23 in the storage apparatus 74 as handwriting information in Step S25. Accordingly, a time sequence change of the pressure distribution is stored. At this event, it is possible to generate image data of a pen-point position and writing pressure of the writing tool 91 or handwriting from the pressure distribution acquired at the predetermined cycle and store it in the storage apparatus 74 as handwriting information. Moreover, character data may be generated from the pressure distribution acquired at the predetermined cycle and stored in the storage apparatus 74. Furthermore, the handwriting information may be supplied to an external apparatus such as a PC via the communication section 73. Upon ending the storage of the handwriting information, the processing returns to Step S23.

On the other hand, when judged that the writing is not performed in Step S24, the control apparatus 71 judges whether a character or the like written on the paper sheet 90 placed on the surface 100m is erased by the eraser 93 based on the pressure distribution acquired in Step S24 in Step S26.

When judged that a character or the like is erased in Step S26, the control apparatus 71 stores the pressure distribution acquired at the predetermined cycle in Step S23 in the storage apparatus 74 as erase information in Step S27. At this event, it is possible to generate image data of a pressing position and pressing force of the eraser 93 on the surface 100m or handwriting corrected by the eraser 93 from the pressure distribution acquired at the predetermined cycle and store it in the storage apparatus 74 as erase information. Furthermore, the erase information may be supplied to an external apparatus such as a PC via the communication section 73.

On the other hand, when judged that a character or the like is not erased in Step S26, the control apparatus 71 returns to the processing of Step S23.

3.4 Effect

In the third embodiment, the electronic underlay body 100 can distinguish the writing with the writing tool 91 and the erasing with the eraser 93 from each other and distinguishably store handwriting information and erase information in the storage apparatus 74.

4. Fourth Embodiment

4.1 Configuration of Electronic Underlay Body

Figure 24:
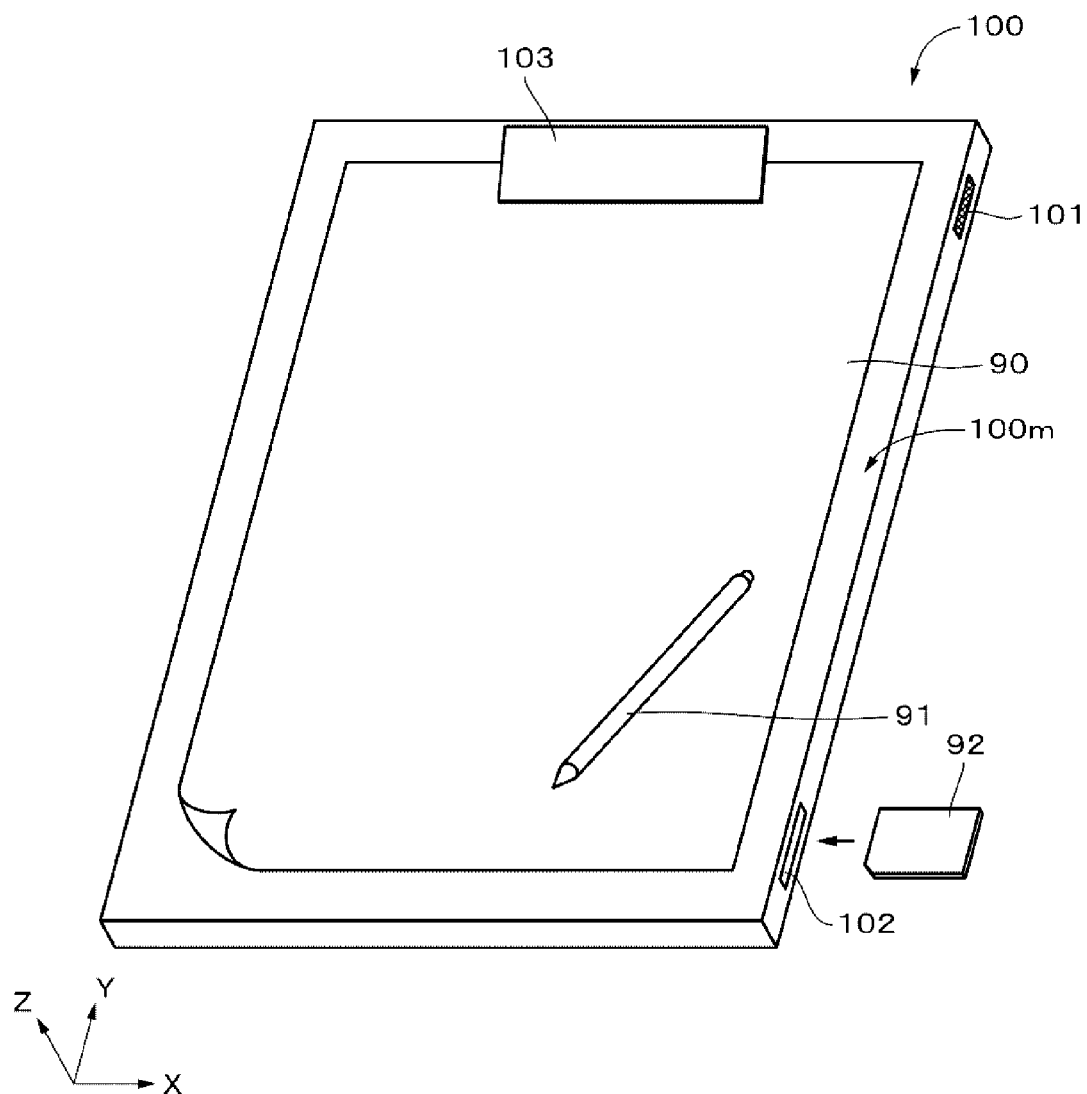
FIG. 24 is a perspective view showing an example of an appearance of an electronic underlay body according to a fourth embodiment of the present technology.

FIG. 24 is a perspective view showing an example of an appearance of the electronic underlay body 100 according to a fourth embodiment of the present technology. As shown in FIG. 24A, the electronic underlay body 100 is a clipboard-type electronic underlay body and includes a clip 103 of a spring type or the like at one end of the surface 100m on which the paper sheet 90 is to be placed. By the clip 103, the paper sheet 90 is pressed against the surface 100m to be fixed thereto. Other configurations are similar to those of the first to third embodiments. It should be noted that since the writing tool 91 and the clip 103 cause temporally and spatially different pressure changes, the control apparatus 71 can distinguish them from each other.

4.2 Effect

In the fourth embodiment, since the paper sheet 90 is pressed against the surface 100m by the clip 103, the electronic underlay body 100 can easily judge that the paper sheet 90 is placed based on the pressure distribution.

4.3 Modified Example

Modified Example 1

The fourth embodiment has described the example of the configuration that presses the paper sheet 90 against the surface 100m of the electronic underlay body 100 by the clip 103, but the configuration for pressing the paper sheet 90 against the surface 100m of the electronic underlay body 100 is not limited thereto.

For example, as shown in FIGS. 25A and 25B, fixing sections 104 may be provided on the surface 100m of the electronic underlay body 100 so that corners of the paper sheet 90 are fixed by the fixing sections 104 and a circumference of the paper sheet 90 is pressed against the surface 100m. It should be noted that the fixing positions of the paper sheet 90 by the fixing sections 104 only need to be at circumferential sections of the paper sheet 90 and are not limited to the corners of the paper sheet 90. For example, the fixing positions may be at sides of the paper sheet 90 or both the sides and corners of the paper sheet 90.

As shown in FIG. 25C, the fixing sections 104 each include a side wall section 104a and an extended section 104b. The side wall section 104a and the extended section 104b constitute a gap section 104c for inserting a part of a circumferential section of the paper sheet 90. The side wall section 104a is erected from the surface 100m. By the side wall sections 104a, a position of the paper sheet 90 on the surface 100m is defined. The extended section 104b is parallel to the surface 100m from an upper end section of the side wall section 104a and extends in a direction from the circumference of the surface 100m to the center.

The extended section 104b includes a surface 104d opposing the surface 100m, and a distance (width of gap section 104c) d between the surface 100m and the surface 104d is set to be almost the same as the thickness of the paper sheet 90. It is favorable for the surface 104d to be an inclined surface that is inclined such that the width d of the gap section 104c becomes smaller in the direction from the center of the surface 100m toward the circumference. This is because, with this configuration, it becomes easy to press the circumferential section of the paper sheet 90 against the surface 100m when inserting the paper sheet 90 into the gap section 104c. When such a configuration is adopted, the control apparatus 71 may judge that the paper sheet 90 is placed on the surface 100m based on an edge detection of the paper sheet 90.

Modified Example 2

When the clip 103 or the fixing sections 104 is/are provided on the surface 100m, the state where the paper sheet 90 is placed on the surface 100m may be detected as follows. Specifically, the control apparatus 71 virtually divides the surface 100m of the electronic underlay body 100 into a plurality of areas, scans only an area including the clip 103 or the fixing section 104 out of those areas, and acquires a pressure distribution of only that area. Then, the control apparatus 71 detects that the paper sheet 90 is placed on the surface 100m based on the pressure distribution.

5. Fifth Embodiment 5.1 General Outline

In a fifth embodiment, using pressure information due to an edge, concavities and convexities, and the like of the paper sheet 90, a positional deviation of the paper sheet 90 from a reference position on the surface 100m of the electronic underlay body 100 and a temporal displacement thereof are detected, and a deviation of handwriting information caused by a paper displacement is corrected based on those detection information.

5.2 Configuration of Electronic Underlay Body

The control apparatus 71 detects, based on the pressure distribution of the surface 100m acquired by the sensor 1 at a predetermined cycle, an arrangement position of the paper sheet 90 on the surface 100m at each handwriting information acquisition time. Then, based on the detected arrangement position, the deviation of handwriting information at each time caused by the displacement of the paper sheet 90 from the normal arrangement position of the paper sheet 90 is corrected.

As the arrangement position of the paper sheet 90, there are, for example, an arrangement position of sides of the paper sheet 90, an arrangement position of corners of the paper sheet 90, an arrangement position of concavities and convexities of a back surface of the paper sheet 90, and a position of a hole provided on the paper sheet 90. Moreover, information obtained by combining coordinates of an upper left corner of the paper sheet 90 and a rotation angle from the normal arrangement position of the paper sheet 90 may also be used. Here, the normal arrangement refers to a state where a rectangular paper sheet 90 is placed parallel to sides of a rectangular surface 100m and, when longitudinal and lateral lines are drawn on the paper sheet 90, writing pressure thereof is also transmitted to the electronic underlay body 100, for example.

As the concavities and convexities on the back surface of the paper sheet 90, there are, for example, concavities and convexities formed by a crease of the paper sheet 90, concavities and convexities formed by a change in the thickness of the paper itself, concavities and convexities formed by an emboss process, and concavities and convexities formed by a seal being attached to the paper sheet 90. As the hole, there is a hole used for binding loose leafs and the like, for example. As the shape of the concavities and convexities and the hole, various shapes including a polygon and a star shape may be used, or two or more shapes may be combined.

The control apparatus 71 may store the arrangement position of the paper sheet 90 on the surface 100m and handwriting information at that arrangement position in association with each other and correct a deviation of the handwriting information caused by the displacement of the paper sheet 90 when reproducing the handwriting information.

When storing the pressure distribution at each time as the handwriting information, the control apparatus 71 may correct the deviation of handwriting information as follows. Specifically, the control apparatus 71 extracts the arrangement position of the paper sheet 90 (e.g., arrangement position of concavities and convexities on back surface of paper sheet 90) from the pressure distribution after recording the handwriting information or when reproducing it. Based on the arrangement position, the deviation of handwriting information at each time that is caused by the displacement of the paper sheet 90 from the normal arrangement position of the paper sheet 90 is corrected.

It should be noted that when the handwriting information is transmitted to an external apparatus such as a PC, the correction processing described above may be carried out on the external apparatus side.

5.3 Effect

In a fifth embodiment, the positional deviation of the paper sheet 90 on the surface 100m of the electronic underlay body 100 can be detected based only on the pressure information acquired by the sensor 1. Therefore, since there is no need to newly provide a configuration for detecting a positional deviation of the paper sheet 90, the positional deviation of the paper sheet 90 can be detected without inducing a raise in costs.

Also when a positional deviation of the paper sheet 90 occurs before recording handwriting or when recording handwriting, handwriting information acquired by the electronic underlay body 100 is corrected so that handwriting of the paper sheet 90 can be reproduced.

6. Sixth Embodiment

6.1 Configuration of Paper

Figure 26:
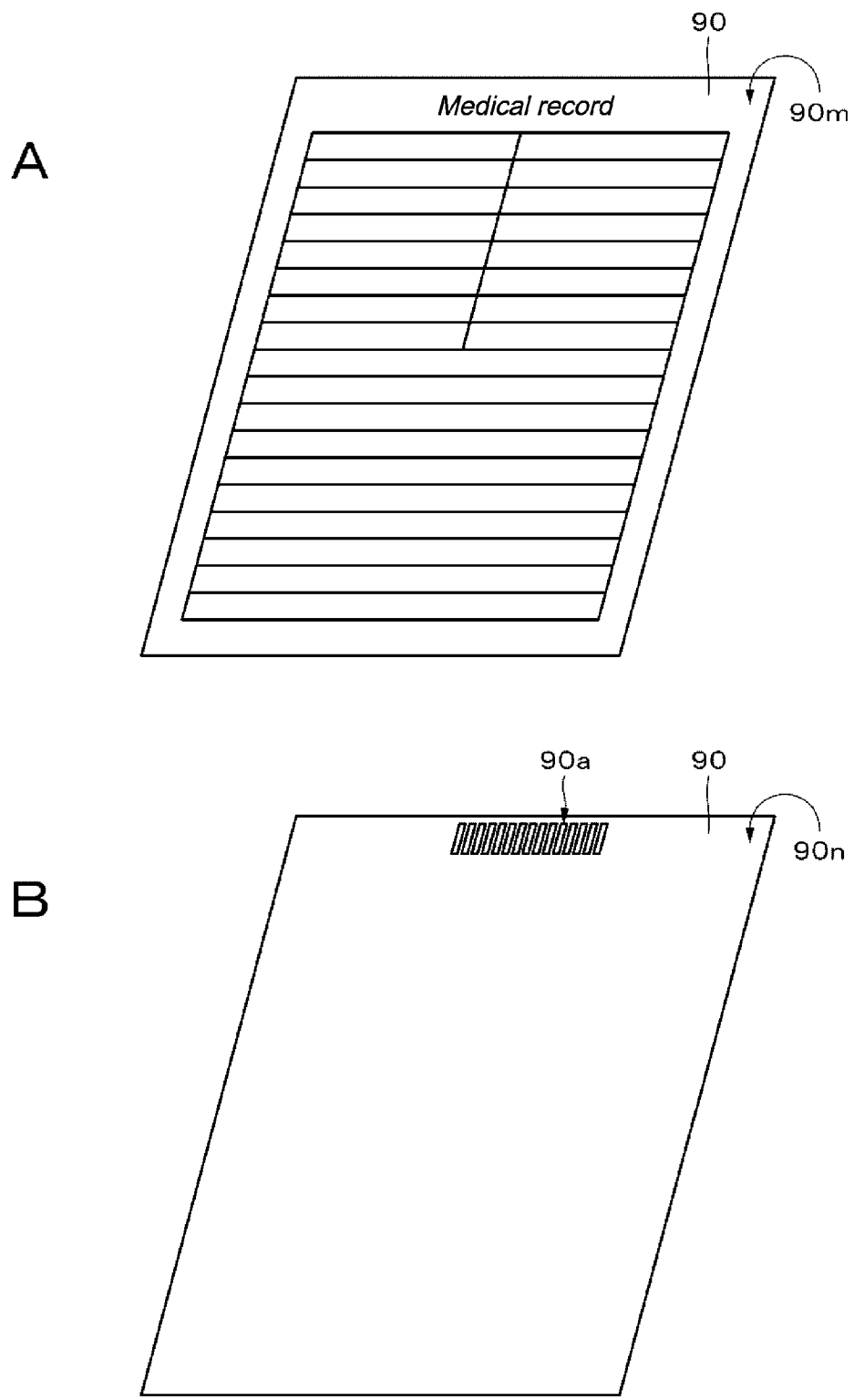
FIG. 26A is a perspective view showing an example of a surface of a paper.
FIG. 26B is a perspective view showing an example of a back surface of the paper.

As shown in FIGS. 26A and 26B, the paper sheet 90 is a paper including a predetermined entry form and includes a front surface (first surface) 90$m$ and a back surface (second surface) 90$n$. Specific examples of the paper include a medical interview sheet that a new patient fills in at a hospital, a medical record that a doctor fills in at a hospital, and a visitor questionnaire form or a renovation estimate request form used at a residential model room and the like. Entry columns of a predetermined format are provided on the front surface 90$m$ as shown in FIG. 26A. On the other hand, on the back surface 90$n$, concavities and convexities 90$a$ are provided as shown in FIG. 26B. Recorded onto the concavities and convexities 90$a$ is identification information for identifying an entry form of the paper sheet 90. The concavities and convexities 90$a$ differ depending on the type of entry form of the paper sheet 90.

(Entry Form)

Figure 27:
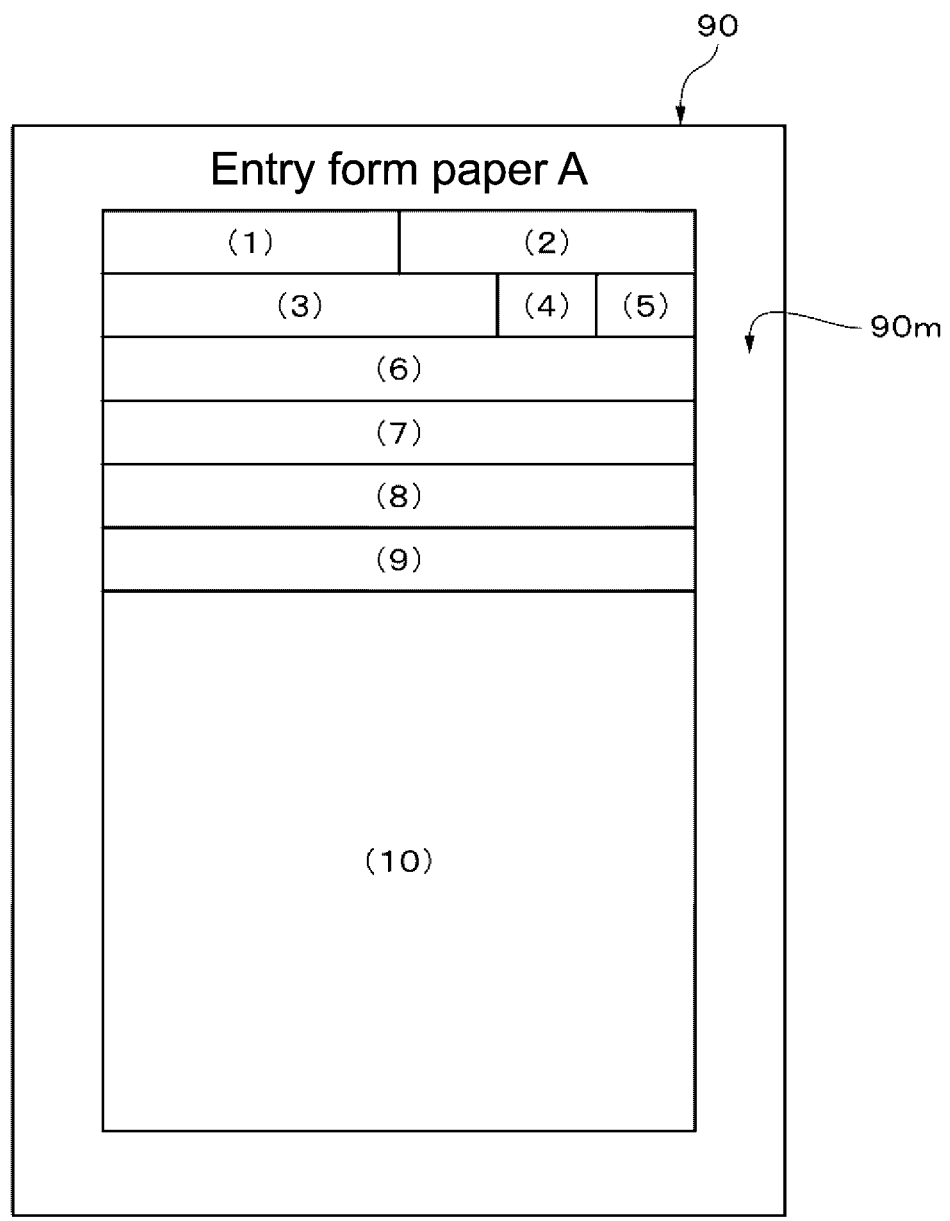
FIG. 27 is a schematic diagram showing an example of entry columns of an entry form.

FIG. 27 is a schematic diagram showing an example of entry columns of an entry form. As shown in FIG. 27, the paper sheet 90 including a predetermined entry form includes a plurality of entry columns (1) to (10), for example. Characters, numbers, marks, and the like written in the entry columns (1) to (9) are stored in a database of the electronic underlay body 100.

(Arrangement Position of Concavities and Convexities)

The arrangement position of the concavities and convexities 90$a$ is favorably a position at which the sensor 1 can easily detect a presence/absence of the concavities and convexities 90$a$. As such a position, a position to be clipped by a clip, a position highly likely to be pressed by a hand or pinched by a finger (e.g., corner or side of paper sheet 90), or the like is favorable. When the concavities and convexities 90$a$ are provided at the position to be clipped by a clip, the concavities and convexities can be pressed against the surface 100$m$ using a clipping force of the clip. When the concavities and convexities 90$a$ are provided at the position highly likely to be pressed by a hand or pinched by a finger, the concavities and convexities 90$a$ are pressed against the surface 100$m$ when pressed by a hand or pinched by a finger.

Although FIG. 26B shows the example where the concavities and convexities 90$a$ are provided at one position on the back surface 90$n$, the concavities and convexities 90$a$ may be provided at two or more positions on the back surface 90$n$. Further, when entry columns of a predetermined format are also provided on the back surface 90$n$, the concavities and convexities 90$a$ may also be provided on the front surface 90$m$. Moreover, the concavities and convexities 90$a$ may be provided on the entire paper sheet 90. Specifically, when only the front surface 90$m$ of the paper sheet 90 is an entry surface, it is favorable to provide the concavities and convexities 90$a$ on the entire back surface of the paper sheet 90. On the other hand, when both the front surface 90$m$ and back surface 90$n$ of the paper sheet 90 are the entry surfaces, it is favorable to provide the concavities and convexities 90$a$ on the entire surfaces of both the front surface 90$m$ and back surface 90$n$ of the paper sheet 90. By providing the concavities and convexities 90$a$ on the entire paper sheet 90 as described above, the concavities and convexities 90$a$ provided at either position are highly likely detected when the paper sheet 90 is placed or after the paper sheet 90 is placed on the surface 100$m$ of the electronic underlay body 100.

(Concavity and Convexity Formation Method)

As a method of formation of the concavities and convexities 90$a$, there are, for example, a method of varying a thickness of the paper itself to form the concavities and convexities 90$a$ on the back surface 90$n$ within the manufacturing process of the paper sheet 90, a method of forming the concavities and convexities 90$a$ on the back surface 90$n$ of the paper sheet 90 by an emboss process using a metal member including concavities and convexities (hereinafter, referred to as "emboss process method"), and a method of forming the concavities and convexities 90$a$ by attaching a seal or the like onto the paper sheet 90 to cause a protrusion on a part of the back surface 90$n$ (hereinafter, referred to as "seal attachment method"). When simply and inexpensively adding identification information to the paper sheet 90 on which a form is printed by a normal printer, the emboss process method and the seal attachment method are favorable out of those methods.

(Identification Information)

Identification information is provided distinctively for each entry form. For example, when there are two types of forms of forms A and B as the entry forms, individual identification information is imparted to the forms A and B. The identification information is, for example, a form identification ID or a form identification figure.

The form identification ID includes at least one type out of numerical values, characters, symbols, and the like. The form identification ID is expressed by a concavo-convex pattern, for example. The concavo-convex pattern is a one- or two-dimensional code obtained by converting information of the numerical values, characters, symbols, and the like according to a certain rule. Examples of such a code include a barcode and a matrix-type two-dimensional code.

The form identification figure is recorded by forming a concave section or convex section of the concavities and convexities 90$a$ in a predetermined figure shape. Examples of the form identification figure include various shapes such as a circle, an ellipse, a square, and a star shape, and two or more figures may be combined.

6.2 Configuration of Electrical Circuit of Electronic Underlay Body

The storage apparatus 74 includes a database that stores the pressure distribution (handwriting information) and the identification information in association with each other. Specifically, the storage apparatus 74 includes an entry form information table, a handwriting information table, and an entry column information table.

As shown in FIG. 28A, the entry form information table includes identification information and an entry form type as the items, and those information are stored in association with each other.

As shown in FIG. 28B, the handwriting information table includes a paper number of the paper sheet 90, identification information, and handwriting information as items, and those information are stored in association with one another.

As shown in FIG. 29, the entry column information table includes a form identification ID, positional information of an entry column, an attribute of an entry column, and, as necessary, entry information of an entry column as the items, and those information are stored in association with one another. The entry information of an entry column is, for example, a pressure distribution of an area corresponding to an entry column or image data or character string data generated from the pressure distribution.

FIGS. 28 and 29 show the case where the identification information is the form identification ID, but the entry form information table and the entry column information table are not limited to those examples, and a form identification figure may be used in place of the form identification ID.

The control apparatus 71 extracts a shape of the concavities and convexities 90a from the pressure distribution acquired from the sensor 1 and acquires identification information (form identification ID or form identification figure) from the extracted shape of the concavities and convexities 90a, for example. The control apparatus 71 stores the acquired identification information and handwriting information in the handwriting information table in association with each other. The control apparatus 71 may also acquire positional information of an entry column from the entry column information table based on the acquired identification information and store, based on the acquired positional information of an entry column, entry information of an entry column such as characters, numerals, and marks written in each entry column in the entry column information table.

The control apparatus 71 may generate character data from the pressure distribution (handwriting information). When the entry form includes a check column, the control apparatus 71 may assume that the entry has been checked when handwriting information is detected from the check column and place a flag in the attribute thereof. When the entry form includes an arbitrary data input column, the control apparatus 71 may convert handwriting information (pressure distribution) written in the arbitrary data input column into image data and store it in the arbitrary data input column as image data.

Here, although the example where the electronic underlay body 100 includes the database has been described, an external apparatus such as a PC may include the database. In this case, it is possible for the external apparatus to search for a character string in a name entry column in the database and reference data on an address or the like entered in the same form. Moreover, a designated form paper image may be added to a background of the entire stored handwriting information for display.

6.3 Operation of Electronic Underlay Body

Figure 30:
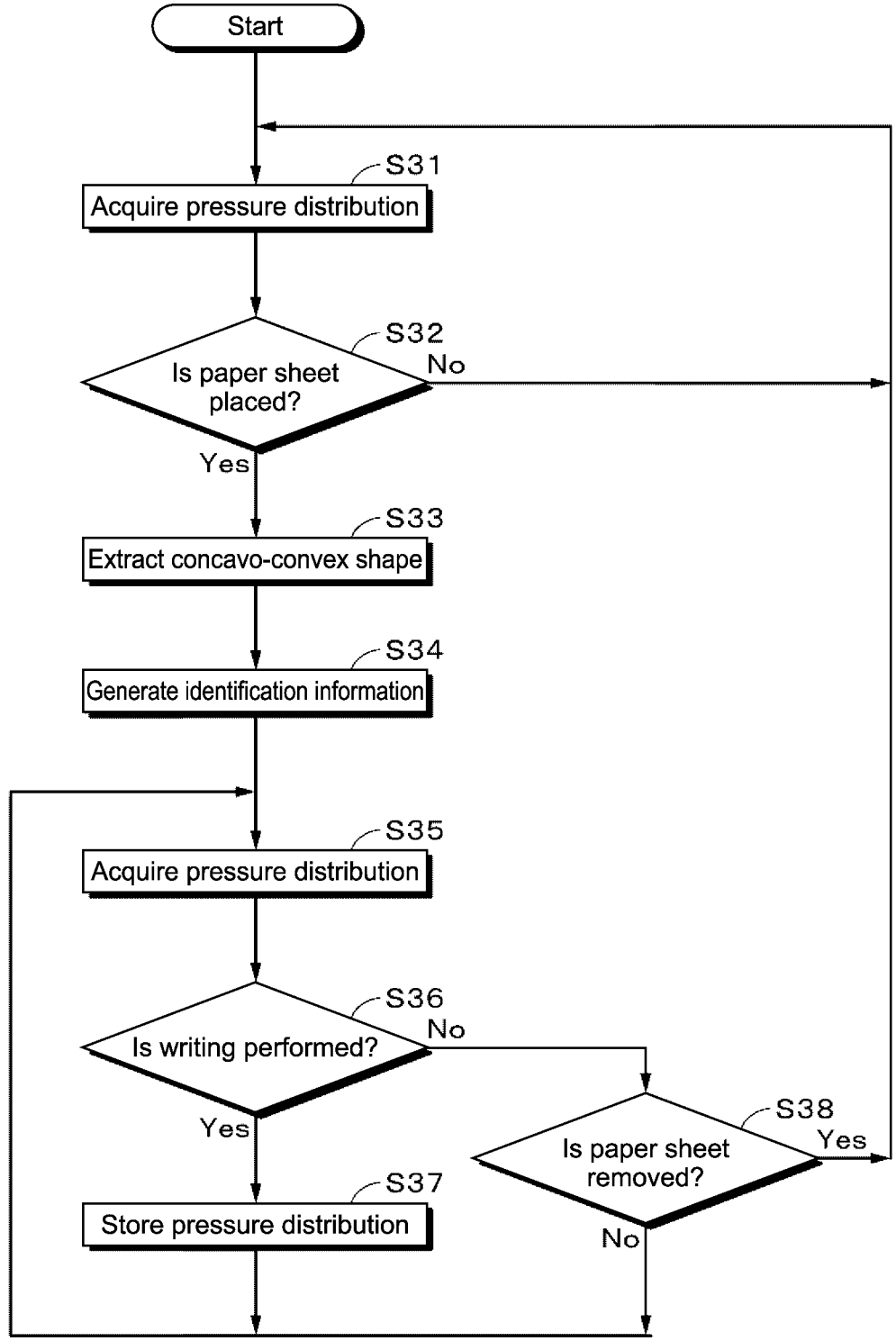
FIG. 30 is a flowchart for describing an operational example of an electronic underlay body according to a sixth embodiment of the present technology.

With reference to FIG. 30, an operational example of the electronic underlay body 100 according to the sixth embodiment of the present technology will be described. First, in Step S31, the control apparatus 71 acquires a pressure distribution of the surface 100m from the sensor 1 at a predetermined cycle. Next, in Step S32, the control apparatus 71 judges whether the paper sheet 90 is placed on the surface 100m based on the pressure distribution acquired in Step S31.

When judged that the paper sheet 90 is placed in Step S32, the processing advances to Step S33. On the other hand, when judged that the paper sheet 90 is not placed in Step S32, the processing returns to Step S31.

Next, in Step S33, the control apparatus 71 extracts the shape of the concavities and convexities 90a from the pressure distribution acquired in Step S31. Here, the pressure distribution is a pressure distribution onto which the shape of the concavities and convexities 90a is reflected. Next, in Step S34, the control apparatus 71 generates identification information from the shape of the concavities and convexities 90a extracted in Step S33.

Subsequently, in Step S35, the control apparatus 71 acquires the pressure distribution of the surface 100m from the sensor 1 at a predetermined cycle. Next, in Step S36, the control apparatus 71 judges whether writing with the writing tool 91 is performed on the paper sheet 90 placed on the surface 100m.

When judged that the writing is performed in Step S36, the control apparatus 71 stores the pressure distribution (handwriting information) acquired at the predetermined cycle in Step S35 and the identification information generated in Step S34 in the handwriting information table of the storage apparatus 74 in association with each other in Step S37. At this event, it is also possible to generate image data of a pen-point position and writing pressure of the writing tool 91 or handwriting from the pressure distribution acquired at the predetermined cycle in Step S35 and store it in the handwriting information table as the handwriting information. Alternatively, character data may be generated from the pressure distribution acquired at the predetermined cycle and stored in the handwriting information table. Furthermore, the handwriting information may be supplied to an external apparatus such as a PC via the communication section 73. Upon ending the storage of the information in the handwriting information table, the processing returns to Step S35.

On the other hand, when judged that the writing is not performed in Step S36, the control apparatus 71 judges whether the paper sheet 90 is removed from the surface 100m based on the pressure distribution acquired at the predetermined cycle in Step S35 in Step S38. When judged that the paper sheet 90 is removed in Step S38, the control apparatus 71 ends the processing of acquiring the pressure distribution in Step S35 and the processing of storing the pressure distribution in Step S37 and returns to the processing of Step S31. On the other hand, when judged that the paper sheet 90 is not removed in Step S16, the control apparatus 71 returns to the processing of Step S35.

6.4 Effect

In the sixth embodiment, the concavities and convexities 90a onto which identification information is recorded are provided on the back surface 90n of the paper sheet 90. When the paper sheet 90 is placed on the surface 100m of the electronic underlay body 100, the electronic underlay body 100 extracts the identification information (form identification ID or form identification figure) from the pressure distribution onto which the shape of the concavities and convexities 90a is reflected. Then, the extracted identification information and the handwriting information (pressure distribution) are stored in the database in association with each other. By storing the identification information and the handwriting information in association with each other as described above, it is possible to judge what kind of entry information has been written in what attribute column in the paper form.

Since the identification information can be simply and inexpensively added to the paper sheet 90, the following becomes possible, for example, using a general-purpose paper sheet 90 and writing tool 91.

At a residential model room, a visitor questionnaire form and a renovation estimate request form are distinguished from each other and digitized simultaneous with the entry to be used for service.

In a hospital, even when the same system is used for an entry of a medical interview sheet by new patients and a medical record entry by doctors, the entry content can be distinguished and handed over to the system.

By providing the concavities and convexities 90a that differ for the front surface 90m and the back surface 90n of the paper sheet 90 such as a questionnaire form, a use of the back surface 90n can be detected.

6.5 Modified Example

Modified Example 1

Which of a blank sheet and a predetermined entry form the paper sheet 90 is may be judged based on the presence/absence of the concavities and convexities 90a. Specifically, the concavities and convexities 90a are not provided on the back surface 90n of the paper sheet 90 as a blank sheet, and the concavities and convexities 90a are provided on the back surface 90n of the paper sheet 90 as a predetermined entry form. The control apparatus 71 judges whether the concavities and convexities 90a are formed on the back surface of the paper sheet 90 placed on the surface 100m based on the pressure distribution acquired from the sensor 1.

With such a configuration, by identifying the type of paper sheet 90, a specific attribute can be imparted to the handwriting. For example, while a numeral written on a blank sheet is recognized simply as a numeral, a numeral written on a predetermined entry form can be processed as digital data having an attribute such as a postal code and a phone number according to the entry position.

Modified Example 2

Although the embodiment above has described the example of the case where the electronic underlay body 100 judges an entry paper form of one paper sheet 90 placed on the surface 100m based on the pressure distribution data, the present technology is not limited to this example. Specifically, the electronic underlay body 100 may judge a plurality of entry paper forms placed on the surface 100m based on the pressure distribution data.

7. Seventh Embodiment

7.1 General Outline

In a seventh embodiment, when a user writes on the paper sheet 90 on the surface 100m with the writing tool 91, a corresponding sound effect (e.g., writing sound) is output from the electronic underlay body 100. Further, the electronic underlay body 100 may output different sound effects for the writing with the writing tool 91 and the erasing with the eraser 93. Although an example where the electronic underlay body 100 outputs a sound effect will be described herein, sound effects may be output from a peripheral apparatus or a base unit of the electronic underlay body 100.

7.2 Configuration of Electronic Underlay Body

Upon detecting writing with the writing tool 91 on the paper sheet 90 on the surface 100m, the control apparatus 71 outputs a sound effect via the speaker 75. The control apparatus 71 may distinguish the writing with the writing tool 91 and the erasing with the eraser 93 from each other based on the pressure distribution of the surface 100m and output different sound effects. It should be noted that as a method of distinguishing the writing with the writing tool 91 and the erasing with the eraser 93 from each other, the method described in the first embodiment can be used. Moreover, different sound effects may be output for a case where the writing tool 91 has stopped and a case where the writing tool 91 is moving.

The sound effect of the writing tool 91 is favorably an operational sound for notifying the user of the writing operation. A specific example of the operational sound is a writing sound corresponding to the type of a writing tool such as a pencil, a pen, and an ink brush. The sound effect of the eraser 93 is favorably an operational sound for notifying the user of an erasing operation. A specific example of the operational sound is a friction sound of an eraser (erasing sound).

The storage apparatus 74 stores sound effect data for outputting the sound effects described above. Examples of the sound effect data include data on a writing sound and data on a friction sound of an eraser. The control apparatus 71 reads out the sound effect data from the storage apparatus 74 and reproduces it according to the detection of the writing with the writing tool 91 or the erasing with the eraser 93 to output a sound effect. It should be noted that when a sound effect is output from a peripheral apparatus or base unit of the electronic underlay body 100, the sound effect data is stored in a storage apparatus provided in the peripheral apparatus or the base unit.

The control apparatus 71 may detect writing pressure of the writing tool 91 (capacitance change) or a pressing force of the eraser 93 and output a sound effect corresponding to the writing pressure or the pressing force. For example, a volume of the sound effect may be raised or a pitch (frequency) of the sound effect may be raised as the writing pressure or pressing force becomes higher, or those may be combined.

The control apparatus 71 may distinguish a range of the writing pressure of the writing tool 91 or the pressing force of the eraser 93 that is favorable for the electronic underlay body 100, a range of an insufficient writing pressure of the writing tool 91 or pressing force of the eraser 93, and a range of an excessive writing pressure of the writing tool 91 or pressing force of the eraser 93 from one another and output different sound effects according to the results. The ranges of the writing pressure of the writing tool 91 or the pressing force of the eraser 93 are stored in the storage apparatus 74 in advance, for example.

Different sound effects may be output for different types of writing tools 91. For example, a writing sound of a pencil may be output when the writing tool 91 is a pencil, a writing sound of a pen may be output when the writing tool 91 is a pen, and a writing sound of an ink brush may be output when the writing tool 91 is an ink brush.

7.3 Effect

In the seventh embodiment, since an appropriate feedback sound effect is output according to the writing pressure of the writing tool 91 and the like, the user can appropriately operate the electronic underlay body 100. Therefore, an erroneous judgment of handwriting, a product failure, and the like can be reduced.

8. Eighth Embodiment

8.1 Modes of Electronic Underlay Body (Modes)

Figure 31:
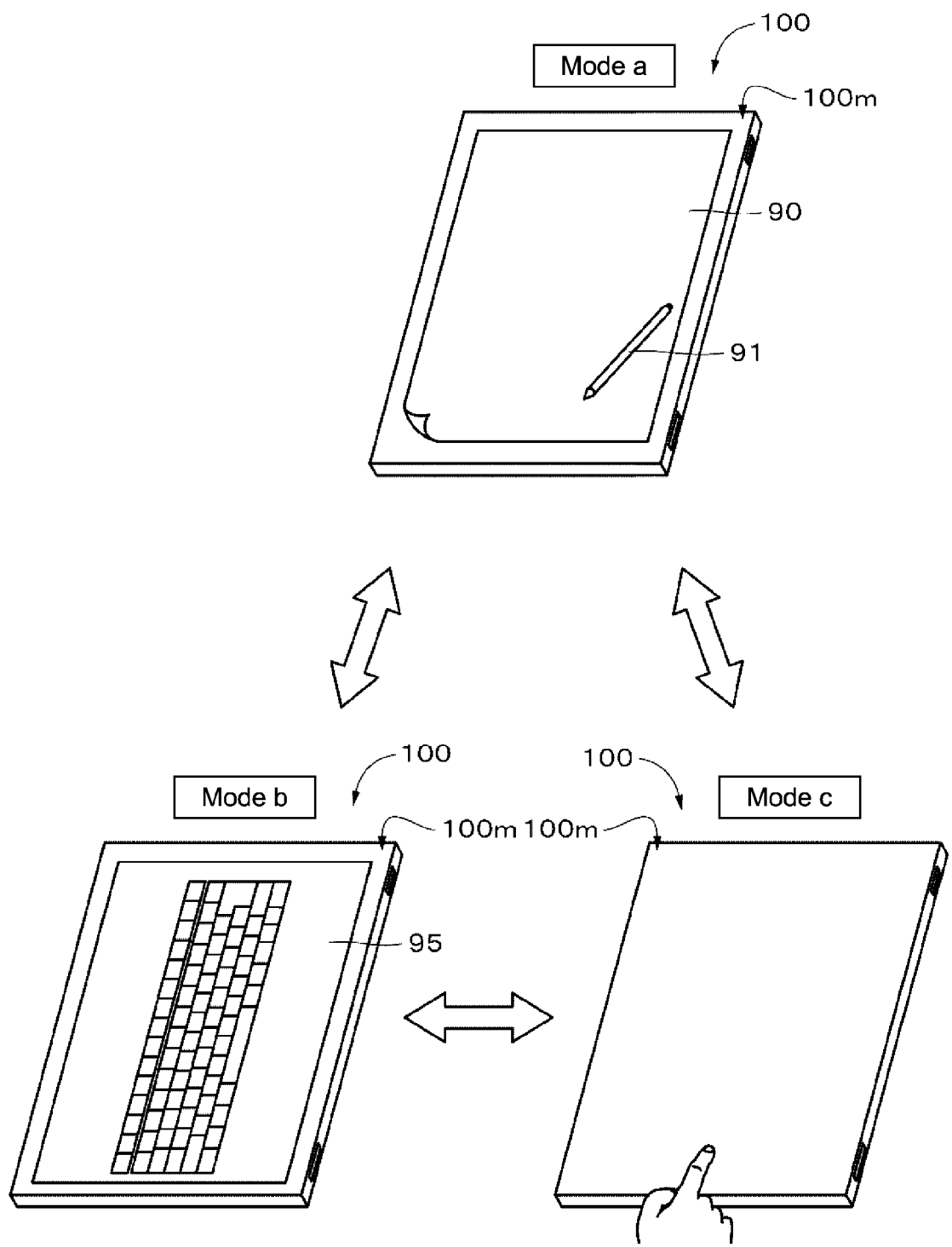
FIG. 31 is a schematic diagram for describing operation modes of an electronic underlay body according to an eighth embodiment of the present technology.

As shown in FIG. 31, the electronic underlay body 100 according to the eighth embodiment includes three modes of modes a, b, and c. The mode a is a mode of taking in characters and the like written with a general-purpose writing tool 91 as handwriting information. The mode b is a mode of operating as a keyboard or a keypad. The mode c is a mode of operating as a touchpad.

Upon detecting that the paper sheet 90 is placed on the surface 100m, the electronic underlay body 100 shifts to the mode a. Upon detecting that a pad 95 is placed on the surface 100m, the electronic underlay body 100 shifts to the mode b. Upon detecting that neither the paper sheet 90 nor the pad 95 is placed on the surface 100m, the electronic underlay body 100 shifts to the mode c.

Although the example of the case where the mode c is a mode of operating as a touchpad is described herein, the operation of the mode c is not limited to this example, and the mode c may be a mode of functioning as a digitizer, a mode of performing a setting change of the electronic underlay body 100, a mode of outputting a predetermined music or audio, a sleep mode, or the like.

The concavities and convexities are provided on the back surface of the paper sheet 90 and the pad 95. Here, the back surface side is a side that is placed on the surface 100m of the electronic underlay body 100. The shapes of the concavities and convexities differ for the paper sheet 90 and the pad 95, and identification information for identifying the paper sheet 90 and the pad 95 is recorded onto the concavities and convexities. The identification information is an identification ID or identification figure. The identification ID and the identification figure are similar to the form identification ID and the form identification figure according to the sixth embodiment. It should be noted that it is favorable for the concavities and convexities to be provided at a predetermined position (e.g., side or corner) on the back surface of the paper sheet 90 and the pad 95. This is because it becomes easy for the control apparatus 71 to detect the presence/absence of the concavities and convexities.

As the pad 95, a sheet-type rubber pad can be used, for example. The front surface of the pad 95 is an input surface including a plurality of keys. As such an input surface, there are, for example, a print surface on which a keyboard, a keypad (numeric keypad), or the like is printed and a concavo-convex surface on which concavities and convexities corresponding to a keyboard shape or a keypad shape are formed.

It should be noted that in the mode b, the electronic underlay body 100 functions as an input apparatus including a plurality of keys of the pad 95 (e.g., keyboard or keypad). Specifically, the control apparatus 71 generates a signal corresponding to an input operation (pressing) with respect to each key of the pad 95 and outputs it to an external apparatus such as a PC via the communication section 73.

8.2 Operation of Electronic Underlay Body

Figure 32:
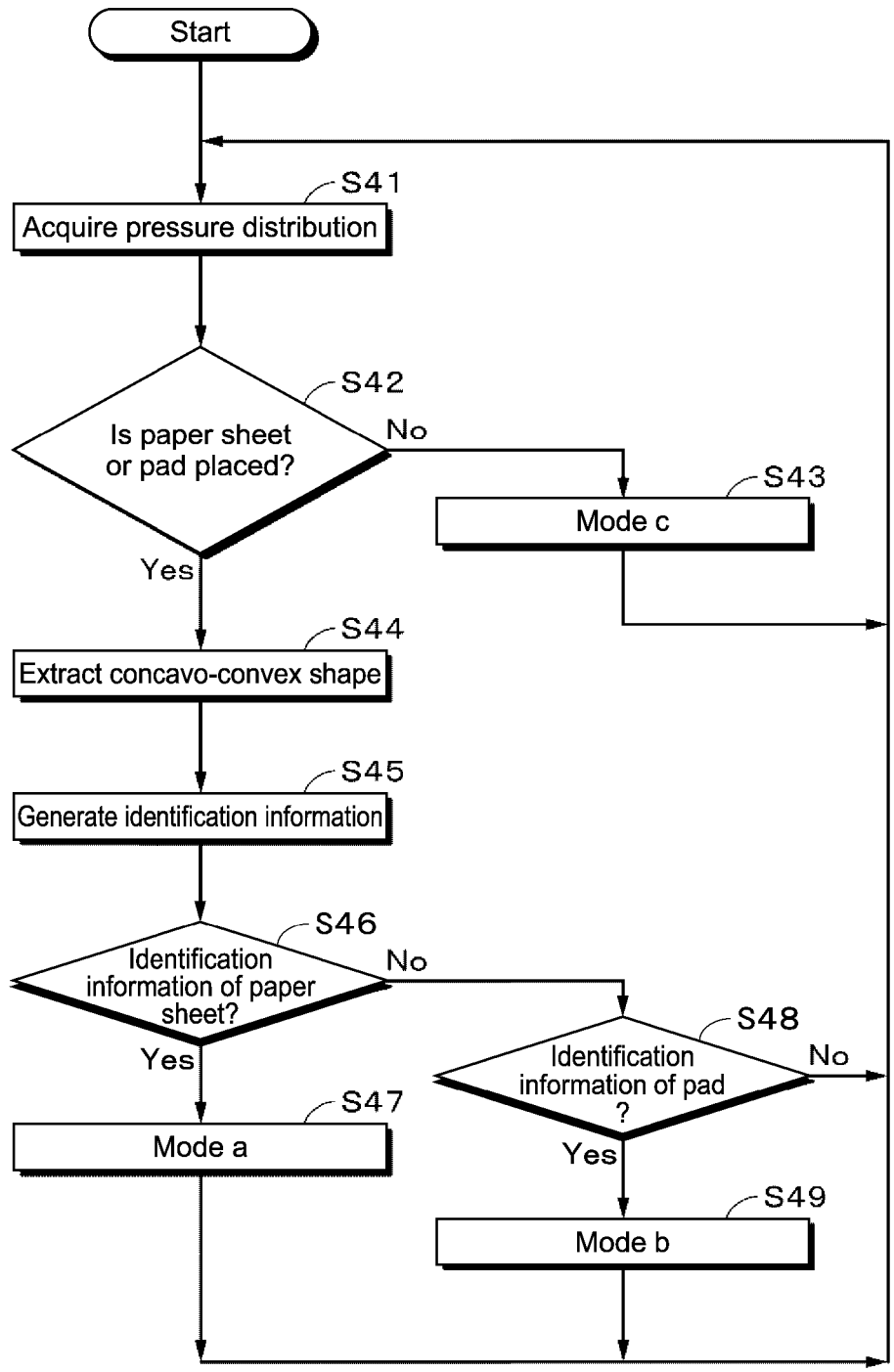
FIG. 32 is a flowchart for describing an example of a mode shift operation of the electronic underlay body according to the eighth embodiment of the present technology.

With reference to FIG. 32, an example of a mode shift operation of the electronic underlay body 100 according to the eighth embodiment of the present technology will be described. First, in Step S41, the control apparatus 71 acquires a pressure distribution of the surface 100m from the sensor 1 at a predetermined cycle. Next, the control apparatus 71 judges whether the paper sheet 90 or the pad 95 is placed from the pressure distribution acquired in Step S41. When judged that the paper sheet 90 or the pad 95 is placed in Step S42, the control apparatus 71 advances the processing to Step S44. On the other hand, when judged that the paper sheet 90 or the pad 95 is not placed in Step S42, the control apparatus 71 sets the operation mode to the mode c.

Next, in Step S44, the control apparatus 71 extracts a concavo-convex shape of the paper sheet 90 or the pad 95 from the pressure distribution acquired in Step S41. Then, in Step S45, the control apparatus 71 generates identification information from the concavo-convex shape extracted in Step S45.

Subsequently, in Step S46, the control apparatus 71 judges whether the identification information generated in Step S45 is that of the paper sheet 90. When judged that the identification information is that of the paper sheet 90 in Step S46, the control apparatus 71 sets the operation mode to the mode a. On the other hand, when judged that the identification information is not that of the paper sheet 90 in Step S46, the control apparatus 71 advances the processing to Step S48.

Next, in Step S48, the control apparatus 71 judges whether the identification information generated in Step S45 is that of the pad 95. When judged that the identification information is that of the pad 95 in Step S48, the control apparatus 71 sets the operation mode to the mode c. On the other hand, when judged that the identification information is not that of the pad 95 in Step S46, the control apparatus 71 returns to the processing of Step S41.

8.3 Effect

In the eighth embodiment, while the electronic underlay body 100 can be used as an apparatus for acquiring handwriting information in the state where the paper sheet 90 is placed on the surface 100m, the electronic underlay body 100 can be used as an electronic apparatus capable of detecting a pressure of a touch operation and the like also when the paper sheet 90 is not placed on the surface 100m.

When using a plane-type pressure sensor having a sufficient sensitivity as the sensor 1, the electronic underlay body 100 can be used as a touchpad that uses a finger or a digitizer that detects a stroke of a brush without a paint and the like.

8.4 Modified Example

Modified Example 1

The eighth embodiment has described the example where the paper sheet 90 and the pad 95 are identified based on the identification information stored in the concavities and convexities provided on the back surface of both the paper sheet 90 and the pad 95, but the present technology is not limited to this example. For example, it is also possible to provide the concavities and convexities on the back surface of one of the paper sheet 90 and the pad 95 and identify the paper sheet 90 and the pad 95 based on the presence/absence of the concavities and convexities.

Modified Example 2

The eighth embodiment has described the example where the electronic underlay body 100 distinguishes the paper sheet 90 and the pad 95 from each other. However, it is also possible for the electronic underlay body 100 to distinguish a pad type in addition to those judgments so as to enable an input operation corresponding to the pad type to be made. Hereinafter, an example of a configuration in this case will be described.

The pad 95 includes a concavo-convex shape that differs for each pad type, more specifically, a concavo-convex shape that differs according to a type of keys on the front surface and/or a key arrangement. The control apparatus 71 extracts the concavo-convex shape of the pad 95 from the pressure distribution acquired by the sensor 1 and generates identification information of the pad 95 from the extracted concavo-convex shape. Then, based on the identification information, the type of the pad 95 is judged. The storage apparatus 74 includes the database for storing the identification information of the pad 95 and the pad type in association with each other. The control apparatus 71 can search the database so as to judge the type of the pad 95 based on the identification information.

When such a configuration is adopted, it becomes possible to prepare a numeric key rubber pad and an alphabet key rubber pad as the pad 95 and use the numeric key rubber pad and the alphabet key rubber pad in an interchangeable manner, for example.

9. Ninth Embodiment 9.1 Configuration of Electronic Underlay Body

Figure 33:
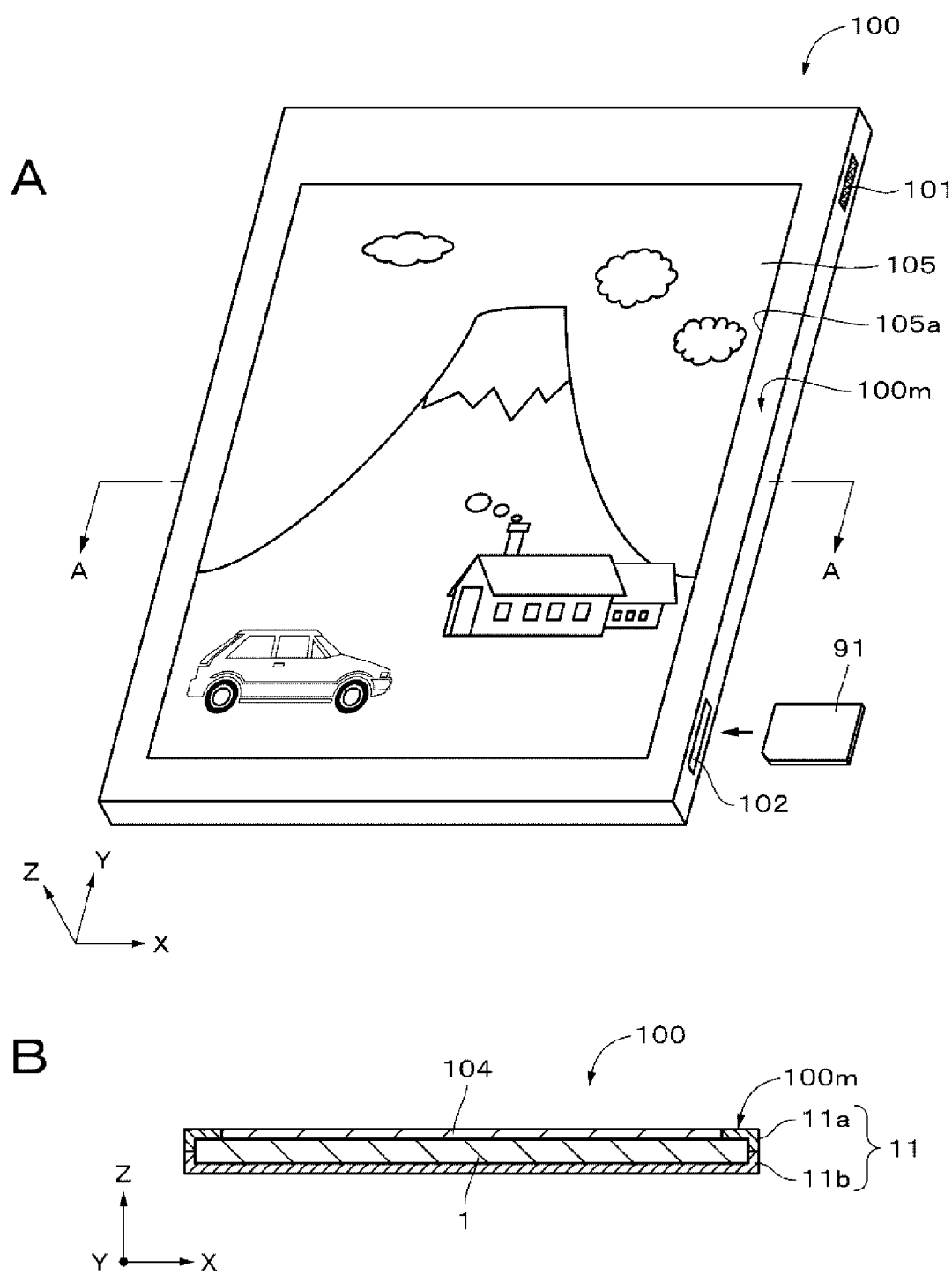
FIG. 33A is a perspective view showing an example of an appearance of an electronic underlay body according to a ninth embodiment of the present technology.
FIG. 33B is a schematic cross-sectional diagram taken along the line A-A of FIG. 33A.

FIG. 33A is a perspective view showing an example of an appearance of the electronic underlay body according to a ninth embodiment of the present technology. FIG. 33B is a cross-sectional diagram taken along the line A-A of FIG. 33. As shown in FIGS. 33A and 33B, the electronic underlay body 100 according to the ninth embodiment includes a display apparatus 105 on the surface 100m on which the paper sheet 90 is to be placed. The first exterior material 2a includes an opening 105a, and a display surface of the display apparatus 105 is exposed via the opening 105a.

The display apparatus 105 includes a function as an input operation section and a function as a display section in the electronic underlay body 100. Displayed on the surface 100m are, for example, a GUI (Graphical User Interface), a moving image or still image based on handwriting information, and an image corresponding to a keyboard.

The display apparatus 105 has flexibility. Examples of the display apparatus 105 include an electronic paper, an organic EL (Electro-Luminescence) panel, an inorganic EL panel, and a liquid crystal panel, though not limited thereto. Further, the thickness of the display apparatus 105 is within the range of, for example, 0.1 mm to 1 mm, though not limited to this range.

Figure 34:
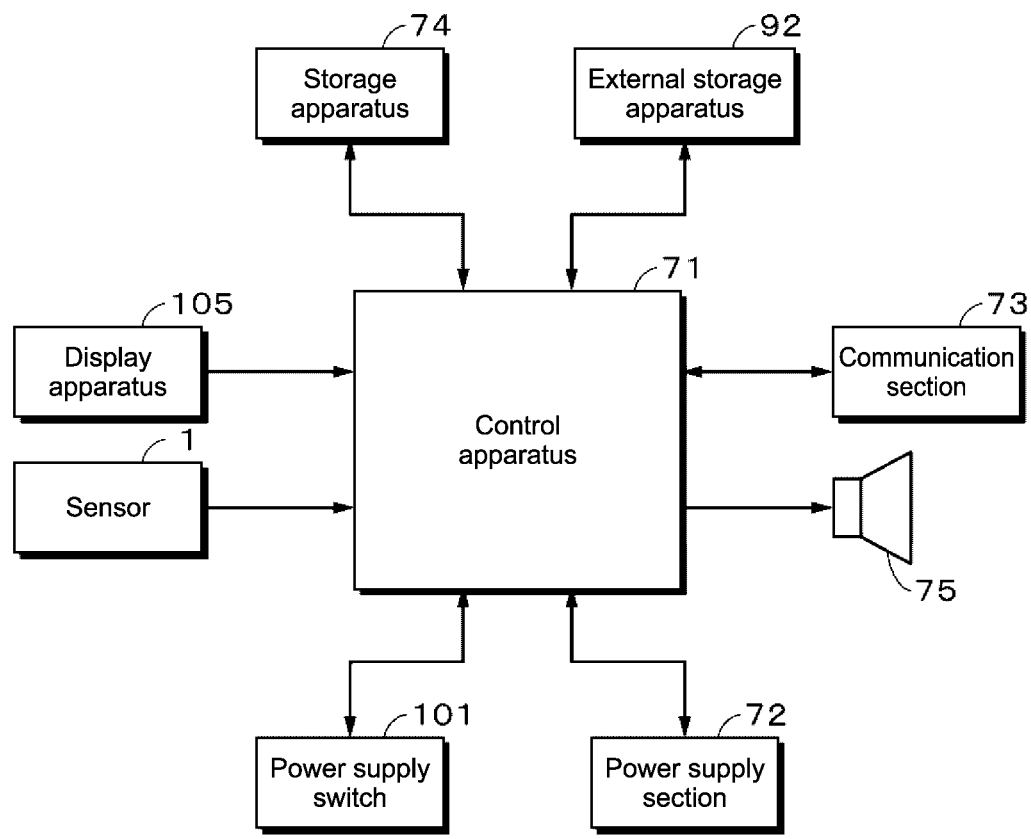
FIG. 34 is a block diagram showing a configuration example of an electrical circuit of the electronic underlay body according to the ninth embodiment of the present technology.

FIG. 34 is a block diagram showing a configuration example of the electrical circuit of the electronic underlay body according to the ninth embodiment of the present technology. An operation signal processed by the control apparatus 71 is output to the display apparatus 105 as an image signal, for example. The display apparatus 105 is connected to a drive circuit mounted on the control apparatus 71 via a flexible wiring substrate (not shown).

The electronic underlay body 100 capacitively detects a change of the distance between the metal layer 10 and the electrode layer 40 and the distance between the conductive layer 60 and the electrode layer 40 due to an input operation made on the surface 100m of the display apparatus 105 to thus detect the input operation. The input operation is not limited to an intentional pressing (push) operation on the surface 100m, and a touch operation may be made. In other words, since the electronic underlay body 100 is capable of detecting even a minute pressing force (e.g., about several ten grams) applied by a general touch operation, a touch operation that is similar to that made with respect to a normal touch sensor can be made.

The control apparatus 71 includes a signal processing circuit capable of generating information (signal) on an input operation with respect to the surface 100m based on the outputs of the plurality of detection sections 40s. The input operation used herein refers to an input operation of a user made when the operation mode of the electronic underlay body 100 is set to the mode c, that is, an input operation with respect to an operation screen of a touch panel. In the mode c, the control apparatus 71 scans each of the plurality of detection sections 40s at a predetermined cycle, acquires a capacitance change amount of each of the detection sections 40s, and generates information (signal) on the input operation based on the capacitance change amount.

The control apparatus 71 includes an arithmetic operation section and a signal generation section. The arithmetic operation section detects a user operation based on the capacitance change of the detection sections 40s. The signal generation section generates an operation signal based on the detection result obtained by the arithmetic operation section.

The arithmetic operation section calculates a pressing position on the surface 100m in the XY coordinate system based on an electric signal (input signal) output from each of the X and Y electrodes 41b and 42b of the electrode layer 40, and the signal generation section generates an operation signal based on the calculation result. Accordingly, an image based on the input operation made on the surface 100m can be displayed on the display apparatus 105.

The arithmetic operation section calculates the XY coordinates of the pressing position of the writing tool 91 on the surface 100m based on the outputs of the detection sections 40s to each of which unique XY coordinates are allocated. Specifically, the arithmetic operation section calculates the capacitance change amount of the detection sections 40s each formed at the intersection area of the X and Y electrodes 41b and 42b based on the capacitance change amount acquired from the X and Y electrodes 41b and 42b. By the ratio of the capacitance change amounts of the detection sections 40s and the like, the XY coordinates of the pressing position regarding an operation such as a touch operation can be calculated.

Moreover, the arithmetic operation section is capable of judging whether an operation is being made on the surface 100m. Specifically, for example, it can be judged that an operation is being made on the surface 100m when the capacitance change amount of the entire detection sections 40s, the capacitance change amount of each of the detection sections 40s, or the like is equal to or larger than a predetermined threshold value. Further, by providing two or more threshold values, a touch operation and an intentional push operation can be judged distinguishably. Furthermore, it is also possible to calculate the pressing force based on the capacitance change amount of the detection sections 40s. The arithmetic operation section can output those calculation results to the signal generation section.

The signal generation section generates a predetermined operation signal based on the calculation result of the arithmetic operation section. Examples of the operation signal include an image control signal for generating a display image to be output to the display apparatus 105, an operation signal corresponding to a key of a keyboard image displayed at a pressing position on the display apparatus 105, and an operation signal related to an operation corresponding to a GUI (Graphical User Interface).

9.2 Modes of Electronic Underlay Body

Figure 35:
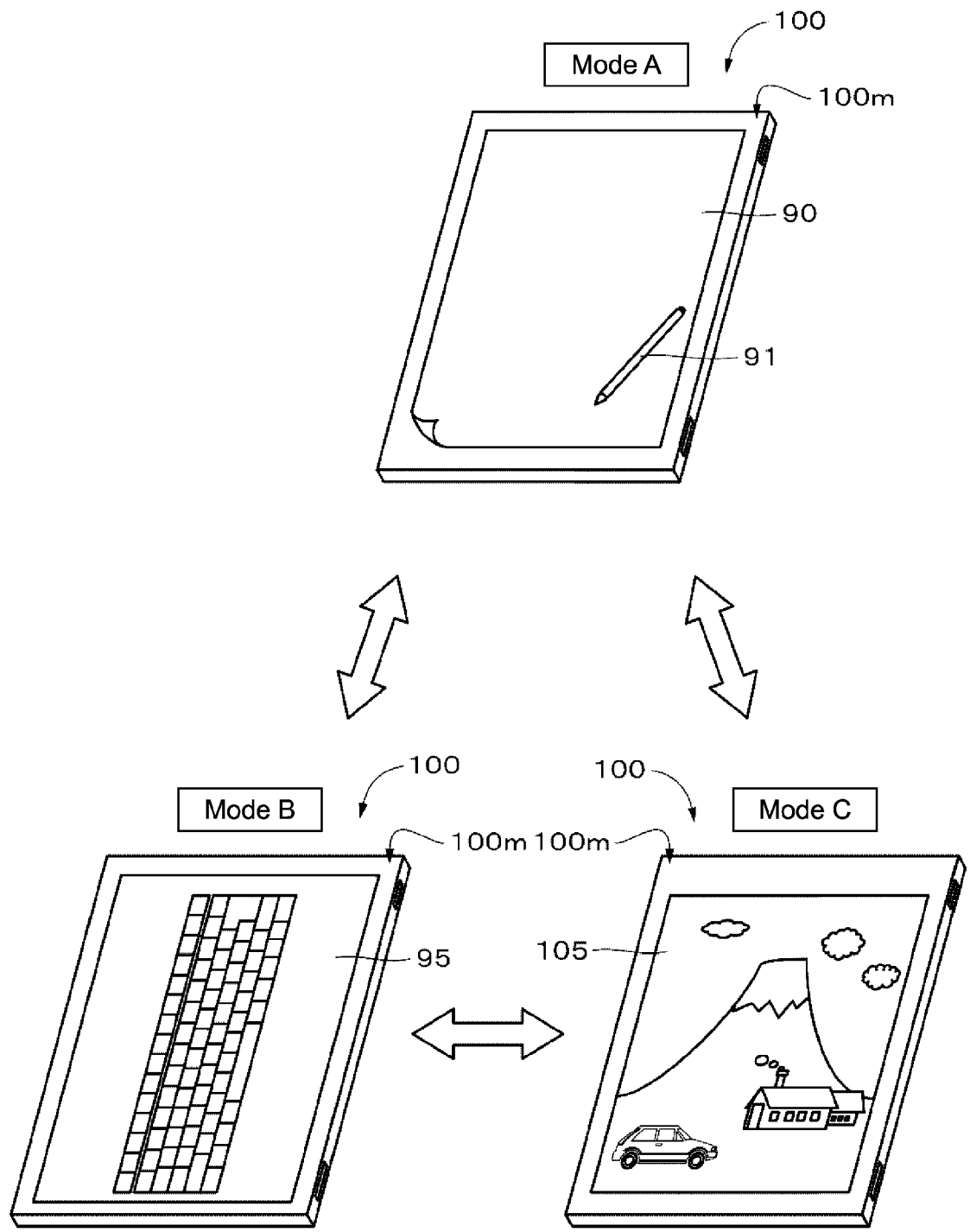
FIG. 35 is a schematic diagram for describing operation modes of the electronic underlay body according to the ninth embodiment of the present technology.

As shown in FIG. 35, the electronic underlay body 100 includes three modes of modes A, B, and C. The modes A and B are similar to the modes a and b of the eighth embodiment. The mode C is a mode of operating as a touch panel. It should be noted that the mode C may be shifted to a mode D when an input operation is not made for a predetermined time or more. The mode D may be a mode of functioning as a digitizer, a mode of performing a setting change of the electronic underlay body 100, a mode of displaying a predetermined moving image such as a screen saver, a mode of outputting a predetermined music, audio, and the like, a sleep mode, or the like.

Upon detecting that neither the paper sheet 90 nor the pad 95 is placed on the surface 100m, the electronic underlay body 100 shifts to the mode C. It should be noted that the operation mode may be shifted to the mode C after an elapse of a predetermined time since the detection. When the operation mode shifts from the mode C to the mode A or B, the control apparatus 71 turns OFF the display of the display apparatus 105. On the other hand, when the operation mode shifts from the mode A or B to the mode C, the control apparatus 71 turns ON the display of the display apparatus 105.

10. Tenth Embodiment

10.1 Configuration of Handwriting Reading System

Figure 36:
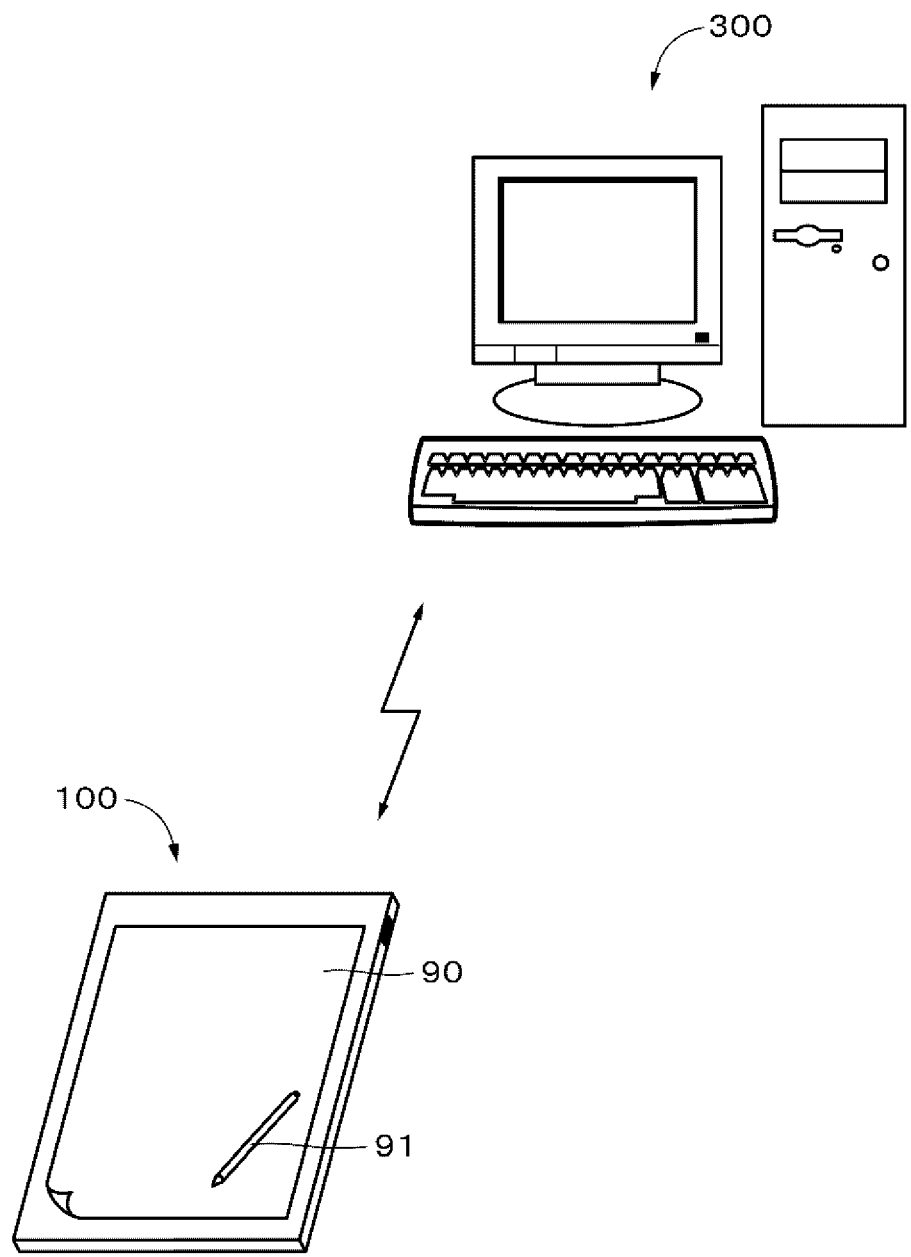
FIG. 36 is a schematic diagram showing a configuration example of a handwriting reading system according to a tenth embodiment of the present technology.

FIG. 36 is a schematic diagram showing a configuration example of a handwriting reading system according to a tenth embodiment of the present technology. As shown in FIG. 36, the handwriting reading system includes the electronic underlay body 100 and a base unit 300. The electronic underlay body 100 and the base unit 300 exchange information in a wire or wireless manner. For example, when writing is performed on the paper sheet 90 on the surface 100m, the electronic underlay body 100 reads handwriting information thereof and supplies it to the base unit 300 in the wired or wireless manner. The base unit 300 stores the handwriting information supplied from the electronic underlay body 100.

10.2 Configuration of Electronic Underlay Body

The electronic underlay body 100 is a peripheral-apparatus-type electronic underlay body. The electronic underlay body 100 has a configuration from which the slot 102 shown in FIG. 1 is omitted in the first embodiment above. The electronic underlay body 100 may have a configuration from which the storage apparatus 74 shown in FIG. 11 is additionally omitted in the first embodiment above.

10.3 Configuration of Base Unit

Figure 37:
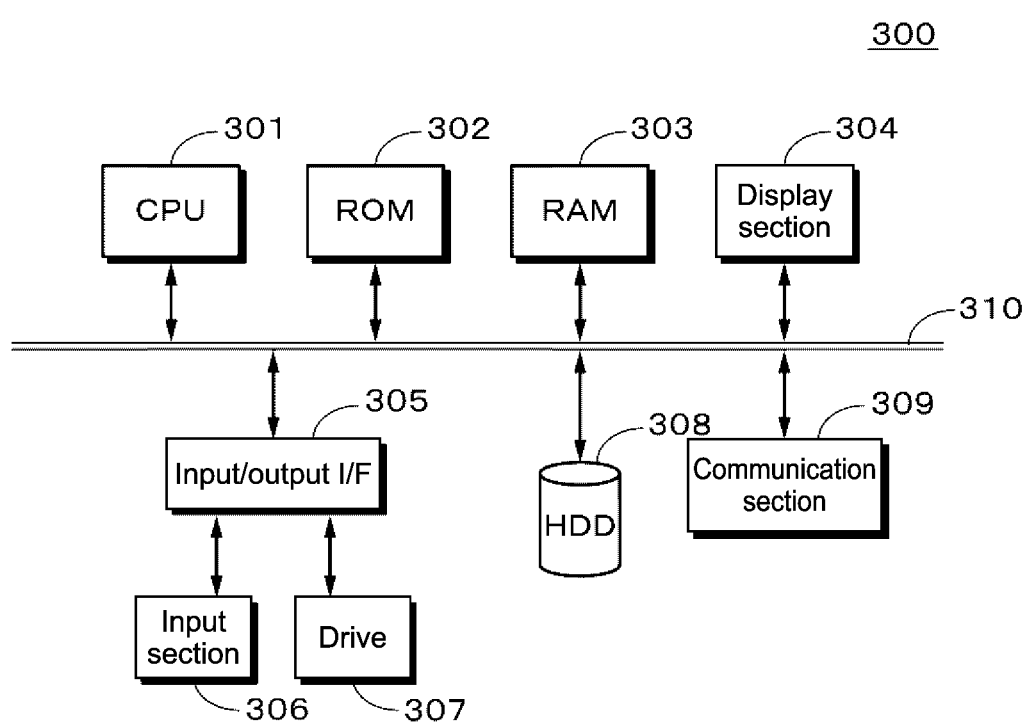
FIG. 37 is a block diagram showing a configuration example of a base unit.

FIG. 37 is a block diagram showing a configuration example of the base unit 300. The base unit 300 is a general-purpose computer such as a PC or a dedicated apparatus that stores and processes handwriting information. As shown in FIG. 37, in the base unit 300, a CPU 301, a ROM (Read Only Memory) 302, and a RAM (Random Access Memory) 303 are connected to a bus 310. The ROM 302 stores in advance an initialization program for activating the base unit 300, for example. The RAM 303 is used as a work memory of the CPU 301.

Also connected to the bus 310 are a display section 304, an input/output interface (input/output I/F) 305, a hard disk drive (hereinafter referred to as "HDD" as appropriate) 308, and a communication section 309. The display section 304 is incorporated into or connected to the base unit 300 and performs display corresponding to a display control signal generated by the CPU 301. Connected to the input/output I/F 305 is an input section 306 for receiving a user input, such as an operation panel on which a keyboard or a predetermined operator is arranged. Moreover, a drive apparatus 307 capable of reproducing a recording medium such as a CD (Compact Disc) and a DVD (Digital Versatile Disc) may also be connected to the input/output I/F 305.

The HDD 308 stores handwriting information supplied from the electronic underlay body 100, for example. The CPU 301 receives handwriting information from the electronic underlay body 100 via the communication section 309 and stores it in the HDD 308 after subjecting it to processing for a noise reduction, compression, and the like as necessary, for example. The communication section 309 communicates with the base unit 300 in a wired or wireless manner.

Heretofore, the embodiments of the present technology have been described in detail. However, the present technology is not limited to the embodiments above, and various modifications can be made based on the technical concept of the present technology.

For example, the configurations, methods, processes, shapes, materials, numerical values, and the like described in the embodiments above are mere examples, and different configurations, methods, processes, shapes, materials, numerical values, and the like may be used as necessary.

In addition, the configurations, methods, processes, shapes, materials, numerical values, and the like described in the embodiments above may be combined without departing from the gist of the present technology.

Moreover, although the example of identifying an entry form by concavities and convexities provided on a front surface of a paper has been described in the embodiments above, a paper type other than an entry form may be also be identified.

Furthermore, although the configuration in which the electronic underlay body detects handwriting information on only one of the main surfaces has been described in the embodiments above, the present technology is not limited to this example. For example, a configuration in which the electronic underlay body can detect handwriting information on both main surfaces may be used. In this case, the electronic underlay body only needs to include two sensors.

Furthermore, the present technology may also take the following configurations.

(1) An underlay body, including:
  a surface on which a writing medium is placed; and
  a sensor configured to detect a pressure distribution on the surface.

(2) The underlay body according to (1),
  in which the sensor includes
  a conductive layer having flexibility,
  an electrode layer, and
  a plurality of structures that separate the conductive layer and the electrode layer from each other, and
  the electrode layer includes a plurality of first electrodes and a plurality of second electrodes intersecting the plurality of first electrodes.

(3) The underlay body according to (1) or (2),
  in which the writing medium includes concavities and convexities onto which identification information of the medium is recorded, and the underlay body further includes
a processing section configured to acquire the identification information from the pressure distribution onto which the concavities and convexities are reflected.
(4) The underlay body according to any one of (1) to (3), further including
a storage section configured to associate and store identification information of the medium and format information of the medium in association with each other.
(5) The underlay body according to (4),
in which the storage section stores the format information of the medium and handwriting information detected by the sensor in association with each other.
(6) The underlay body according to any one of (1) to (5), further including
a controller configured to judge whether the writing medium is placed on the surface, based on the pressure distribution detected by the sensor.
(7) The underlay body according to (6),
in which the controller switches from a second mode to a first mode when the writing medium is placed on the surface, and switches from the first mode to the second mode when the writing medium is removed from the surface.
(8) The underlay body according to (6), further including
a display apparatus provided on the surface,
in which the controller turns off display of the display apparatus when the writing medium is placed on the surface and turns on the display of the display apparatus when the writing medium is removed from the surface.
(9) The underlay body according to any one of (1) to (8), further including
a controller configured to judge that a sheet including a first surface having a plurality of keys and a second surface having concavities and convexities is placed on the surface on which the writing medium is to be placed, from the pressure distribution onto which the concavities and convexities are reflected, and controls an input operation according to the plurality of keys.
(10) The underlay body according to any one of (1) to (9), further including
a controller that judges an exchange of the writing medium with respect to the surface, based on the pressure distribution detected by the sensor.
(11) The underlay body according to any one of (1) to (10), further including
a controller configured to detect writing with respect to the writing medium placed on the surface, based on the pressure distribution detected by the sensor.
(12) The underlay body according to (11),
in which the controller outputs a sound effect in accordance with the detection of the writing.
(13) The underlay body according to (12),
in which the controller changes the sound effect in accordance with writing pressure of the writing.
(14) The underlay body according to any one of (1) to (13), further including
a controller configured to judge writing by a writing tool and erasing by an erasing tool with respect to the writing medium placed on the surface, based on the pressure distribution detected by the sensor.
(15) The underlay body according to any one of (1) to (14), further including
a processing section configured to correct a deviation of handwriting information accompanying an arrangement's deviation of the medium placed on the surface, based on the pressure distribution detected by the sensor.
(16) The underlay body according to any one of (1) to (3) and (6) to (15), further including
a storage apparatus configured to store handwriting information detected by the sensor.
(17) The underlay body according to any one of (1) to (16), further including
a communication section configured to transmit handwriting information detected by the sensor to an external apparatus.
(18) The underlay body according to any one of (1) to (17), further including
a processing section configured to generate character data or image data from handwriting information detected by the sensor.
(19) The underlay body according to any one of (1) to (17), further including
a processing section configured to acquire a position and writing pressure of a writing tool when writing is performed on the writing medium placed on the surface, based on the pressure distribution detected by the sensor.
(20) The underlay body according to any one of (1) to (19), in which the writing medium is paper.

DESCRIPTION OF SYMBOLS 1 sensor
2 exterior material
10 metal layer
20, 50 support layer
30 adhesive layer
40 electrode layer
41a, 42a substrate
41b X electrode
42b Y electrode
60 conductive layer
71 control apparatus
72 power supply section
73 communication section
74 storage apparatus
75 speaker
90 paper
91 writing tool
92 external storage apparatus
93 eraser
100 electronic underlay body
100m surface
101 power supply switch
102 slot
103 clip
104 fixing section
105 display apparatus

The invention claimed is:

1. An underlay body, comprising:
a surface on which a writing medium is placed,
wherein the writing medium includes a plurality of concavities and a plurality of convexities,
wherein the plurality of concavities and a plurality of convexities record identification information of the writing medium;
a sensor configured to detect a pressure distribution on the surface,
wherein the sensor comprises
a flexible conductive layer,
an electrode layer that comprises at least one intersection area, and
a plurality of structures to separate the flexible conductive layer and the electrode layer, wherein the electrode layer includes a plurality of first electrodes in a first direction and at least a second electrode in a second direction, wherein the plurality of first electrodes intersect at least the second electrode in the at least one intersection area, wherein at least one structure of the plurality of structures is on the flexible conductive layer and opposed to the at least one intersection area, and wherein the at least one structure of the plurality of structures is in a third direction perpendicular to both the first direction and the second direction; and a processing section configured to acquire the recorded identification information from the plurality of concavities and the plurality of convexities, based on the detected pressure distribution.

2. The underlay body according to claim 1, further comprising a storage section configured to associate and store the identification information of the writing medium and format information of the writing medium.

3. The underlay body according to claim 2, wherein the storage section is further configured to store the format information of the writing medium in association with handwriting information detected by the sensor.

4. The underlay body according to claim 1, further comprising a controller configured to judge whether the writing medium is placed on the surface, based on the pressure distribution detected by the sensor.

5. The underlay body according to claim 4, wherein the controller is further configured to switch from a first mode to a second mode based on a placement of the writing medium on the surface, and switch from the second mode to the first mode based on a removal of the writing medium from the surface.

6. The underlay body according to claim 4, further comprising a display apparatus on the surface, wherein the controller is further configured to turn off display of the display apparatus based on a placement of the writing medium on the surface, and wherein the controller is further configured to turn on the display of the display apparatus based on a removal of the writing medium from the surface.

7. The underlay body according to claim 1, further comprising a controller configured to:

judge a sheet including a first surface having a plurality of keys and a second surface having a plurality of concavities and a plurality of convexities is placed on the surface, based on the detected pressure distribution, and control an input operation based on the plurality of keys.

8. The underlay body according to claim 1, further comprising a controller configured to judge an exchange of the writing medium with respect to the surface, based on the pressure distribution detected by the sensor.

9. The underlay body according to claim 1, further comprising a controller configured to detect a write operation on the writing medium placed on the surface, based on the pressure distribution detected by the sensor.

10. The underlay body according to claim 9, wherein the controller is further configured to output a sound effect based on the detection of the write operation.

11. The underlay body according to claim 10, wherein the controller is further configured to change the sound effect based on writing pressure of the write operation.

12. The underlay body according to claim 1, further comprising a controller configured to judge one of a write operation by a writing tool or an erase operation by an erasing tool with respect to the writing medium placed on the surface, based on the pressure distribution detected by the sensor.

13. The underlay body according to claim 1, wherein the processing section is further configured to correct a first deviation of handwriting information accompanied with a second deviation of the writing medium placed on the surface, based on the pressure distribution detected by the sensor.

14. The underlay body according to claim 1, further comprising a storage apparatus configured to store handwriting information detected by the sensor.

15. The underlay body according to claim 1, further comprising a communication section configured to transmit handwriting information, detected by the sensor, to an external apparatus.

16. The underlay body according to claim 1, wherein the processing section is further configured to generate at least one of character data or image data from handwriting information detected by the sensor.

17. The underlay body according to claim 1, wherein the processing section is further configured to acquire a position of a writing tool and writing pressure of the writing tool, based on the detected pressure distribution associated with a write operation.

18. The underlay body according to claim 1, wherein the writing medium is paper.

* * * * *